(12) United States Patent
Stevens et al.

(10) Patent No.: US 8,386,939 B2
(45) Date of Patent: Feb. 26, 2013

(54) INTERNET INTERFACE AND INTEGRATION LANGUAGE SYSTEM AND METHOD

(75) Inventors: Kris Stevens, Larchmont, NY (US); David J. Shulman, Forest Hills, NY (US); Kevin J. Lennon, White Plains, NY (US); Michael Baresich, Darien, CT (US)

(73) Assignee: Cokinetic Systems Corp., Harrison, NY (US)

( * ) Notice: Subject to any disclaimer, the term of this patent is extended or adjusted under 35 U.S.C. 154(b) by 760 days.

(21) Appl. No.: 12/328,564

(22) Filed: Dec. 4, 2008

(65) Prior Publication Data

US 2009/0144628 A1    Jun. 4, 2009

Related U.S. Application Data

(63) Continuation of application No. 10/482,543, filed on Jul. 16, 2004, now Pat. No. 7,478,329.

(60) Provisional application No. 60/302,108, filed on Jun. 30, 2001.

(51) Int. Cl.
*G06F 15/00* (2006.01)
*G06F 13/00* (2006.01)

(52) U.S. Cl. ........................................ 715/740; 715/761

(58) Field of Classification Search .......... 715/740–744, 715/851–854, 733, 734–738, 761–765
See application file for complete search history.

(56) References Cited

U.S. PATENT DOCUMENTS

| | | | |
|---|---|---|---|
| 5,844,554 A * | 12/1998 | Geller et al. | 715/744 |
| 5,870,719 A | 2/1999 | Maritzen et al. | |
| 6,012,044 A | 1/2000 | Maggioncalda et al. | |
| 6,167,383 A | 12/2000 | Henson | |
| 6,476,828 B1 | 11/2002 | Burkett et al. | |
| 6,643,663 B1 | 11/2003 | Dabney et al. | |
| 2003/0058277 A1 * | 3/2003 | Bowman-Amuah | 345/765 |

FOREIGN PATENT DOCUMENTS

WO    00/56033 A1    9/2000

OTHER PUBLICATIONS

Apr. 12, 2007 European Search Report for PCT/US02/20662.
"User Interface Markup Language (UIML) Draft Specification", Harmonia, Inc., Jan. 17, 2000.
"UIML: An Appliance-Independent XML User Interface Language", Abrams, et al., Nov. 9, 1999.
Koch, Peter-Paul, "The Document Object Model: an Introduction", Internet citation, May 14, 2001, pp. 1-6, http://www.digital-web.com/articles/the_document_object_model/.
European Search Report issued for EP Application No. 10183155.0, dated Jun. 8, 2012, 14 pages.

* cited by examiner

*Primary Examiner* — Cao Kevin Nguyen
(74) *Attorney, Agent, or Firm* — Kenyon & Kenyon, LLP

(57) ABSTRACT

A system for generating, on a user terminal, a user interface having at least two interface items, where the system is configured to store at least two sets of data each corresponding to the interface items. A first set of data includes data for generating and controlling the performance of an operation associated with a first of interface items, and a second said set of data includes data for generating and controlling the performance of an operation associated with a second of the interface items. When a user interacts with the first interface item, the system is configured to perform the action associated with the first interface item, independent of the second interface item and without performing any other action corresponding to the user interface.

16 Claims, 86 Drawing Sheets

| action |
|---|

Attributes

| Attribute Name | Value Type | Remarks |
|---|---|---|
| name | string | |
| target | string | Local: name of target function in local library (mandatory attribute)<br>Remote: name of target service on the remote server (mandatory attribute) |
| server | string | Local: local library that contains the target function (mandatory attribute)<br>Remote: name of server object defined in the I3ML (mandatory attribute) |
| blockgui | boolean | Whether or not application should allow user interaction with the GUI |
| interval | integer | Whether or not function should repeat |
| onfail | string | Name of action to be executed if current action fails0 |
| method | enumeration of (I3ML, soap, get, post) | Method of communication |
| soapaction | string | routing (applicable only if method is 'soap') |
| soapservice | string | (applicable only if method is 'soap') |
| uri | string | namespace (applicable only if method is 'soap') |

FIG.4a

```
<III>
 <insert>
    <action name=addremotely/server=server1
            target=/soap/soapadd.asp^soapservice="add"
            soapaction=http://localhost/soap/soapadd:asp#add
            uri=http://localhost/soap/ blockgui=false"interval="
            onfail="failedaction"method="soap">
      <send from="editbox1"property="text"to="param1"
            attributes="xsi:type=xsd:string"/>
      <send from="editbox2"property="text"to="param2"
            attributes="xsi:type='xsd:string'"/>
      <send constant="add"to="name"attributes="xsi:type='xsd:string'"/>
      <send from="editbox2"property="text"to="param2"
      <receive:from="receive"to="editbox3"/>
    </action>
 </insert>
</iii>
```

FIG.4b

```
<iii>
 </insert>
    <action name="addlocally"server="local math"target="add"
            blockgui="false"interval=""onfail=""method="I3ML">
      <send from="editbox1" property="text" to="param1"/>
      <send from="editbox2" property="text" to="param2"/>
      <receive from="receive" to="editbox3"/>
    </object>
 </insert>
</iii>
```

```
<iii>
 <insert>
      <object name="I3MLform1" class="window">
         <property name="borderstyle" value="sizeable"/>
      </object>
      <object name="editbox1" parent="I3MLform1" class="editbox">
         <property name="width" value="121"/>
      </object>
 </insert>
</iii>
```

FIG.4d bulkinsert

| Attribute Name | Value Type | Remarks |
| --- | --- | --- |
| Format | Enumeration (keyed, nonkeyed) | Needs to be specified in the case of grid and tree controls only |

FIG.4e

```
<iii>
 <update>
  <object name="trtree" class="tree" parent="l3MLform1">
   <data>
    <bulkinsert,format="keyed">
       3Root3
       4Root4
       1,5, Child1a
       1,6, Child1b
       2,7, Child2a
       2,8, Child2b
       3,9, Child3a
       4,10, Child4a
    </bulkinsert>
   </data>
  </object>
 </update>
</iii>
``` chunk

| Attribute Name | Value Type | Remarks |
|---|---|---|
| name | string | Name of chunk object |
| contenttype | I3ML or file | |

FIG.4h

```
<iii>
  <insert>  <filename="loginI3ML" server="served"
hostfilename="/player/login.iii"
            preload="true/>"
         <action name="showwindow" target="applychunk"
server="local process"
            method="I3ML">
                    send constant="filechunk" to="name"/>
         </action>
   <chunk name="filechunk" contenttype="file">
      <content>
                                                  loginI3ML
                    </content>
   </chunk>
  </insert>
</iii>
```

FIG.4i

```
<iii>
  <insert>
    <chunk name="showchunk1" contenttype="I3ML">
     <content>
                                        <iii>
                                                        <update>
      <object name="window1" class="window">
      <property name="color" value="{color1}"/>
            </object>
                                                        </update>
                                           </iii>
                         </content>
    </chunk>
  </insert>
</iii>
```

FIG.4j

*column*

| Attribute Name | Value Type | Remarks |
|---|---|---|
| name | string | |
| direction | string | specified only when *column* tag is used within *sort* tag |

FIG.4k

```
<object name="ggrid" parent="I3MLform1" class="grid">
    <column name="first">
        <property name="editable" value="true"/>
        <property name="colwidth" value="100"/>
        <property name="caption" value="name"/>
    </column>
    <data>
        <insertitem>
            <property name="itemid" value="1"/>
                <column name="first">
                <property name="itemtext" value="Sally"/>
            </column>
        </insertitem>
    </data>
    <sort>
        <column name="first" direction="ascending"/>
        <column name="second" direction="descending"/>
        <column name="third" direction="ascending"/>
    </sort>
</object>
```

FIG.4l

*content*

Attributes
    (none)

```
<iii>
  <insert>
    <chunk name="deleteeditbox" contenttype="I3ML">
      <content>
                                              <iii>
                                                    <delete>
      <object name="editbox1" class="editbox">
      </object>
                                                    </delete>
                                              </iii>
      </content>
    </chunk>
  </insert>
</iii>
```

FIG.4m

*data*

Attributes
    (none)

```
<iii>
  <insert>
    <object>
      <data>
        <insertitem>
          <property name="itemid" value="1"/>
          <property name="itemtext" value="root1"/>
        </insertitem>
        <insertitem>
          <property name="itemid" value="2"/>
          <property name="itemtext" value="root2"/>
        </insertitem>
        <insertitem parentid="1">
          <property name="itemid" value="3"/>
          <property name="itemtext" value="child11"/>
        </insertitem>
        <insertitem parentid="3">
          <property name="itemid" value="4"/>
          <property name="itemtext" value="child12"/>
        </insertitem>
      </data>
    </object>
  </insert>
</iii>
```

FIG.4n

*delete*

Attributes
    (none)

```
<delete>
<object name="editbox1"/>
</delete>
```

FIG.4o

*deletecolumn*

| Attribute Name | Value Type | Remarks |
|---|---|---|
| name | string | Name of column |

FIG.4p

```
<update>
    <object name="samplegrid" parent="I3MLform1" class="grid">
        <deletecolumn name="col5"/>
    </object>
</update>
```

FIG.4q

*deleteitem*

| Attribute Name | Value Type | Remarks |
|---|---|---|
| itemid | string | itemid of parent |
| itempath | string | path of parent |

FIG.4r

```
<update>
    <object name="grdgrid" parent="I3MLform1" class="grid">

<data>

<deleteitem>
                <property name="itemid" value="1"/>
            </deleteitem>

</data>
    </object>
</update>
```

FIG.4s file

| Attribute Name | Value Type | Remarks |
|---|---|---|
| name | string | |
| server | string | Name of server object |
| preload | boolean | |
| hostfilename | string | Name and location of file on the server |

FIG.4t

```
<file name="imagefile1" server="s1"
    hostfilename="player"I3MLplayer/setup.bmp"
            preload="true">
</file>
```

FIG.4u group

| Attribute Name | Value Type | Remarks |
|---|---|---|
| name | string | |
| process | string | Parallel or sequential |
| onfail | string | Name of alternative action object |
| interval | string | Whether or not the function is periodic. If this attribute has a negative value, then the action is non-periodic. |

FIG.4v

```
<group name="agroup1" process="parallel" onfail="failedaction">
   <member name="addlocally"/>
   <member name="addrepeat"/>
</group>
```

FIG.4w

```
<group name="agroup2" process="sequential">
   <member name="addlocally"/>
   <member name="addrepeat"/>
</group>
```

FIG.4x

```
<group name="agrouptotal" process="sequential">
   <member name="agroup1"/>
   <member name="agroup2"/>
</group>
```

FIG.4y

*header*

| Attribute Name | Value Type | Remarks |
|---|---|---|
| name | string | |
| author | string | |
| version | string | Version of I3ML file |
| email | string | E-mail ID of the author |
| url | string | |
| comment | string | |

FIG.4z

```
<iii>
   <insert>
      <header name="Header" version="1.2" author="Smith"
            email="smith@email.com" url="www.I3MLAp.com"
            comment="Debug">
      </header>
   <insert>
</iii>
```

| Attribute Name | Value Type | Remarks |
|---|---|---|
| object1 | string | object name |
| property1 | string, number | |
| operator | enumeration(eq, lt, gt, le, ge, ne, cin, in, ceq, cne) | |
| object2 | | object name |
| property2 | string, number | |
| then | string | action name |
| else | string | action name |
| constant1 | string | Any string value |
| constant2 | string | Any string value |

FIG.4bb

```
<if object1="edit1" property1="text" operator="if" object2="edit2"
property2="text" then="action1" else="action2"/>
```

FIG.4cc

```
<if constant1="8" operator="lt" constant2="6" then="action1"
else="action2"/>
```

FIG.4dd

List of Operators

| Value | Functionality |
|---|---|
| eq | Checks whether or not the values of 'parameter1' and 'parameter2' are equal to each other. This operator ignores case while comparing the two values. |
| lt | Checks whether or not the value of 'parameter1' is less than the value of 'parameter2'. |
| gt | Checks whether or not the value of 'parameter1' is greater than the value of 'parameter2'. |
| le | Checks whether or not the value of 'parameter1" is less than or equal to the value of 'parameter2'. |
| ge | Checks whether or not the value of 'parameter1' is greater than or equal to the value of 'parameter2'. |
| ne | Checks whether or not the the value of 'parameter1' is unequal to the value of 'parameter2'. This operator ignores case while comparing the two values. |
| cin | Checks whether or not the value specified for 'parameter1' is present in the string specified as 'parameter2'. This operator is case sensitive. |
| in | Checks whether or not the value specified for 'parameter1' is present in the string specified as 'parameter2'. This operator ignores case while comparing the two values. |
| ceq | Checks whether or not the values of 'parameter1' and 'parameter2' are equal to each other. This operator is case sensitive. |
| cne | Checks whether or not the value of 'parameter1' is unequal to the value of 'parameter2'. This operator is case sensitve. |
| ni | Checks whether or not the value specified for 'parameter1' is not present in the string specified as 'parameter2'. This operator ignores case while comparing the two values. |
| cni | Checks whether or not the value specified for 'parameter1' is not present in the string specified as 'parameter2'. This operator is case sensitive. |

FIG.4ee insert

Attributes
    (none)

```
<insert>
  <object name="l3MLform1" class="window">
      <property name="borderstyle" value="bssizeable"/>
  </object>
  <object name="editbox1" class="editbox" parent="l3MLform1">
      <property name="Width" value="100"/>

</object>
  <action name="addlocally" server="local math" target="add"
              blockgui="false" interval="" onfail="failact1"
              method="l3ML"/>
      <send from="editbox1" property="text" to="param1"/>
      <send from="editbox2" property="text" to="param2"/>
      <receive from="receive" to="editbox3"/>
  </action>
  <action name="subtractlocally" server="local math" target="subtract"
              blockgui="false" interval="" onfail="failact2"
              method="l3ML"/>
      <send from="editbox1" property="text" to="param1"/>
      <send from="editbox2" property="text" to="param2"/>
      <receive from="receive" to="editbox3"/>
  </action>
  <group name="agroup1" process="parallel" onfail="failactpar">
      <member name="addlocally"/>
      <member name="subtractlocally"/>
  </group>
</insert>
```

FIG.4ff insertitem

| Attribute Name | Value Type | Remarks |
|---|---|---|
| parentid | string | itemid of parent |
| parentpath | string | path of parent |

FIG.4gg

```
<insertitem>
    <property name="itemid" value="1"/>
    <property name="itemtext" value="Root1"/>
</insertitem>
<insertitem parentid="1">
        <property name="itemid" value="2"/>
        <property name="itemtext" value="Child11"/>
        <property name="fontcolor" value="0000FF"/>
</insertitem>
```

FIG.4hh

```
<insertitem>
        <property name="itemid" value="1"/>
        <property name="itemtext" value="1"/>
</insertitem>
<insertitem parentpath="1">
        <property name="itemid" value="2"/>
        <property name="itemtext" value="2"/>
</insertitem>
<insertitem parentpath="1\2">
        <property name="itemid" value="3"/>
        <property name="itemtext" value="3"/>
</insertitem>
<insertitem parentpath="1\2\3">
        <property name="itemid" value="4"/>
        <property name="itemtext" value="4"/>
<insertitem parentpath="1\2\3\4">
        <property name="itemid" value="5"/>
        <property name="itemtext" value="5"/>
</insertitem>
```

FIG.4ii

```
<insertitem>
    <property name="parentpath" value="1\2\3\4">
    <property name="itemid" value="5"/>
    <property name="itemtext" value="5"/>
</insertitem>
```

_member_

| Attribute Name | Value Type |
|---|---|
| name | string |

```
<group name="agroup1" process="parallel" onfail="failactpar">
    <member name="addlocally"/>
    <member name="subtractlocally"/>
</group>
```

| method | | |
|---|---|---|
| Attribute Name | Value Type | Remarks |
| name | string | |
| value | string | Name of action object |

FIG.4nn

```
<object name="button3" parent="I3MLform1" class="button">
        <property name="caption" value="local add"/>
        <method name="left click" value="addlocally"/>
</object>
```

FIG.4oo object

| Attribute Name | Value Type | Remarks |
|---|---|---|
| name | string | |
| class | string | object type |
| parent | string | Name of parent object |

FIG.4pp

```
<object name="I3MLform1" class="window">
    <property name="caption" value="window"/>
    <property name="height" value="400"/>
    <property name="top" value="100"/>
    <property name="visible" value="true"/>
    <property name="width" value="500"/>
</object>
```

FIG.4qq

```
<object name="groupbox1" parent="I3MLform1" class="groupbox">
    <property name="height" value="100"/>
    <property name="left" value="100"/>
    <property name="top" value="100"/>
    <property name="width" value="500"/>
    <property name="caption" value="group"/>
</object>
```

FIG.4rr

```
<object name="editbox1" parent="groupbox1" class="editbox">
    <property name="height" value="20"/>
    <property name="left" value="5"/>
    <property name="top" value="5"/>
    <property name="width" value="80"/>
</object>
```

FIG.4ss

| property | |
|---|---|
| Attribute Name | Value Type |
| name | string |
| value | string |

FIG.4tt

```
<object name="edit1" class="editbox">
   <property name="fontunderline" value="false"/>
   <property name="left" value="32"/>
   <property name="top" value="27"/>
   <property name="visible" value="true"/>
   <property name="width" value="121"/>
   <property name="tabstop" value="true"/>
</object>
```

FIG.4uu

| receive | | |
|---|---|---|
| Attribute Name | Value Type | Remarks |
| from | string | Server variable (optional if the 'constant' attribute has been specified) |
| to | string | Object name (optional if the 'constant' attribute has been specified) |
| property | string | Object property (optional) |
| attributes | string | |

FIG.4vv

```
<action name="multiplyremotely" server="server1" blockgui="false"
          target="soapmultiply asp" interval="" onfail=""
          method="soap">
   <send from="editbox1" property="text" to="param1"/>
   <send constant="3" to="param2"/>
   <send constant="multiply to="name"/>
   <receive from="receive" to="editbox2"/>
</action>
```

FIG.4ww send

| Attribute Name | Value Type | Remarks |
|---|---|---|
| from | string | Object name (optional if the 'constant' attribute has been specified) |
| to | string | Object name (optional if the 'constant' attribute has been specified) |
| constant | string | Specified at design time. |
| property | string | Property name |
| attributes | string | |

FIG.4xx

```
<action name="multiplyremotely" server="server1" blockgui="false"
        target="soapmultiply.asp" interval="" onfail="failactm"
        method="soap">
  <send from="editbox1" property="text" to="param1"/>
  <send constant="3" to="param2"/>
  <send constant="multiply" to="name"/>
  <receive from="receive" to="editbox2"/>
</action>
```

FIG.4yy server

| Attribute Name | Value Type | Remarks |
|---|---|---|
| name | string | |
| protocol | string | Communication protocol |
| host | string | Dotted host name |
| port | integer | Port number |
| userid | string | |
| token | string | |
| expire | string | Time duration |

FIG.4zz

```
<server name="server1" host="localhost" port="80" protocol="http"
        userid="l3MLuser" token="" expire="never"/>
```

FIG.4aaa

```
<server name="server2" host="l3MLserver" port="80" protocol="http"
        userid="l3MLuser" token="" expire="never"/>
```

FIG.4bbb

```
<server name="server2" host="123.123.1.1" port="80" protocol="http"
        userid="l3MLuser" token="" expire="never"/>
```

FIG.4ccc

```
<server name="server2" host="www.I3MLServer.com" port="80"
        protocol="http" userid="I3MLuser" token=""
        expire="never"/>
```

FIG.4ddd

_sort_

Attributes
   (none)

```
<object name="grid1" parent="I3MLform1" class="grid"/>
   <sort>
         <column name="column1" direction="ascending">
         <column name="column2" direction="descending">
   </sort>
</object>
```

FIG.4eee

_update_

Attributes
   (none)

```
<update>
   <object name="editbox3">
       <property name="text" value="updated"/>
   </object>
   <object name="editbox4">
                <property name="color" value="00FF00"/>
   </object>
</update>
```

FIG.4fff

*updateitem*

| Attribute Name | Value Type | Remarks |
|---|---|---|
| parentid | string | itemid of the parent |
| parentpath | string | Path of the parent |

FIG.4ggg

```
<updateitem>
    <property name="itemid" value="1"/>
    <property name="fontcolor" value="FF0000"/>
</updateitem>
```

FIG.4hhh

*button*

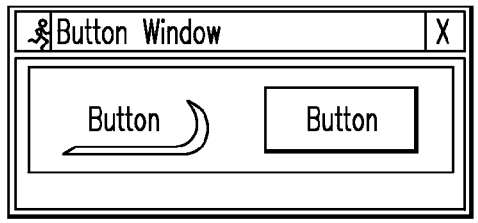

List of Properties:

| | | |
|---|---|---|
| ambientlight* | fontunderline | pictureup |
| caption | height | round* |
| class | helptext | spotintensity* |
| color* | hint | spotsize* |
| defaultbutton | horizontalalignment | taborder |
| enabled | horizontalangle* | tabstop |
| externalradius* | imageoffset | top |
| fontbold | internalradius* | verticalalignment |
| fontcolor | left | verticalangle* |
| fontitalic | lightdiffusion* | visible |
| fontname | name | width |
| fontsize | parent | |
| fontstrikeout | picturemouseover | |

List of Events:

| | | |
|---|---|---|
| doubleclick | mouseexit | F6 |
| leftclick | enterkey | F7 |
| middleclick | F1 | F8 |
| rightclick | F2 | F9 |
| losefocus | F3 | F10 |
| getfocus | F4 | F11 |
| mouseenter | F5 | F12 |

FIG.5a

```
object name="btnbutton" parent="l3MLform1" class="button">
    <property name="fontcolor" value="000000"/>
    <property name="fontname" value="ms sans senf"/>
    <property name="fontsize" value="10"/>
    <property name="fontstrikeout" value="false"/>
    <property name="height" value="35"/>
    <property name="left" value="5"/>
    <property name="top" value="5"/>
    <property name="width" value="90"/>
    <property name="tabstop" value="true"/>
    <property name="taborder" value="1"/>
    <property name="hint" value="This is a Button"/>
    <property name="caption" value="button"/>
    <method name="leftclick" value="leftclickaction"/>
</object>
```

FIG.5a-1

_check_

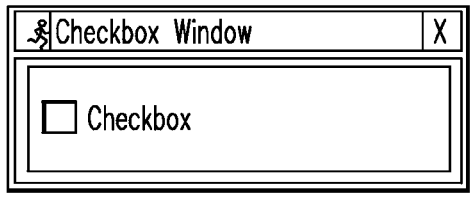

List of Properties:

| | | |
|---|---|---|
| 3d | fontitalic | name |
| 3state | fontname | parent |
| caption | fontsize | taborder |
| checked | fontstrikeout | tabstop |
| class | fontunderline | textalignment |
| color | height | textposition |
| enabled | helptext | top |
| fontbold | hint | visible |
| fontcolor | left | width |
| | visible | |

List of Events:

| | | |
|---|---|---|
| doubleclick | mouseexit | F6 |
| leftclick | enterkey | F7 |
| middleclick | F1 | F8 |
| rightclick | F2 | F9 |
| losefocus | F3 | F10 |
| getfocus | F4 | F11 |
| mouseenter | F5 | F12 |

FIG.5b

```
object name="chkcheck" parent="I3MLform1" class="check">
    <property name="fontcolor" value="000000"/>
    <property name="color" value="D4D0C8"/>
    <property name="fontname" value="arral"/>
    <property name="height" value="35"/>
    <property name="left" value="5"/>
    <property name="top" value="5"/>
    <property name="tabstop" value="true"/>
    <property name="taborder" value="1"/>
    <property name="width" value="100"/>
    <property name="hint" value="This is a CheckBox"/>
    <property name="caption" value="checkbox"/>
    <method name="F1" value="f1action"/>
</object>
```

FIG.5b-1

Datetimepicker with calendar
Datetimepicker with spin arrows

List of Properties:

| | | |
|---|---|---|
| class | headercolor | parent |
| enabled | headerfontcolor | style |
| fontbold | height | taborder |
| fontitalic | helptext | tabstop |
| fontname | hint | text |
| fontsize | left | top |
| fontstrikeout | maximumdate | trailingtextcolor |
| fontunderline | minimumdate | visible |
| format | name | width |

List of Events:

| | | |
|---|---|---|
| leftclick | uparrow | F5 |
| middleclick | downarrow | F6 |
| rightclick | leftarrow | F7 |
| losefocus | rightarrow | F8 |
| getfocus | F1 | F9 |
| mouseenter | F2 | F10 |
| mouseexit | F3 | F11 |
| enterkey | F4 | F12 |

```
<object name="dtpdtp" parent="l3MLform1" class="datetimepicker">
<property name="left" value="5"/>
<property name="top" value="5"/>
<property name="width" value="100"/>
<property name="height" value="20"/>
<property name="hint" value="This is a Date Time Picker."/>
<property name="taborder" value="1"/>
<property name="fontcolor" value="000000"/>
          <property name="headercolor" value="ff0000"/>
          <property name="headerfontcolor" value="0000ff"/>
          <property name="maximumdate" value="31/7/2020"/>
          <property name="minimumdate" value="1/8/1920"/>
          <property name="text" value="23/12/2001"/>
          <property name="format" value="dd,dddd,MMMM,yyyy"/>
</object>
```

FIG.5c-1

*dropdown*

```
<insertitem>
    <property name="itemid" value="1"/>
    <property name="itemtext" value="item1"/>
    <property name="fontname" value="arial"/>
    <property name="fontsize" value="10"/>
</insertitem>
<insertitem>
    <property name="itemid" value="2"/>
    <property name="itemtext" value="item2"/>
    <property name="fontcolor" value="ffcc00"/>
    <property name="fontbold" value="true"/>
</insertitem>
</data>
<method name="selchange" value="changeaction"/>
</object>
```

FIG.5d

*editbox*
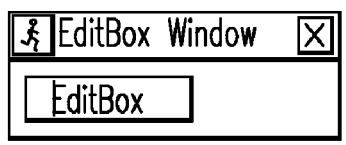
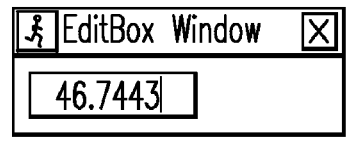
Edit box without inputmask
    Edit box with inputmask
List of Properties:
    class                helptext              scroll
    color                hint                  taborder
    enabled            inputmask           tabstop
    fontbold           insertmode           text
FIG.5e

| | | |
|---|---|---|
| fontcolor | left | textalignment |
| fontitalic | maxlength | textcase |
| fontname | name | textoperation |
| fontsize | parent | top |
| fontstrikeout | password | visible |
| fontunderline | prompt | width |
| height | readonly | |

ListofEvents:

| | | |
|---|---|---|
| doubleclick | uparrow | F6 |
| leftclick | downarrow | F7 |
| middleclick | leftarrow | F8 |
| rightclick | rightclick | F9 |
| losefocus | F1 | F10 |
| getfocus | F2 | F11 |
| mouseenter | F3 | F12 |
| mouseexit | F4 | |
| enterkey | F5 | |

```
<object name="txteditbox" parent="I3MLform1"class="editbox">
    <property name="height" value="24"/>
    <property name="left" value="5"/>
    <property name="top" value="5"/>
    <property name="width" value="80"/>
    <property name="tabstop" value="true"/>
    <property name="taborder" value="1"/>
    <property name="fontcolor" value="000000"/>
    <property name="fontname" value="arial"/>
    <property name="fontsize" value="10"/>
    <property name="inputmask" value="######"/>
</object>
```

FIG.5e-1

*grid*

| Grid Window | | |
|---|---|---|
| Name | City | State |
| Barbara | Phoenix | AZ |
| Jim | Phoenix | AZ |
| Sally | Syracuse | NY |

List of Properties:

| | | |
|---|---|---|
| allitemidsi3ml' | fontasme | rowresize |

FIG.5f

| | | |
|---|---|---|
| allitemsi3ml' | fontsize | rowselect |
| borderstyle | fontstrikeout | scrollbars |
| caption-* | fontunderline | selected* |
| celltype - | gridlinecolor | selectedindex* |
| class | gridlines | selecteditem' |
| clearselected | height | selecteditemi3ml' |
| clicktosort- | itemid* | selecteditemid' |
| colheader | itemtext*- | selecteditemidi3ml' |
| colnum | itempath* | selectedrowi3ml' |
| colresize | left | taborder |
| colswap | multiselect | tabstop |
| colwidth- | name | top |
| color^ | newselectedi3ml' | textalignment- |
| editable- | oldselectedi3ml' | visible |
| enabled | parent | width |
| fontbold | rowheader | |
| fontcolor | rowheight | |
| fontitalic | rownum | |

List of Events:

| | | |
|---|---|---|
| doubleclick | F1 | F8 |
| leftclick | F2 | F9 |
| rightclick | F3 | F10 |
| losefocus | F4 | F11 |
| getfocus | F5 | F12 |
| selchange | F6 | |
| enterkey | F7 | |

```
<object name="ggnd" parent="I3MLformL"class="grid">
    <property name="left" value="5"/>
    <property name="top" value="5"/>
    <property name="width" value="250"/>
    <property name="height" value="80"/>
    <property name="rownum" value="3"/>
    <property name="colnum" value="3"/>
    <property name="rowheader" value="false"/>
        <column name"first"/>
            <property name="editanle" value="true"/>
            <property name="colwidth" value="100"/>
            <property name="caption" value="name"/>
        </column>
        </column name="second"
            <property name="colwidth"value="100"/>
                <property name="caption"value="city"/>
        </column>
        </column name="third"
                <property name="colwidth"value="50"/>
```

FIG.5f-1

```xml
        <property name="caption" value="state"/>
        <property name="celtype" value="dropdown"/>
    </column>
    <data>
        <insertitem>
            <property name="itemid" value="1"/>
                <column name="first">
                    <property name="itemtext" value="Sally"/>
                </column>
                <column name="second">
                    <property name="itemtext" value="Syracuse"/>
                </column>
                <column name="third">
                    <property name="itemtext" value="AZ,NY,WA"/>
                    <property name="selectedindex" value="1"/>
                </column>
        </insertitem>
        <insertitem>
            <property name="itemid" value="2"/>
                <column name="first">
                    <property name="itemtext" value="Jim"/>
                </column>
                <column name="second">
                    <property name="itemtext" value="Phoenix"/>
                </column>
                <column name="third">
                    <property name="itemtext" value="AZ,NY,WA"/>
                    <property name="selectedindex" value="0"/>
                </column>
        </insertitem>
    </data>
    <sort>
        <column name="first" direction="ascending"/>
        <column name="second" direction="descending"/>
        <column name="third" direction="ascendinding"/>
    </sort>
</object>
```

FIG.5f-2 groupbox

List of Properties:

| | | |
|---|---|---|
| caption | fontitalic | left |
| class | fontname | name |
| color | fontsize | parent |
| enabled | fontstrikeout | top |
| fontbold | fontunderline | visible |
| fontcolor | height | width |

Example I3ML:

```
<object name="ggroupbox" parent="I3MLform1"class="groupbox">
    <property name="left" value="5"/>
    <property name="top" value="5"/>
    <property name="width" value="250"/>
    <property name="height" value="80"/>
    <property name="color" value="D4D0C8"/>
    <property name="fontcolor" value="000000"/>
    <property name="fontname" value="ms sans senf"/>
    <property name="fontsize" value="8"/>
    <property name="fontbold" value="false"/>
    <property name="fontitalic" value="false"/>
    <property name="fontstikeout" value="false"/>
    <property name="fontunderline" value="false"/>
    <property name="visible" value="true"/>
    <property name="caption" value="groupbox"/>
</object>
```

FIG.5g

*label*

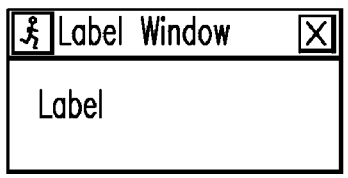

List of Properties
    caption                    fontsize                  name
    class                      fontstrikeout            parent
    color                      fontunderline          textalignment
    fontbold                 height                    top
    fontcolor               helptext                visible
    fontitalic              hint                      width
    fontname              left List of Events:
    leftclick               middleclick             mouseenter
    rightclick             doubleclick             mouseexit

```
<object name="label1" parent="I3MLform1"class="label">
    <property name="left" value="30"/>
    <property name="width" value="130"/>
    <property name="height" value="30"/>
    <property name="top" value="30"/>
    <property name="caption" value="Label"/>
    <property name="color" value="0000tf"/>
    <property name="fontitalic" value="true"/>
    <property name="fontsize" value="14"/>
    <property name="fontcolor" value="ff0000"/>
</object>
```

FIG.5h

| listbox |

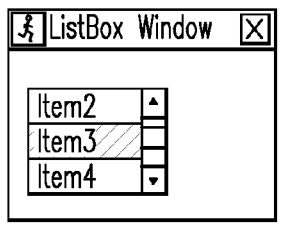

List of Properties:

| | | |
|---|---|---|
| allitemidsi3ml' | fontunderline* | parent |
| allitemsi3ml' | height | selected |
| class | helptext | selecteditem' |
| clearselected | hint | selecteditemi3ml' |
| color | itemid* | selecteditemid' |
| enabled | itempath* | selecteditemidi3ml |
| fontbold* | itemtext* | sorted |
| fontcolor* | left | taborder |
| fontitalic* | multiselect | tabstop |
| fontname* | name | top |
| fontsize* | newselectedi3ml | visible |
| fontstrikeout* | oldselectedi3ml | width |

List of Events:

| | | |
|---|---|---|
| leftclick | downarrow | F6 |
| rightclick | leftarrow | F7 |
| middleclick | rightarrow | F8 |
| doubleclick | F1 | F9 |
| getfocus | F2 | F10 |
| losefocus | F3 | F11 |
| enterkey | F4 | F12 |
| uparrow | F5 | selchange |

```
<object name="listbox" parent="I3MLform" class="listbox">
    <property name="color" value="FFFFFF"/>
    <property name="height" value="60"/>
    <property name="left" value="10"/>
    <property name="top" value="20"/>
    <property name="visible" value="True"/>
    <property name="width" value="100"/>
    <property name="tabstop" value="True"/>
    <property name="taborder" value="1"/>
    <property name="enabled" value="true"/>
    <property name="multiselect" value="true"/>
    <data>
```

FIG.5i

```
<insertitem>
    <property name="itemid" value="1"/>
    <property name="itemtext" value="item1"/>
    <property name="fontname" value="arial"/>
</insertitem>
<insertitem>
    <property name="itemid" value="2"/>
    <property name="itemtext" value="item2"/>
    <property name="fontname" value="arial"/>
</insertitem>
<insertitem>
    <property name="itemid" value="3"/>
    <property name="itemtext" value="item3"/>
    <property name="fontitalic" value="true"/>
</insertitem>
<insertitem>
    <property name="itemid" value="4"/>
    <property name="itemtext" value="item4"/>
    <property name="fontbold" value="true"/>
</insertitem>
</data>
</object>
```

FIG.5i-1

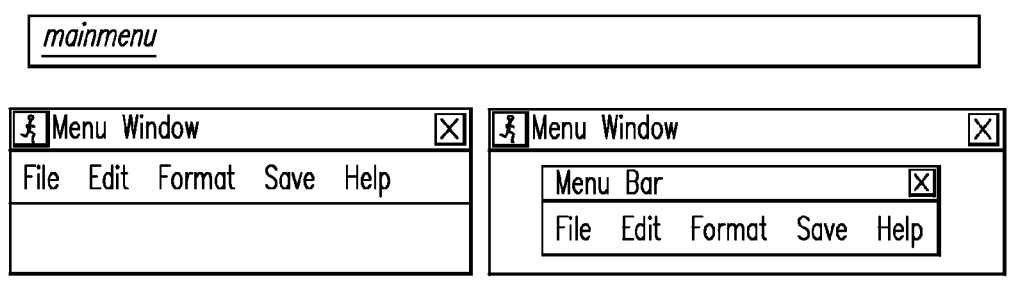

List of Properties:

| | | |
|---|---|---|
| allitemsi3ml | enabled | parent |
| allitemidsi3ml | helptext | selecteditemi3ml |
| caption | left | selecteditemidi3ml |
| class | name | top |
| dockedposition | movable | visible |

`<object name="mmenu" parent="wmenuwindow" class="mainmenu">`

FIG.5j

```
<property name="left" value="0"/>
<property name="top" value="0"/>
<property name="movable" value="true"/>
<property name="visible" value="true"/>
<property name="enabled" value="true"/>
<property name="helptext" value="This is the Main Menu"/>
<property name="dockedposition" value="left"/>
<property name="caption" value="menubar"/>
</object>
```

FIG.5j-1

*memo*

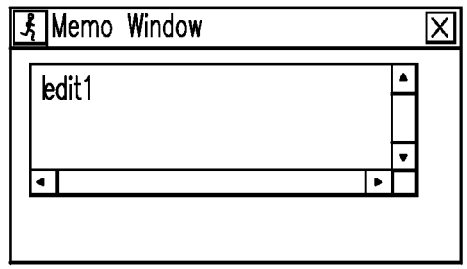

List of Propreties:

| class | height | tabstop |
| color | helptext | text |
| enabled | hint | textalignment |
| fontbold | left | textcase |
| fontcolor | maxlength | textoperation |
| fontitalic | name | top |
| fontname | parent | visible |
| fontsize | readonly | wanrreturns |
| fontstrikeout | scrollbars | width |
| fontunderline | taborder | wordwrap |

List of Events:

| leftclick | uparrow | F6 |
| rightclick | downarrow | F7 |
| middleclick | leftarrow | F8 |
| doubleclick | rightarrow | F9 |
| mouseenter | F1 | F10 |
| mouseexit | F2 | F11 |
| getfocus | F3 | F12 |
| losefocus | F4 | |
| enterkey | F5 | |

FIG.5k

```
<object name="edit1" parent="I3ML_form1"class="memo">
    <property name="color" value="ffffff"/>
    <property name="enabled" value="true"/>
    <property name="fontcolor" value="000000"/>
    <property name="fontname" value="times new roman"/>
    <property name="fontsize" value="12"/>
    <property name="fontbold" value="false"/>
            <property name="fontitalic" value="false"/>
            <property name="fontunderline" value="false"/>
            <property name="fontstrikeout" value="false"/>
            <property name="height" value="75"/>
            <property name="helptext" value="memo demo"/>
            <property name="hint" value="memo demo"/>
            <property name="left" value="231"/>
            <property name="tabstop" value="true"/>
            <property name="taborder" value="20"/>
            <property name="top" value="20"/>
            <property name="visible" value="true"/>
            <property name="width" value="250"/>
            <property name="wordwrap" value="false"/>
            <property name="readonly" value="true"/>
            <property name="scrollbars" value="both"/>
            <property name="wantreturns" value="true"/>
            <property name="text" value="edit"/>
            <property name="textoperation" value="replace"/>
            <property name="maxstrength" value="0"/>
            <property name="textallignment" value="left"/>
            <property name="textcase" value="mixed"/>
</object>
```

FIG.5k-1

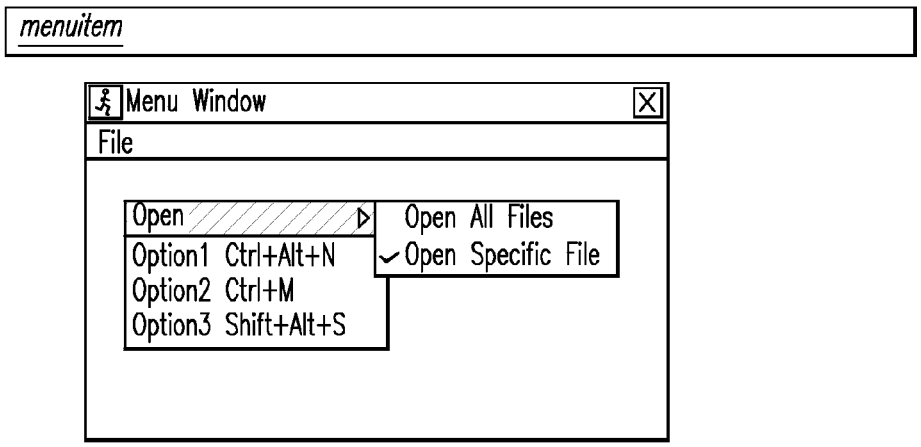

List of Properties:
  accelerator          class          parent

FIG.5l altkey     controlkey     shiftkey
caption    enabled
checked    name
List of Events:
leftclick Example I3ML:

```
<object name="file" parent="mmenu"class="menuitem">
        <property name="caption" value="& File"/>
        <property name="checked" value="false"/>
        <property name="enabled" value="true"/>
</object>
<object name="fileopen" parent="fileopen"class="menuitem">
        <property name="caption" value="Open"/>
        <property name="checked" value="false"/>
        <property name="enabled" value="true"/>
</object>
<object name="fileopen1" parent="fileopen"class="menuitem">
        <property name="caption" value="Open All Files"/>
        <property name="checked" value="false"/>
        <property name="enabled" value="true"/>
</object>
<object name="fileopen2" parent="fileopen"class="menuitem">
         <property name="caption" value="Open Specific File"/>
        <property name="checked" value="true"/>
        <property name="enabled" value="true"/>
</object>
<object name="option1" parent="file"class="menuitem">
        <property name="caption" value="Option1"/>
        <property name="checked" value="false"/>
        <property name="enabled" value="false"/>
        <property name="fontcolor" value="ffffff"/>
        <property name="accelerator" value="n"/>
        <property name="controlkey" value="true"/>
        <property name="altkey" value="n"/>
        <method name="leftclick" value="option1"/>
</object>
```

FIG.5I-1

*numericedit*

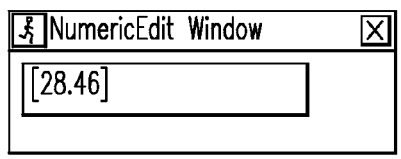

FIG.5m

List of Properties:
| | | |
|---|---|---|
| class | fontunderline | parent |
| color | groupseparator | positiveformat |
| decimalgroups | height | readonly |
| decimalplaces | helptext | scroll |
| decilmalseparator | hint | taborder |
| enabled | inputmask | tabstop |
| fontbold | leadingzero | text |
| fontcolor | left | textalignment |
| fontitalic | maxdigits | top |
| fontname | name | visible |
| fantsize | negativecolor | width |
| fontstrikeout | negativeformat | |

List of Events:
| | | |
|---|---|---|
| leftclick | leftarrow | F6 |
| rightclick | rightarrow | F7 |
| middleclick | uparrow | F8 |
| doubleclick | downarrow | F9 |
| mouseenter | F1 | F10 |
| mouseexit | F2 | F11 |
| getfocus | F3 | F12 |
| losefocus | F4 | |
| enterkey | F5 | |

```
<object name="numedit1" parent="I3MLform1" class="numericedit">
    <property name="left" value="10"/>
    <property name="top" value="10"/>
    <property name="width" value="150"/>
    <property name="height" value="50"/>
    <property name="text" value="28.456"/>
    <property name="visible" value="true"/>
    <property name="negativecolor" value="ff0000"/>
    <property name="inputmask" value="#"/>
    <property name="leadingzero" value="false"/>
    <property name="maxdigits" value="8"/>
    <property name="positiveformat" value="[1.1]"/>
    <property name="negativeformat" value="1.1"/>
</object>
```

FIG.5m-1

*panel*

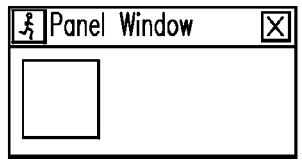

List of Properties:

| | | |
|---|---|---|
| borderstyle | height | hint |
| class | top | left |
| color | visible | name |
| enabled | width | parent |

List of Events:
    mouseenter            mouseexit

```
<object name="pnlsimple" parent="I3MLform1" class="panel">
    <property name="height" value="50"/>
    <property name="left" value="5"/>
    <property name="top" value="5"/>
    <property name="visible" value="true"/>
    <property name="width" value="50"/>
    <property name="color" value="D4D0C8"/>
</object>
```

FIG.5n

*panel*

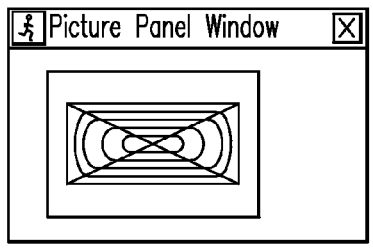

List of Properties:

| | | |
|---|---|---|
| alignment | left | taborder |
| class | parent | tabstop |
| enabled | picturemouseover | top |
| height | pictureup | visible |
| helptext | name | width |
| hint | stretch | |

FIG.5o

List of Events:

| | | |
|---|---|---|
| leftclick | uparrow | F6 |
| rightclick | downarrow | F7 |
| middleclick | leftarrow | F8 |
| doubleclick | rightarrow | F9 |
| mouseenter | F1 | F10 |
| mouseexit | F2 | F11 |
| ongetfocus | F3 | F12 |
| onlosefocus | F4 | |
| enterkey | F5 | |

```
<object name="image1" parent="l3MLform1" class="picturepanel">
    <property name="left" value="20"/>
    <property name="top" value="10"/>
    <property name="height" value="150"/>
    <property name="width" value="150"/>
    <property name="enabled" value="true"/>
        <property name="visible" value="true"/>
        <property name="tabstop" value="true"/>
        <property name="taborder" value="1"/>
        <property name="hint" value="bmp file, stretch=true"/>
        <property name="alignment" value="topright"/>
        <property name="stretch" value="true"/>
        <property name="color" value="0000ff"/>
        <property name="picturemouseover" value="imagefile2"/>
        <property name="pictureup" value="imagefile1"/>
</object>
```

FIG.5o-1

*player globalobj*

List of Properties:

Not applicable

List of Properties:

Not applicable

```
<update>
    <object name=" player_globalj">

<property name="multiselect" value="junk"/>

</object>
</update>
```

FIG.5p

*radio*

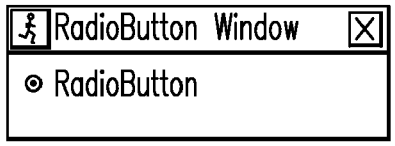

List of Properties:

| caption | fantsize | taborder |
| checked | fontstrikeout | tabstop |
| class | fontunderline | textalignment |
| color | height | textposition |
| enabled | helptext | top |
| fontbold | hint | visible |
| fontcolor | left | width |
| fontitalic | name | |
| fontname | parent | |

List of Events:

| leftclick | losefocus | F7 |
| rightclick | F1 | F8 |
| middleclick | F2 | F9 |
| doubleclick | F3 | F10 |
| mouseenter | F4 | F11 |
| mouseexit | F5 | F12 |
| getfocus | F6 | |

```
<object name="rdoradrobutton" parent="I3MLform1" class="radio">
    <property name="caption" value="radiobutton"/>
    <property name="height" value="20"/>
    <property name="color" value="D4D0C8"/>
    <property name="left" value="5"/>
    <property name="top" value="5"/>
    <property name="width" value="150"/>
    <property name="tabstop" value="true"/>
    <property name="taborder" value="1"/>
</object>
```

FIG.5q

| speedbar | | |
|---|---|---|
| List of Properties: | | |
| animateexpand | fontitalic | scrollingroup |
| autoexpand | fontname | showheaderdragimage |
| autoscroll | fontsize | showitemdragimage |
| boldexpandedgroup | fontstrikeout | taborder |
| class | fontunderline | tabstop |
| color | headerdragdrop | underlinehotitem |
| dragdrop | helptext | visible |
| enabled | left | width |
| fontbold | name | |
| fontcolor | parent | |

```
<object name="spbspeedbar" parent="I3MLform1" class="speedbar">
    <property name="left" value="0"/>
    <property name="width" value="130"/>
    <property name="showtemdragimage" value="true"/>
    <property name="headerdragdrop" value="false"/>
    <property name="dragdrop" value="false"/>
</object>
```

FIG.5r

| speedbargroup |
|---|

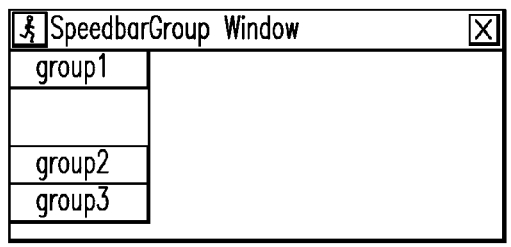

List of Properties:
| caption | fontitalic | headercolor |
|---|---|---|
| class | fontname | headerfontcolor |
| color | fontsize | name |
| fontbold | fontstrikeout | parent |
| fontcolor | fontunderline | selected |

Example I3ML:

```
<object name="group1" parent="speedbar1" class="speedbargroup">
    <property name="caption" value="group1"/>
    <property name="selected" value="true"/>
    <property name="headercolor" value="ffffff"/>
    <property name="fontname" value="times new roman"/>
```

FIG.5s

```
<property name="fontsize" value="12"/>
<property name="fontcolor" value="000000"/>
<property name="color" value="0000ff"/>
</object>
```

FIG.5s-1

*speedbaritem*

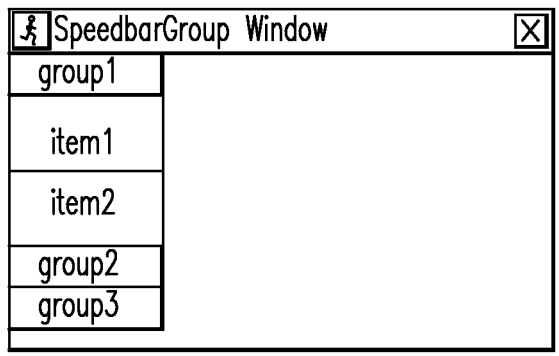

List of Properties:
  caption      name        picture
  class       parent

List of Events:
  leftclick

```
<object name="item1" parent="group1" class="speedbaritem"> <property name="itemid" value="1"/>
        <property name="caption" value="item1"/>
        <property name="picture" value="imagefile1"/>
        <property name="leftclick" value="retrieve"/>
</object>
<object name="item2" parent="group1" class="speedbaritem"> <property name="itemid" value="2"/>
        <property name="caption" value="item2"/>
        <property name="picture" value="imagefile1"/>
        <property name="leftclick" value="retrieve"/>
</object>
```

FIG.5t

*tabset*

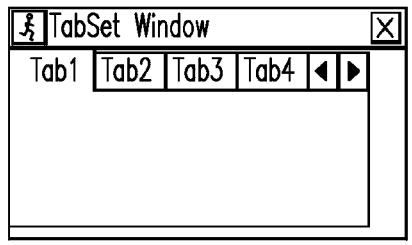

List of Properties:
| | | |
|---|---|---|
| alignment | height | parent |
| class | highlighthotitem | selectedtabsheet' |
| fontbold | hint | selectedtabsheetid' |
| fontitalic | left | taborder |
| fontname | multiline | tabstop |
| fontsize | name | top |
| fontstrikeout | newselectedi3ml' | visible |
| fontunderline | oldselectedi3ml' | width |

List of Events:
| | | |
|---|---|---|
| leftclick | getfocus | selchange |
| rightclick | losefocus | |

```
<object name="tabcontrol" parent="I3MLform1" class="tabset">
    <property name="height" value="100"/>
    <property name="left" value="4"/>
    <property name="top" value="0"/>
    <property name="width" value="200"/>
    <property name="fontsize" value="8"/>
    <property name="fontname" value="MS:Sans Serif"/>
    <property name="hint" value="Functional TabSet"/>
</object>
```

FIG.5u

*tabsheet*

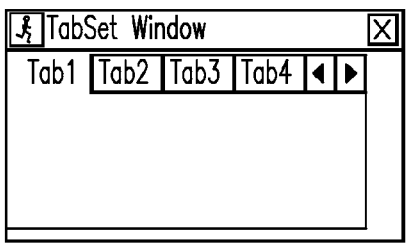

FIG.5v

List of Properties:
    caption                index                 selected
    class                  name
    color                 parent List of Events:
    mouseenter            mouseexit

```
<object name="tab1" parent="tabcontrol" class="tabsheet">
        <property name="caption" value="Tab1"/>
        <property name="index" value="1"/>
</object>
<object name="tab2" parent="tabcontrol" class="tabsheet">
        <property name="caption" value="Tab2"/>
        <property name="index" value="2"/>
</object>
```

FIG.5v-1

*tree*

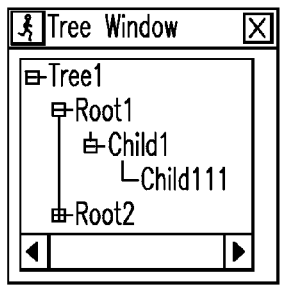

List of Properties:
| | | |
|---|---|---|
| afteritem* | fontcolor" | newselectedi3ml' |
| alignment | fontitalic" | oldselectedi3ml' |
| allitemidsi3ml' | fontname" | parent |
| allitemsi3ml' | fontsize" | parentid* |
| borderstyle | fontstrikeout" | parentpath* |
| class | fontunderline" | rowselect |
| clearselected | hashlines | selected* |
| color | height | selecteditem' |
| collapseditemidi3ml' | helptext | selecteditemi3ml' |
| dragdrop | itemid* | selecteditemid' |
| editable | itempath* | selecteditemidi3ml' |
| enabled | itemtext* | taborder |
| expand" | itemtips | tabstop |
| expandall | left | top |
| expandeditemidi3ml' | linecolor | visible |
| extendedsel | multiselect | width |

FIG.5w fontbold"         name

List of Events:
    leftclick      collapsenode      F7
    rightclick      expandnode      F8
    middleclick      rightarrow      F9
    doubleclick      F1      F10
    getfocus      F2      F11
    losefocus      F3      F12
    uparrow      F4      selchange
    downarrow      F5
    leftarrow      F6

```
<object name="tree1" parent="l3MLform1" class="tree">
  <property name="height" value="100"/>
  <property name="left" value="5"/>
  <property name="top" value="5"/>
  <property name="width" value="130"/>
  <data>
    <insertitem parentid="" parentpath="">
      <property name="itemid" value="1"/>
      <property name="itemtext" value="Root1"/>
    </insertitem>
    <insertitem parentid="" parentpath="">
      <property name="itemid" value="2"/>
      <property name="itemtext" value="Root2"/>
      <property name="fontname" value="arial"/>
    </insertitem>
    <insertitem parentid="1" parentpath="">
      <property name="itemid" value="3"/>
      <property name="itemtext" value="Child11"/>
    </insertitem>
    <insertitem parentid="3" parentpath="">
      <property name="itemid" value="5"/>
      <property name="itemtext" value="Child111"/>
    </insertitem>

</data>
</object>
```

FIG.5w-1

*toolbar*

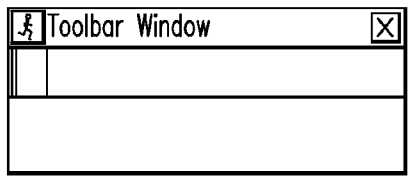

List of Properties:

| | | |
|---|---|---|
| allitemsi3ml' | fontitalic | movable |
| allitemidsi3ml' | fontname | name |
| caption | fontsize | parent |
| class | fontstrikeout | selecteditemi3ml |
| color | fontunderline | selecteditemidi3ml |
| dockedposition | helptext | textonright |
| enabled | hottextcolor | top |
| flat | imageheight | visible |
| fontbold | imagewidth | |
| fontcolor | left | |

Examle I3ML:

```
<object name="toolbar" parent="I3MLform1" class="toolbar">
    <property name="dockedposition" value="left"/>
    <property name="helptext" value="This is a Toolbar"/>
</object>
```

*toolbutton*

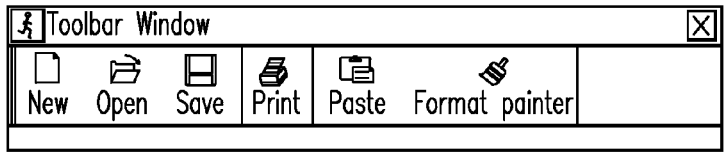

List of Properties:

| | | |
|---|---|---|
| caption | enabled | parent |
| class | hint | separator |
| defaultimage | hotimage | |
| disabledimage | name | |

List of Events:
    leftclick

FIG.5y

```
<object name="toolbutton1" parent="toolbar" class="toolbutton">
    <property name="caption" value="open"/>
</object>
```

FIG.5y-1

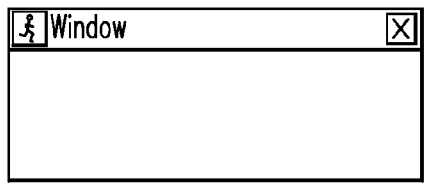

| List of Properties: | | |
|---|---|---|
| borderstyle | icon | modal |
| caption | left | name |
| child | maxhscroll | parent |
| class | maximizebutton | systemmenu |
| color | maxvscroll | scrollbars |
| enabled | minimizebutton | top |
| height | minimumheight | visible |
| helpbutton | minimumwidth | width |

| List of Events: | | |
|---|---|---|
| leftclick | getfocus | F7 |
| rightclick | losefocus | F8 |
| middleclick | F1 | F9 |
| doubleclick | F2 | F10 |
| mouseenter | F3 | F11 |
| mouseexit | F4 | F12 |
| windowload | F5 | |
| windowclose | F6 | |

```
<object name="I3MLform1" class="window">
    <property name="caption" value="Window"/>
    <property name="color" value="D4D0C8"/>
    <property name="height" value="400"/>
    <property name="left" value="278"/>
    <property name="top" value="154"/>
    <property name="visible" value="true"/>
    <property name="width" value="400"/>
    <property name="enabled" value="true"/>
</object>
```

FIG.5z

```
<action name="addition" server="local math" target="add" method="I3ML">
    <send from="memo1" property="text" to="param1"/>
    <send from="memo2" property="text" to="param2"/>
    <receive from="receive" to="memo3" property="text"/>
</action>
```

FIG.6a

```
<action name="subtraction" server="local math" target="subtract" method="I3ML">
    <send from="memo1" property="text" to="param1"/>
    <send from="memo2" property="text" to="param2"/>
    <receive from="receive" to="memo3" property="text"/>
</action>
```

FIG.6b

```
<action name="multiplication" server="local math" target="multiply" method="I3ML">
    <send from="memo1" property="text" to="param1"/>
    <send from="memo2" property="text" to="param2"/>
    <receive from="receive" to="memo3" property="text"/>
</action>
```

FIG.6c

```
<action name="divide" server="local math" target="divide" method="I3ML">
    <send from="memo1" property="text" to="param1"/>
    <send from="memo2" property="text" to="param2"/>
    <receive from="receive" to="memo3" property="text"/>
</action>
```

FIG.6d

```
<action name="mod" server="local math" target="mod" method="I3ML">
    <send from="memo1" property="text" to="param1"/>
    <send from="memo2" property="text" to="param2"/>
    <receive from="receive" to="memo3" property="text"/>
</action>
```

FIG.6e

```
<action name="max" server="local math" target="max" method="I3ML">
    <send from="memo1" property="text" to="param1"/>
    <send from="memo2" property="text" to="param2"/>
            <send from-="memo3" property="text" to="param3"/>
    <receive from="receive" to="memo4" property="text"/>
</action>
```

FIG.6f

```
<action name="min" server="local math" target="min" method="I3ML">
    <send from="memo1" property="text" to="param1"/>
    <send from="memo2" property="text" to="param2"/>
            <send from-="memo3" property="text" to="param3"/>
    <receive from="receive" to="memo4" property="text"/>
</action>
```

FIG.6g

```
<action name="absolute" server="local math" target="abs" method="I3ML">
    <send from="memo1" property="text" to="param1"/>
    <receive from="receive" to="memo2" property="text"/>
</action>
```

FIG.6h

```
<action name="log10" server="local math" target="log10" method="I3ML">
    <send from="memo1" property="text" to="param1"/>
    <receive from="receive" to="memo2" property="text"/>
</action>
```

FIG.6i

```
<action name="log10" server="local math" target="log10" method="I3ML">
    <send from="memo1" property="text" to="param1"/>
    <receive from="receive" to="memo2" property="text"/>
</action>
```

FIG.6j

```
<action name="cos" server="local math" target="cos" method="I3ML">
    <send from="memo1" property="text" to="param1"/>
    <receive from="receive" to="memo2" property="text"/>
</action>
```

FIG.6k

```
<action name="sin" server="local math" target="sin" method="I3ML">
    <send from="memo1" to="param1"/>
    <receive from="receive" to="memo2"/>
</action>
```

FIG. 6l

```
<action name="tan" server="local math" target="tan" method="I3ML">
    <send from="memo1" property="text" to="param1"/>
    <receive from="receive" to="memo2" property="text"/>
</action>
```

FIG. 6m

```
<action name="acos" server="local math" target="acos" method="I3ML">
    <send from="memo1" property="text" to="param1"/>
    <receive from="receive" to="memo2" property="text"/>
</action>
```

FIG. 6n

```
<action name="asin" server="local math" target="asin" method="I3ML">
    <send from="memo1" property="text" to="param1"/>
    <receive from="receive" to="memo2" property="text"/>
</action>
```

FIG. 6o

```
<action name="atan" server="local math" target="atan" method="I3ML">
    <send from="memo1" property="text" to="param1"/>
    <receive from="receive" to="memo2" property="text"/>
</action>
```

FIG.6p

```
<action name="cosh" server="local math" target="cosh" method="I3ML">
    <send from="memo1" property="text" to="param1"/>
    <receive from="receive" to="memo2" property="text"/>
</action>
```

FIG.6q

```
<action name="sinh" server="local math" target="sinh" method="I3ML">
    <send from="memo1" property="text" to="param1"/>
    <receive from="receive" to="memo2" property="text"/>
</action>
```

FIG.6r

```
<action name="tanh" server="local math" target="tanh" method="I3ML">
    <send from="memo1" property="text" to="param1"/>
    <receive from="receive" to="memo2" property="text"/>
</action>
```

FIG.6s

```
<action name="round" server="local math" target="round" method="I3ML">
    <send from="memo1" property="text" to="param1"/>
    <send from="memo2" property="text" to="param2"/>
    <receive from="receive" to="memo3" property="text"/>
</action>
```

FIG.6t

```
<action name="roundup" server="local math" target="roundup" method="I3ML">
    <send from="memo1" property="text" to="param1"/>
    <send from="memo2" property="text" to="param2"/>
    <receive from="receive" to="memo3" property="text"/>
</action>
```

FIG.6u

```
<action name="rounddown" server="local math" target="rounddown" method="I3ML">
    <send from="memo1" property="text" to="param1"/>
    <send from="memo2" property="text" to="param2"/>
    <receive from="receive" to="memo3" property="text"/>
</action>
```

FIG.6v

```
<action name="sqrt" server="local_math" target="sqrt" method="I3ML">
    <send from="memo1" property="text" to="param1"/>
    <receive from="receive" to="memo2" property="text"/>
</action>
```

FIG.6w

```
<action name="ceil" server="local_math" target="ceiling" method="I3ML">
    <send from="memo1" property="text" to="param1"/>
    <receive from="receive" to="memo2" property="text"/>
</action>
```

FIG.6x

```
<action name="floor" server="local_math" target="floor" method="I3ML">
    <send from="memo1" property="text" to="param1"/>
    <receive from="receive" to="memo2" property="text"/>
</action>
```

FIG.6y

```
<action name="exp" server="local_math" target="exp" method="I3ML">
    <send from="memo1" property="text" to="param1"/>
    <receive from="receive" to="memo2" property="text"/>
</action>
```

FIG.6z

```
<action name="average" server="local math" target="average"
method="I3ML">
    <send from="memo1" property="text" to="param1"/>
    <send from="memo2" property="text" to="param2"/>
    <send from="memo3" property="text" to="param3"/>
    <receive from="receive" to="memo4" property="text"/>
</action>
```

FIG.6aa

```
<group name="compare" process="sequential" interval="-1"
    onfail="copying1" method="I3ML">
```

```
        <member name="compare1"/>
        <member name="copying2"/>
</group>
<action name="compare1" server="local math" target="succeedifeq"
    interval="-1" onfail="failedaction" method="I3ML">
        <send from="memo1" property="text" to="param1"/>
        <send from="memo2" property="text" to="param2"/>
</action>
```

FIG.6bb

Parameters
    Param1-dateformat

```
<action name="today" server="local datetime" target="current"
  blockgui="false" interval="-1" method="I3ML">
```

```
    <send from="memo1" property="text" to="param1"/>
    <receive from="receive" property="text" to="memo2"/>
</action>
```

FIG.7a

Parameters
    Param1-date
    Param2-integer value (days)
    Param3-dateformat

```
<action name="dateadd" server="local datetime" target="dateadd"
  blockgui="false" interval="-1" method="I3ML">
```

```
    <send from="memo1" property="text" to="param1"/>
            <send from="memo2" property="text" to="param2"/>
            <send from="memo3" property="text" to="param3"/>
    <receive from="receive" property="text" to="memo4"/>
</action>
```

FIG.7b

Parameters
    Param1-date
    Param2-integer value (days)
    Param3-dateformat

```
<action name="datesub" server="local datetime" target="datesub"
  blockgui="false" interval="-1" method="l3ML">
```

```
    <send from="memo1" property="text" to="param1"/>
        <send from="memo2" property="text" to="param2"/>
        <send from="memo3" property="text" to="param3"/>
    <receive from="receive" property="text" to="memo4"/>
</action>
```

FIG.7c

Parameters
    Param1-date
    Param2-datetimeformat

```
<action name="year" server="local datetime" target="year" blockgui="false"
  interval="-1" method="l3ML">
```

```
    <send from="memo1" property="text" to="param1"/>
        <send from="memo2" property="text" to="param2"/>
        <receive from="receive" property="text" to="memo3"/>
</action>
```

FIG.7d

Parameters
    Param1-date
    Param2-datetimeformat

Example

```
<action name="month" server="local datetime" target="month"
  blockgui="false" interval="-1" method="I3ML">
```

```
    <send from="memo1" property="text" to="param1"/>
            <send from="memo2" property="text" to="param2"/>
            <receive from="receive" property="text" to="memo3"/>
</action>
```

FIG.7e

Parameters
    Param1-date
    Param2-datetimeformat

```
<action name="date" server="local datetime" target="day" blockgui="false"
  interval="-1" method="I3ML">
```

```
    <send from="memo1" property="text" to="param1"/>
            <send from="memo2" property="text" to="param2"/>
            <receive from="receive" property="text" to="memo3"/>
</action>
```

FIG.7f

Parameters
    Param1-date
    Param2-datetimeformat

```
<action name="monthname" server="local datetime" target="monthname"
  blockgui="false" interval="-1" method="I3ML">
```

```
    <send from="memo1" property="text" to="param1"/>
        <send from="memo2" property="text" to="param2"/>
        <receive from="receive" property="text" to="memo3"/>
</action>
```

FIG.7g

Parameters
    Param1-date
    Param2-datetimeformat

```
<action name="longmonthname" server="local datetime"
  target="longmonthname" blockgui="false" interval="-1" method="I3ML">
```

```
    <send from="memo1" property="text" to="param1"/>
        <send from="memo2" property="text" to="param2"/>
        <receive from="receive" property="text" to="memo3"/>
</action>
```

FIG.7h

Parameters
    Param1-date
    Param2-datetimeformat

```
<action name="sec" server="local datetime" target="second" blockgui="false"
  interval="-1" method="I3ML">
```

```
    <send from="memo1" property="text" to="param1"/>
        <send from="memo2" property="text" to="param2"/>
        <receive from="receive" property="text" to="memo3"/>
</action>
```

FIG. 7i

Parameters
    Param1-date
    Param2-datetimeformat

```
<action name="min" server="local datetime" target="minute" blockgui="false"
  interval="-1" method="I3ML">
```

```
    <send from="memo1" property="text" to="param1"/>
        <send from="memo2" property="text" to="param2"/>
        <receive from="receive" property="text" to="memo3"/>
</action>
```

FIG. 7j

Parameters
    Param1-date
    Param2-datetimeformat

```
<action name="hour" server="local datetime" target="hour" blockgui="false"
  interval="-1" method="I3ML">
```

```
    <send from="memo1" property="text" to="param1"/>
        <send from="memo2" property="text" to="param2"/>
        <receive from="receive" property="text" to="memo3"/>
</action>
```

FIG.7k

Parameters
    Param1-date
    Param2-datetimeformat

```
<action name="24hour" server="local datetime" target="24hour"
  blockgui="false" interval="-1" method="I3ML">
```

```
    <send from="memo1" property="text" to="param1"/>
        <send from="memo2" property="text" to="param2"/>
        <receive from="receive" property="text" to="memo3"/>
</action>
```

FIG.7l

Parameters
　　　Param1-date
　　　Param2-datetimeformat

```
<action name="ampm" server="local datetime" target="ampm"
  blockgui="false" interval="-1" method="I3ML">
```

```
    <send from="memo1" property="text" to="param1"/>
        <send from="memo2" property="text" to="param2"/>
        <receive from="receive" property="text" to="memo3"/>
</action>
```

FIG.7m

Parameters
　　　Param1-date
　　　Param2-datetimeformat

```
<action name="dayofweek" server="local datetime" target="dayofweek"
  blockgui="false" interval="-1" method="I3ML">
```

```
    <send from="memo1" property="text" to="param1"/>
        <send from="memo2" property="text" to="param2"/>
        <receive from="receive" property="text" to="memo3"/>
</action>
```

FIG.7n

Parameters
    Param1-date
    Param2-datetimeformat

```
<action name="dayofweekname" server="local datetime"
  target="dayofweekname" blockgui="false" interval="-1" method="I3ML">
```

```
    <send from="memo1" property="text" to="param1"/>
        <send from="memo2" property="text" to="param2"/>
        <receive from="receive" property="text" to="memo3"/>
</action>
```

FIG.7o

Parameters
    Param1-date
    Param2-datetimeformat

```
<action name="dayofweeklongname" server="local datetime"
  target="dayofweeklongname" blockgui="false" interval="-1"
  method="I3ML">
```

```
    <send from="memo1" property="text" to="param1"/>
        <send from="memo2" property="text" to="param2"/>
        <receive from="receive" property="text" to="memo3"/>
</action>
```

FIG.7p

```
action name="closewindow1" server="local process" target="close"
  blockgui="false" method="I3ML">
    <send from="I3Mlform1" property="name" to="window"/>
</action>
```

FIG.8a

```
action name="stopaction1" server="local process" target="cancel"
blockgui="false" method="I3ML">
    <send constant="action1" to="param1"/>
    <send constant="button1" to="param2"/>
</action>
```

FIG.8b

```
action name="mm" server="local process" target="messagebox"
blockgui="false" method="I3ML">
    <send constant="mousemove" to="caption"/>
    <send from="memo1" property="text" to="message"/>
</action>
```

FIG.8c

```
<action name="terminate" server="local process" target="terminate"
blockgui="false" method="I3ML">
```

FIG.8d

```
action name="copying1" server="local process" target="copy"
  blockgui="false" interval="-1" onfail="msgbox1" method="I3ML">
    <send constant="false" to="param1"/>
    <receive from="receive" property="text" to="memo4"/>
</action>
```

FIG.8e

```
<action name="setfocus" server="local process" target="setfocus"
blockgui="false" method="soap">
    <send from="editbox1" property="name" to=""/>
</action>
```

FIG.8f

```
<iii>
  <insert>
    <action name="showchunk" target="applychunk" server="local process"
     method="I3ML">
                    <send constant="0000ff" to="color1"/>
                    <send constant="showchunk1" to="name"/>
    </action>
    <chunk name="showchunk1" contenttype="I3ML">
      <content>
                                        <iii>
                                            <update>
    <object name="window1" class="window">
    <property name="color" value="{color1}"/>
            </object>
                                            </update>
                                        </iii>
      </content>
    </chunk>
  </insert>
</iii>
```

FIG.8g

```
<action name="upper" server="local string" target="toupper" blockgui="false"
  interval="-1" method="I3ML">
    <send from="editbox1" property="text" to="param1"/>
            <receive from="receive" property="text" to="editbox2"/>
</action>
```

FIG.9a

```
<action name="lower" server="local string" target="folower" blockgui="false"
interval="-1" method="I3ML">
    <send from="editbox1" property="text" to="param1"/>
            <receive from="receive" property="text" to="editbox2"/>
</action>
```

FIG.9b

```
<action name="ltrim" server="local string" target="trimleadingspaces"
blockgui="false" interval="-1" method="I3ML">
    <send from="editbox1" property="text" to="param1"/>
            <receive from="receive" property="text" to="editbox2"/>
</action>
```

FIG.9c

```
<action name="rtrim" server="local string" target="trimtrailingspaces"
blockgui="false" interval="-1" method="I3ML">
    <send from="editbox1" property="text" to="param1"/>
            <receive from="receive" property="text" to="editbox2"/>
</action>
```

FIG.9d

```
<action name="ltrim" server="local string" target="trimspaces"
blockgui="false" interval="-1" method="l3ML">
    <send from="editbox1" property="text" to="param1"/>
            <receive from="receive" property="text" to="editbox2"/>
</action>
```

FIG.9e

```
<action name="right" server="local string" target="right" blockgui="false"
interval="-1" method="l3ML">
    <send from="editbox1" property="text" to="param1"/>
            <send from="editbox2" property="text" to="param2"/>
            <receive from="receive" property="text" to="editbox3"/>
</action>
```

FIG.9f

```
<action name="left" server="local string" target="left" blockgui="false"
interval="-1" method="l3ML">
    <send from="editbox1" property="text" to="param1"/>
            <receive from="receive" property="text" to="editbox2"/>
</action>
```

FIG.9g

```
<action name="mid" server="local string" target="mid" blockgui="false"
interval="-1" method="I3ML">
    <send from="editbox1" property="text" to="param1"/>
    <send from="editbox2" property="text" to="param2"/>
    <send from="editbox3" property="text" to="param3"/>
            <receive from="receive" property="text" to="editbox4"/>
</action>
```

FIG.9h

```
<action name="replace" server="local string" target="replace"
blockgui="false" interval="-1" method="I3ML">
    <send from="editbox1" property="text" to="param1"/>
    <send from="editbox2" property="text" to="param2"/>
    <send from="editbox3" property="text" to="param3"/>
            <send from="editbox4" property="text" to="param4"/>
            <receive from="receive" property="text" to="editbox5"/>
</action>
```

FIG.9i

```
<action name="concat" server="local string" target="concat" blockgui="false"
interval="-1" method="I3ML">
    <send from="editbox1" property="text" to="param1"/>
    <send from="editbox2" property="text" to="param2"/>
            <receive from="receive" property="text" to="editbox3"/>
</action>
```

FIG.9j

```
<action name="find" server="local string" target="find" blockgui="false"
interval="-1" method="I3ML">
    <send from="editbox1" property="text" to="param1"/>
    <send from="editbox2" property="text" to="param2"/>
            <receive from="receive" property="text" to="editbox3"/>
</action>
```

FIG.9k

```
<action name="cfind" server="local string" target="cfind" blockgui="false"
interval="-1" method="I3ML">
    <send from="editbox1" property="text" to="param1"/>
    <send from="editbox2" property="text" to="param2"/>
            <receive from="receive" property="text" to="editbox3"/>
</action>
```

FIG.9l

```
<action name="length" server="local string" target="length" blockgui="false"
interval="-1" method="I3ML">
    <send from="editbox1" property="text" to="param1"/>
    <receive from="receive" property="text" to="editbox2"/>
</action>
```

FIG.9m

```
<group name="compare" process="sequential" interval="-1" onfail="func2"
method="I3ML">
                    <member name="compareaction"/>
                <member name="func1"/>
</group>
<action name="compareaction" server="local string" target="compare"
    interval="-1" onfail="func2" method="I3ML">
        <send from="editbox1" property="text" to="param1"/>
        <send from="editbox2" property="text" to="param2"/>
</action>
```

FIG.9n

```
<group name="ccompare" process="sequential" interval="-1" onfail="func2"
method="I3ML">
            <member name="ccompareaction"/>
        <member name="func1"/>
</group>
<action name="ccompareaction" server="local string" target="ccompare"
    interval="-1" onfail="func2" method="I3ML">
        <send from="editbox1" property="text" to="param1"/>
        <send from="editbox2" property="text" to="param2"/>
</action>
```

FIG.9o

Step 1601
Perform target registration process.

Step 1602
Define:
a) Target input parameters
b) Services the target uses
c) Template target will apply Step 1603
Define services repository Step 1604
Tag lists the services that the target intigrates Step 1605
Embed XSL statements in services tag Step 1606
Employ input map Step 1607
Template tag defines the I3ML template and applied against the data source

FIG.16

INTERNET INTERFACE AND INTEGRATION LANGUAGE SYSTEM AND METHOD

RELATED APPLICATIONS

This application is a continuation of and claims priority to U.S. patent application Ser. No. 10/482,543, entitled "Internet Interface & Integration Language System And Method" filed on Jul. 16, 2004, now U.S. Pat. No. 7,478,329, incorporated herein by reference, and which is based on and claims priority to U.S. Provisional Patent Application No. 60/302,108 entitled, "A Simple Application Integration Language System and Method" filed on Jun. 30, 2001.

FIELD OF THE INVENTION

This invention relates to graphic user interfaces, the use of graphical interfaces in systems integration and more particularly, to a language for enabling a user to create graphic user interfaces and applications corresponding thereto.

BACKGROUND OF THE INVENTION

Users typically interact with a computer system by using an application. An application is a set of instructions that controls the processing of data in accordance with pre-determined rules and in conjunction with interactions by the user. There are countless such applications currently being used, such as accounting applications, sales applications, etc.

There are numerous considerations to be made by a user when determining the desirability of deploying and using an application. One important consideration is the ease of distribution. Unless an application already resides on the computing device of a user, the application needs to be delivered to the user. Some of the ways that an application are currently delivered to a user is via CD-ROM (whereby the user installs the application software on the computing device), or via Internet (whereby the user interacts with a user interface which is supported by server software).

One factor which effects the case with which applications may be delivered to a user is the application's accessibility. An application should be globally accessible, e.g. —it should be accessible from any location, to any computer connected to a global network or to the internet. Another important consideration is the ease with which the application may be updated, e.g. —to a new version having new or improved features.

Another important consideration to be made by a user when determining the desirability of using an application is the functional richness of the application. The typical user of an application demands a high level of functionality, irrespective of the complexity that is required by the software manufacturer to accomplish this level of functionality. This is evident by the increasing number of features which are being implemented in new software applications. However, these increasingly complex software applications are difficult to develop, take a long time to bring to market, and require highly skilled technologists to develop. Of course, applications must also be compatible with the "corporate reality" of network bandwidth constraints, protocol choices, firewalls, language bathers, etc.

Several methods are currently being employed in order to create and deliver applications to a user. However, each of these methods fail to satisfy all of the above-stated criteria. For instance, one such method is the employment of JAVA™ applets. A JAVA applet can add additional features to a web browser. Examples include user interface elements for collecting data, drawing simple diagrams, and performing calculations. However, JAVA applets, although designed for use over the internet, are frequently difficult to distribute and use owing to non-uniformity of JAVA implementations in web browsers. They also tend to be large in size, requiring significant network bandwidth. In addition, they do not provide adequate functional richness (while they provide a variety of features, they don't approximate the quality or usability of traditional Windows interfaces), and they are difficult to develop since the programming is difficult to learn and thus programmers are expensive and tough to hire. In addition, JAVA applets are frequently incompatible with corporate reality because of their excessive network bandwidth requirements, are often unreliable, are complex to develop and frequently require special configuration.

Another method is the employment of CITRIX™'. CITRIX allows a user to see the Windows interface of a remote computer. When, for example, the user moves the mouse pointer, he is actually moving the mouse pointer of the remote computer at the same time as he moves his own. CITRIX provides a higher level of functional richness since applications look identical to locally installed software. Applications deployed using CITRIX are also somewhat easier to develop than JAVA applets. However, CITRIX based applications are completely unsuitable for wide spread distribution or use over the internet. They require a large amount of bandwidth, create security concerns since they require modification to a network firewall to run, and do not scale well since they tend to quickly consume all of the processing power of their host computer.

Still another method is the employment of Visual Basic™ and other equivalent application development tools. VB is a programming language that can be used to create almost any type of Windows application. These types of applications must be locally installed. Like CITRIX, Visual Basic applications provide a higher level of functional richness. VB is intended to be, and can be, used by relatively lower-skilled programmers. However, Visual Basic based applications are very difficult to distribute. These applications cannot be delivered on the fly, over the internet for example. Their installation requires that a user have disks or CD-roms containing the application. Distribution and updates to a wide audience therefore requires significant resources making them highly impractical for many applications.

One of the best and most popular methods currently being employed to deliver applications to a user is hyper-text mark-up language (referred to hereinafter as "HTML"). Applications created using HTML are easily distributed to users via the Internet. Furthermore, HTML is relatively easy to develop. In fact, one of the reasons for the explosive growth of the Internet is that HTML is readily understandable by a lay person—a person with virtually no knowledge of computer programming could use HTML to create a website.

Unlike the simple webpages of a layperson' web site, however, which typically just delivers content to a user, more complex web sites deliver the user interface of a client server application, with access to a client server's database system. Thus, a web site not only provides a user with a web page which describes a new product for sale, but also provides a user with interface items so that the user can interactively communicate with the host server. For example, the web site may provide a user with a button that the user presses so as to place an order for the new product, data entry fields in which the user may enter his or her name, a credit card number, a billing or shipping address, etc. Alternately, the web site may provide the user with a button that the user presses in order to enter a review of the product, and further provides to the user space to enter comments about the product's quality, to rate the quality of the product, to read comments or rating that others have entered with respect to the same product, etc.

Though easy to develop and distribute, HTML does not provide a high level of functional richness. For one thing, the sophistication of the user interface is hampered by the limited choice of user interface controls. HTML applications have very few user interface controls, such as "forward", "back", "stop", etc. By contrast, Windows applications have dozens, and sometimes hundreds, of different controls, enabling a user to perform a myriad of different functions.

Furthermore, HTML is not suitable for highly interactive applications because it is a document centric model, e.g.: it delivers whole documents to a user. In order to change the user interface which is displayed to the user, the server delivers a new set of HTML which is employed to re-display the entire interface which is seen by the user. Likewise, in order to process data entered by a user in a field of the interface, the server is required to process the entire set of HTML associated with the interface.

Thus, there is a need for an improved system and method for creating and delivering applications and graphical user interfaces to a user.

OBJECT AND SUMMARY OF THE INVENTION

The present invention is comprised of the Internet Interface & Integration Language (hereinafter referred to as "I3ML") and four software components: a player module, a designer module, a server, and a service explorer module, which facilitate the creation, usage and transmission of a file of I3ML. I3ML is a dialect of Extensible Markup Language (referred to hereinafter as "XML") that is invented for the purpose of describing how to display and interact with fully functional Windows applications. In accordance with a preferred embodiment, the I3ML language follows the syntax rules of XML The creation of a I3ML application begins with the I3ML designer module. The I3ML designer module is a visual development system that enables a user to graphically design a Graphical User Interface (GUI) for an application. The user can select from a palette of common and custom objects (also referred to herein as "interface items"), such as: button, editbox, listbox, tree view, grid, dropdown, etc., and place these items in desired locations on a window. It is noted that the term "interface item" is used to describe any item that may be shown on the user interface, such as icons, data fields, content to be displayed, etc. The designer module enables a user to associate properties such as color and size to the interface items, and to associate actions that are to be performed when an event, such as left and right mouse click, occurs. The designer module then creates a I3ML representation of these objects, properties, actions and events, which is saved to a file for later displaying by the I3ML player module.

In addition to managing the visual elements, or objects, of the I3ML application, non-visual elements are also created with the designer. Some of these non-visual elements of a I3ML application are: "server", "file", "action", "group", and "chunk". Each of these elements are created in the designer and are stored as a I3ML file. Generally, a "server" element is the name and connection information for a server, such as a I3ML server, a Simple Object Access Protocol ("SOAP") server, or a WEB server; a "file" element contains the location of a binary file that resides on a "server" element; an "action" element links a method of an "object" element to a program that resides on a "server" element; a "group" element is a collection of "action" elements; and a "chunk" element is a collection of elements that are stored but not displayed by the I3ML player module.

The I3ML player module is the next component of the invention. The I3ML player module reads a I3ML file and displays the visual elements (and interprets or stores the non-visual elements) as a standard looking Windows application. The I3ML player module is also capable of receiving a I3ML file (or a stream of I3ML data) which is transmitted from a I3ML or web server.

A third component, referred to as a I3ML server, is responsible for accepting communication of events which are initiated by interface items in the I3ML player module and responding back to the player module with a I3ML file. For example, an application running in the I3ML player module can cause the left click of a button to send the contents of an editbox to a I3ML server, which in turn responds with a I3ML file that will populate a listbox.

Thus, the designer module is employed to generate a file of I3ML which, when transmitted to and processed by the player module, will display a user interface. When a user initiates a call to run a I3ML application, the player module is activated, much like an ADOBE Acrobat[?] player is activated when a user initiates a call to display a PDF file. The player module retrieves the corresponding I3ML set and employs it to display objects that comprise interface items on a user interface. Each object of the user interface has a corresponding I3ML set which the player module employs to process it.

When a user interacts with the user interface, the player module performs an action which is associated with the event which has occurred. In some cases, this action is a local action which can be performed by the player module using a set of I3ML data which already resides in the player module. Alternatively, this action may be a remote action, in which case the set of I3ML data corresponding to the selected object is received by an I3ML server. The I3ML server employs "connectors" that allow it to interact with other server computers. The input and output to those other servers is automatically transformed into the appropriate format by the connector. The output from the server is converted to XML, processed further as required and returned to the Player in I3ML format.

The present invention, according to one embodiment thereof, provides the advantage that a user with very limited programming knowledge or skills can create functionally rich user interfaces. Unlike the methods previously described in the Background section, which require extensive programming skills, a user can, with remarkable ease, create an interface having various interface items and associate actions that are performed when the user interacts with the interface items. Because the data which is employed to display the user interface and to control the functions of the application is generated in the I3ML language, which follows the syntax of XML, it is compatible with existing applications, tools, etc. that employ XML.

Furthermore, the present invention, according to one embodiment thereof, provides the advantage that the player module employs a separate set of I3ML data in order to process and/or display each interaction item on the user interface, and can thereby process data entered by the user in fields of the interface without re-rendering the entire user interface. Thus, for instance, when an interface item displayed on the user interface is modified by a user (e.g: such as a user populating an editbox of the user interface), the system can process the data corresponding to the modified interface item only by processing the object associated with that interface item.

By contrast, in a system that employs HTML for example, the modification of a single item of a user interface by a user requires the server to re-process a complete set of HTML which is employed to re-display the entire user interface. The present invention thereby vastly improves the efficiency of a system by substantially reducing the processing power and network bandwidth required to deliver and display an application to a user.

In addition, the present invention, according to one embodiment thereof, provides the advantage that each of the components of the system are compliant with existing software tools that employ or generate XML formatted data. For instance, Microsoft rM has created tools to translate data from a SQL ("Standard Query Language") server into XML syntax. Thus, tools such as this and other XML-compliant software tools may be employed by the present invention without the need for additional translation software.

The present invention also provides the advantage that new functions and operations can be used in connection with old data sources. For instance, a database may have software associated therewith which enables a user to perform a number of operations with the data stored in the database. The present invention enables a user to create a new user interface to access the data in the database and to create new operations that may be performed with the data in the database by associating actions to be performed on the data when retrieved from the database, wherein the actions provide functionality that was not previously able to be employed.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the drawings in which like reference characters denote similar elements throughout the several views:

FIGS. 6(a)-(bb) provides examples of I3ML code for each of the processes that may be performed by a call to a Local.Math file, in accordance with one embodiment of the present invention;

FIG. 7(a)-(p) provides examples of I3ML code for each of the processes that may be performed by a call to a Local.Datetime file, in accordance with one embodiment of the present invention;

FIG. 8(a)-(g) provides examples of I3ML code for each of the processes that may be performed by a call to a LocaLProcess file, in accordance with one embodiment of the present invention;

FIG. 9(a)-(o) provides examples of I3ML code for each of the processes that may be performed by a call to a Local.String file, in accordance with one embodiment of the present invention;

FIG. 16 is a flowchart that illustrates the steps that are performed during a design phase in order to enable a target to be accessed via a target request from a player module, in accordance with one embodiment of the present invention.

DETAILED DESCRIPTION OF THE INVENTION

The present invention, according to one embodiment thereof, relates to a system and method for employing I3ML data in order, among other things, to enable a user having very little programming knowledge to create graphic user interfaces. Generally, the system employs I3ML data so that the user interface may comprise various interface items and instructions corresponding to the interface item. The data which the system requires to display the interface item is stored in a set of I3ML data associated with the interface item. The set of I3ML data corresponding to each interface item of the user interface also comprises instruction data which, upon the user interacting with the interface item, is employed by the system to perform functions associated with the interface item.

Figure 1:
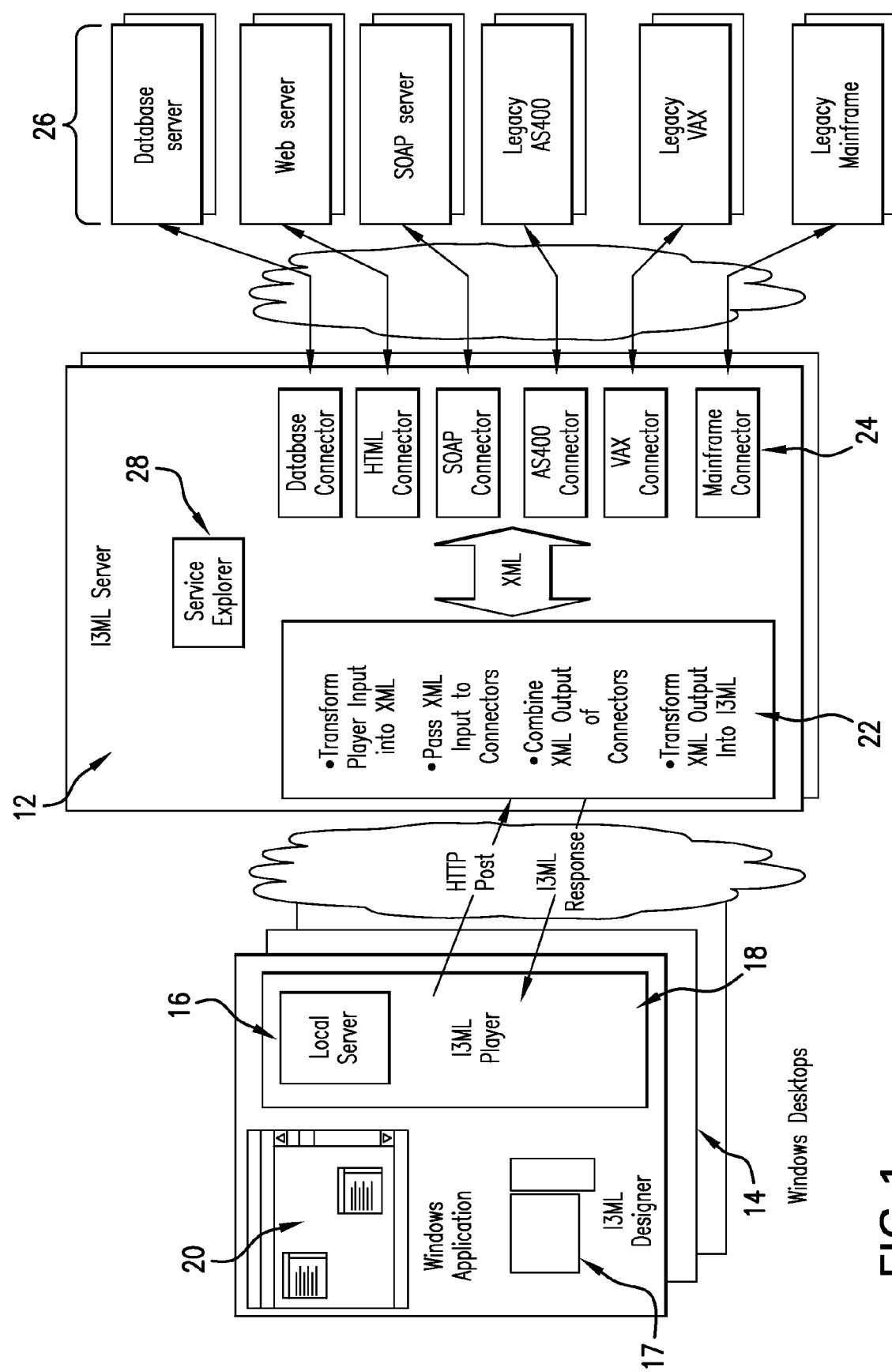
FIG. 1 is a block diagram that illustrates some of the main components of system that employs I3ML data, in accordance with one embodiment of the present invention.

FIG. 1 is a block diagram that illustrates the basic components of a system 10 that employs I3ML data, in accordance with one embodiment of the present invention. System 10 comprises a server 12 coupled to at least one desktop device 14. Desktop device 14 has a user interface 20, which is displayed for the user via a player module 18, as will be explained in detail below. Desktop device 14 is also shown having a designer module 17 which is employed by a user to design a user interface, as will be explained in detail below. However, it is noted that designer module 17 may reside in server 12 or elsewhere in system 10, and is shown residing in desktop device 14 for the purpose of illustration only. It is also noted that desktop device 14 need not be a desktop computer but may be any computing module having a user interface.

Server 12 comprises an XSL transform module 22 coupled to a plurality of connectors 24. Connectors 24 are each coupled to a data source 26, such as a web server, a SOAP server, a mainframe or database computer, etc., each having its own language, format or syntax. Each connector is configured to transform a data transmission from its corresponding data source 26 into XML, and to likewise transform an XML data transmission into the particular language or format of the data source.

XSL transform module 22 is configured to communicate with player module 18 on desktop device 14. Specifically, and as will be discussed in greater detail below, XSL transform module 22 is configured to transform XML data received via connectors 24 into I3ML data to be employed by player module 18. Player module 18 employs the I3ML data in order to display user interface 20 on desktop device 14.

XSL transform module 22 also comprises service explorer module 28. As will be explained in greater detail below, service explorer module 28 allows a users to easily configure and navigate among the services provided by a particular I3ML server.

As previously mentioned, desktop device 14 has a designer module 17 which is employed by a user to design a user interface. In a preferred embodiment of the invention, designer module 17 is a visual development system that enables a user to graphically design a Graphical User Interface (GUI) for an application. Advantageously, the user can select from a set of objects (which may comprise common and custom "Windows Interface items" such as: buttons, edit-box, listboxes, tree views, grids, dropdown menus, etc.) and place these objects in desired locations on a window. Designer module 17 also enables a user to associate properties (such as color and size) to these objects.

Furthermore, designer modulo 17 also enables a user to associate actions and events to these objects. An action is a function that is performed by system 10 when a particular event occurs, wherein an event is a user interaction with the application. Designer module 17 then creates a I3ML representation of these objects, actions and events. According to one embodiment of the invention, this I3ML representation is then saved to a file for later displaying by the I3ML player module, The I3ML data representations of these properties, actions, events, etc., and the manner in which they are employed by system 10 of the present invention, are explained in greater detail below.

Figure 12:
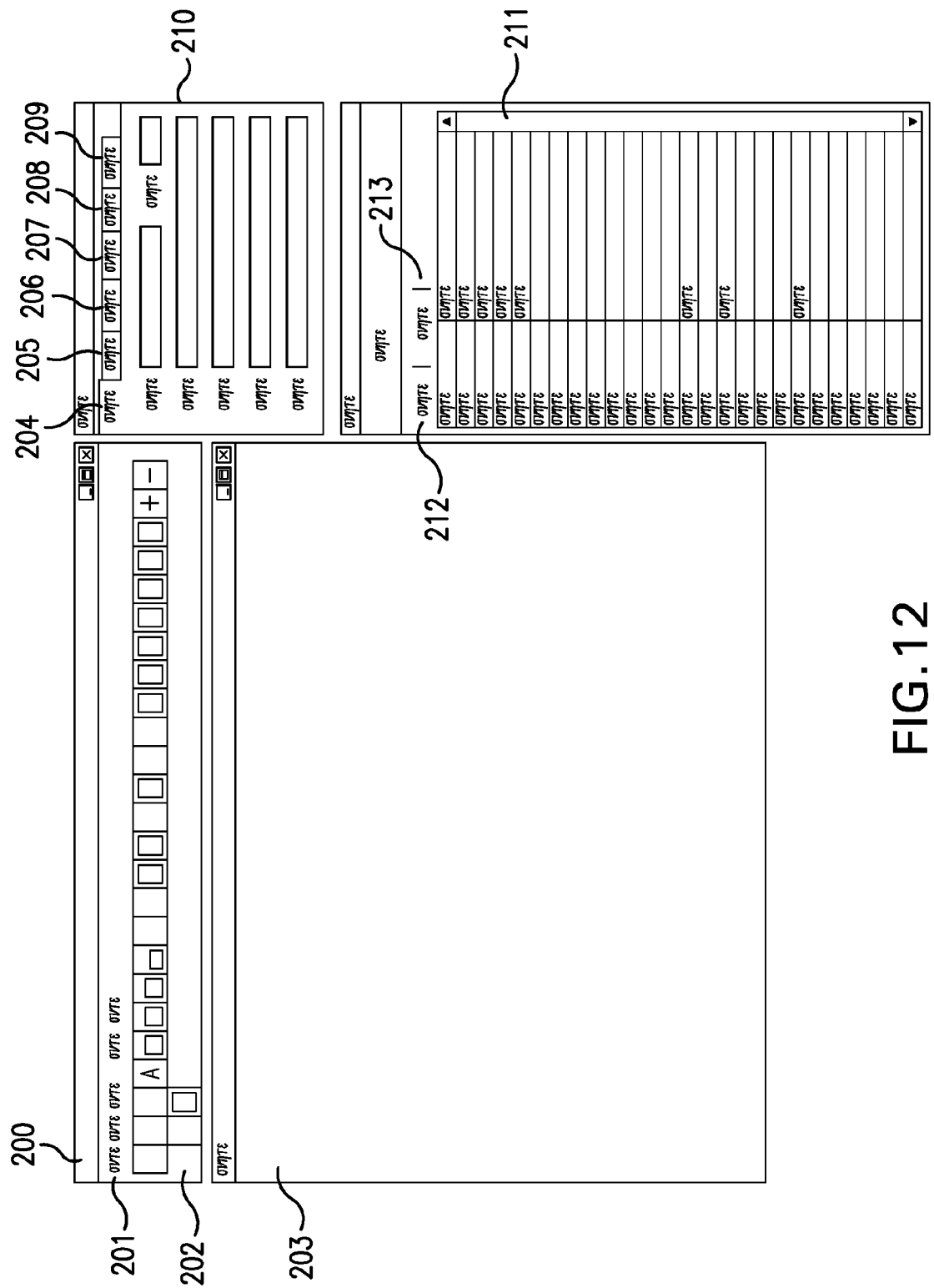
FIG. 12 is a designing interface which is employed by a user to create a set of I3ML data that represents a graphical user interface, in accordance with one embodiment of the present invention.

FIG. 12 is a designing interface provided by designer module 17, according to one embodiment of the present invention. The designing interface provides various windows that a user may employ to create a graphical user interface for an application. For instance, the designing interface shown in FIG. 12 comprises a palette window 202 and a position window 203. Palette window 202 comprises a plurality of interface items which the user may select. In a preferred embodiment of the invention, the user may drag and drop a selected interface item to a selected position onto position window 203.

The designing interface shown in FIG. 12 also comprises an association window 210 and a property manager window 211. Association window 210 comprises various tabs. Each tab provides the user with a set of fields which the user may employ to enter data which the user desires to associate with the interface item that has been selected. As will be described more fully below, this association data comprises non-visual information regarding the interface item. In FIG. 12, association window 210 comprises tab 204 having fields for entering "header" data; tab 205 having fields for entering "server" data; tab 206 having fields for entering "action" data; tab 207 having fields for entering "group" data; tab 208 having fields for entering "file" data; and tab 209 having fields for entering "chunk" data.

Property manager window 211, on the other hand, also comprises various tabs. Each tab provides the user with a set of fields which the user may employ to enter property data concerning the interface item that has been selected. Advantageously, some of the fields in property manager module 211 are automatically populated when the user positions an interface item on position window 203. For instance, property manager window 211 comprises property tab 212, having fields for entering property data, and "method and action" tab 213 having fields for entering data corresponding to methods and actions that are to be implemented by the system when a user interacts with the interface item while using the application.

When a user positions an interface item on position window 203, the data fields in property manager window 212 that correspond to the position of the interface item (such as the horizontal and vertical position of the interface item within the window, the width and height of the interface item, etc.) may be automatically populated. The user may also enter various other types of property data in other fields property manager window 212, such as a caption, the font type and size of text displayed on the interface item, the color of the interface item, etc.

As previously mentioned, by employing the drag and drop feature of designer module 17, a user can position various interface items on a window to create a customized graphical user interface. In addition, once the user populates the data fields of the association and property manager windows as shown in FIG. 12 with data to be associated with the selected interface item, designer module 17 is configured to generate a set of data corresponding to the interface item. The set of data is generated in the I3ML language, which is described in detail below, and is stored in a file for subsequent use by player module 18. Thus, a user can create the code for displaying and controlling the operation of the application interface (e.g: the set of I3ML data for each interface item) without having any programming knowledge.

Thus, it should be evident that the system of the present invention, according to one embodiment thereof, may also employ interface items to replicate standard Windows interfaces. For instance, in order to generate and control the operation of a standard Windows interface, a typical system of the prior art employs a complex and voluminous set of software. The complete set of software controls each and every interface item to be displayed in the user interface. Each time that a user interacts with an interface item displayed on the Windows interface, the entire set of software processes the interaction.

A user of the system of the present invention, according to one embodiment thereof, may replicate a typical Windows interfaces by using designer module 17 to drag and drop the same interface items used in the Windows interface in an arrangement similar to that of the Windows interface. As will be described in greater detail below, the present invention enjoys the advantage that each interface item of the Windows interface is generated and controlled by a set of I3ML data which is independent from the sets of I3ML data that generate and control the operation of the other interface items in the interface. Therefore, each time that a user interacts with an interface item displayed on the replicated Windows interface, only the corresponding set of I3ML data is required to process the interaction, thereby greatly enhancing the efficiency of the system.

Figure 2:
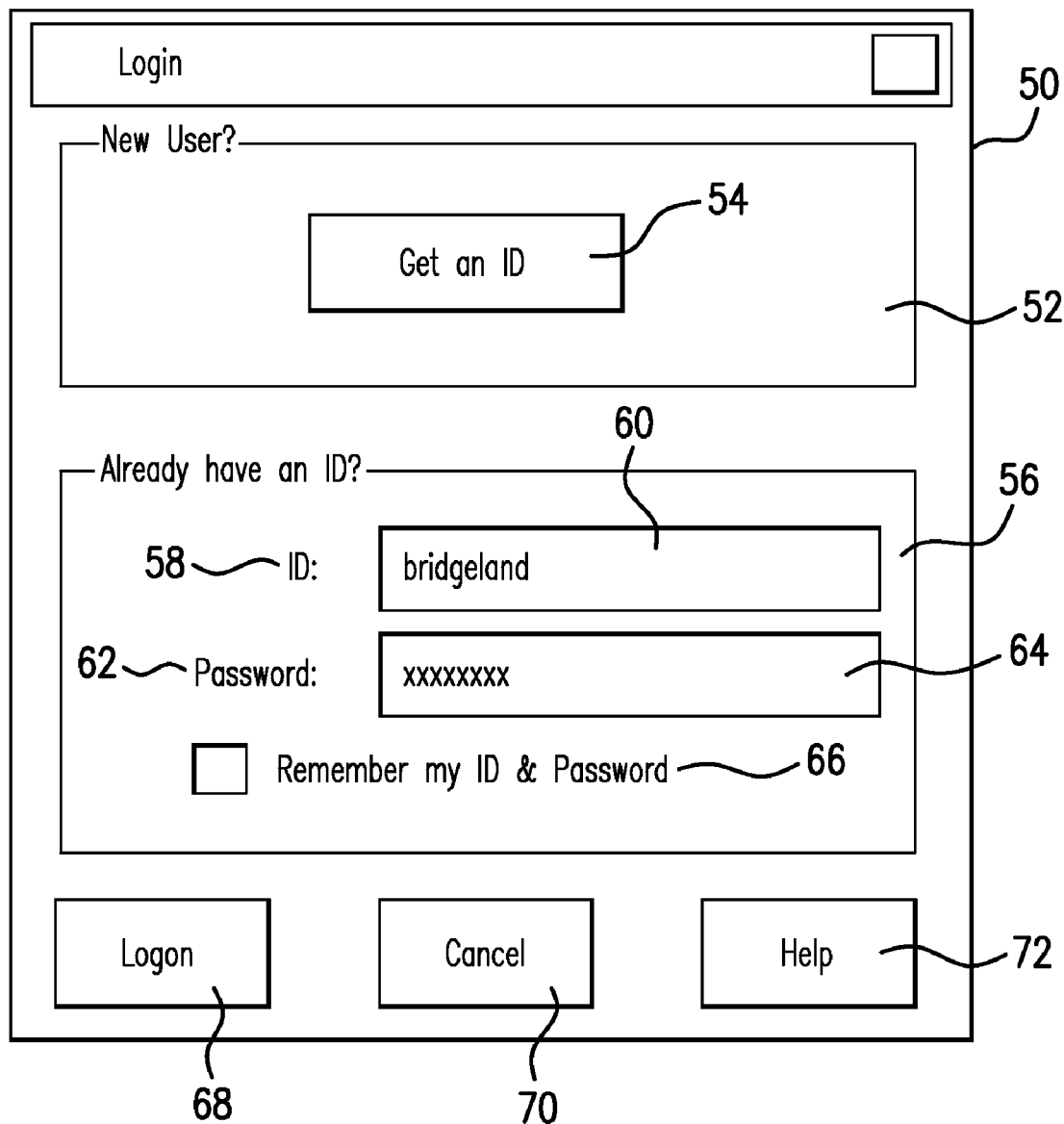
FIG. 2 is a diagram that illustrates a LoginBox of a user interface, created in accordance with one embodiment of the present invention.

FIG. 2 is an example of a graphical user interface which may be created by a user. In this case, the graphical user interface which is shown is a small window for logging into an application, which is very similar to the type of log-in box which is employed in a Windows"" environment. The user creates this log-in box by placing several objects into position on the screen. For instance, the user places in the window 50 a first group box 52 called "New User?" and a second group box 56 called "Already Have an ID?". In first group box 52, the user positions button 54 called "Get an ID".

In second group box 56, the user positions label 58 called "ID" with a corresponding edit box 60 for the user to enter an ID. The user also positions in second group box 56 a label 62 called "Password" with a corresponding edit box 64 for the user to enter a password. Also in second group box 56, the user positions a checkbox 66 which is called "Remember My ID & Password". Below the second group box 56, the user positions button 68 called "Login", button 70 called "Cancel" and button 72 called "Help".

As previously mentioned, once a user has created a user interface, designer module 17 creates a I3ML representation of these objects. In addition, once a user has associated properties, events and actions to these objects, designer module 17 creates a I3ML representation of these properties, events and actions also. In order to do this, designer module 17 employs the I3ML data format, which follows the commonly used XML format.

The I3ML Language,

The I3ML language is comprised of elements which, arranged according to a pre-determined syntax, describe how a user interface is to be displayed to a user and functions that are to be performed upon a user interacting with the interface items of the interface. As previously mentioned, the pre-determined syntax of the I3ML language is the same as the syntax that is employed by XML. Advantageously, designer module 17 generates code employing the elements and using the desired syntax, although it is noted that the code may also be generated by other means, such as by a programmer. This section illustrates how the elements and syntax are employed to generate code which is used by the system of the present invention.

The elements which are employed by the present invention are, according to one embodiment of the invention, as follows:

TABLE 1.1

Elements List action
I3ML
bulkinsert
chunk
column
content
data
delete
deletecolumn
deleteitem
file
group
header
if
insert
insertitem
member
method
object
property
receive
send
server
sort
update
updateitem An action element describes a local or remote procedure that is associated with an event through the 'method' element. Remote actions and local actions have different attribute values. Its children can be any number of send and receive elements, in any order. Send and receive elements have been detailed later in this section. FIG. 4(*a*) shows the attributes and value types of various actions.

FIG. 4(*b*) shows an example of a I3ML file corresponding to a remote action. In this example, the action code resides on the server specified as "server1". The file on the server is an ASP file specified in the target as "soapadd.asp". The method of communication is a SOAP request. The soapaction attribute is present in the soap request header and is used by firewalls to filter the soap request message. The name of the target service for the soap request is identified by the soapservice attribute. This attribute is present in the body of the soap request. The interval attribute specifies whether or not the function is periodic. If this attribute has a negative value, then the action is non-periodic, however, if the value is zero or a positive number, then the action is executed repeatedly after the specified interval. The interval value is specified in seconds. In the above example, the function is not a repeating call, therefore there is no value for interval. The onfail attribute refers to another action that will be executed when this action fails. That action in this example is called "failedaction." This action must also be defined in the I3ML in the same way as the "addlocally" and "addremotely" actions have been defined in the above examples. By setting the blockgui attribute to "false", the user can continue to interact with the application while the action is being executed.

The parameter constant is used to specify values that cannot be edited by the user. In the above example, it is specified as "add" and is passed to the "name" variable on the server-side. When utilizing the I3ML server software the "name" constant specifies the target name on the server side. Active Server Pages can also contain functions to call from I3ML actions. The ASP could house numerous functions and the "name" parameter tells the server which one to process. Additionally, the 'constant' parameter is used to pass any application-dependant values to the server.

The first two parameters specified in the action element are the two numbers to be added. The "text" values in the two editboxes, "editbox1" and "editbox2" are copied into the two variables in the function call, param1 and param2. The result of the action (the sum of the Iwo values) is taken from the result variable and copied into another editbox named "editbox3".

FIG. 4(*c*) shows an example of a I3ML tile corresponding to a local action. This example performs the same result in the User Interface as the first example, but the I3ML player renders the result in a different way. Instead of accessing the server to perform the action, the values are added locally in the I3ML player by calling the "add" function in the "Local. Math" section of local actions. The method is "I3ML" because there is no server request type. In the above example, the parameters and results are exactly the same because the values are received from the same objects on the screen and the function variable names are conveniently named the same in the local function as in the Remote function. However, the local function names might not always be the same as the names of the remote function.

In the above examples, the properties were supplied by the object specified as a value for the "from" attribute of the "send" object. However, if "_sender_" is supplied as a value for the "send from" tag, then the value for the specified property is obtained from the object initiating the action. This object is the control that the action is attached with through the "method" object. Therefore, "_sender_" is used to resolve the parameters at runtime.

The I3ML element is the outermost element tag for all the other I3ML elements. Advantageously, every I3ML file has a I3ML element (in a preferred embodiment, employs the tag "iii") as the outermost element tag in order to be valid and read by the I3ML player module. The children of the I3ML element are the insert, update, and delete elements.

FIG. 4(d) shows an example of a I3ML file corresponding to a I3ML element. This example is a very simple representation of a I3ML application. The I3ML element contains two objects within the insert element—"I3MLForm1" and "Edit-Box1". Every I3ML application begins with an I3ML object of class window. This object is the basic window that all of the other elements reside on (e.g.—are a child of). It is noted that, in accordance with a preferred embodiment, each object would have numerous properties associated with it. The "}" represents n number of additional properties.

The bulkinsert element is used to enter a series of values into a complex control such as a grid, listbox, dropdown, or tree. This element allows string values separated by commas to be entered easily into a control without having to write out all the code to enter data into each cell one by one. There are two ways in which bulkinsert can be used to populate data in a grid or tree control, 'keyed' and 'nonkeyed'. Tree controls support a third type of bulkinsert called 'semikeyed' bulkinsert also. FIG. 4(e) shows the attributes and value types of various actions for a bulk insert element.

Figures 4F, 4G:
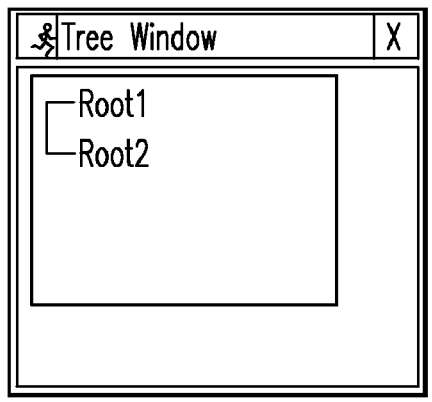
FIGS. 4(a) through 4(hhh) show a description, attributes and content model of various elements, in accordance with one embodiment of the present invention.

FIG. 4(f) shows an example of a tree control wherein data is to be populated.

FIG. 4(g) shows an example of a I3ML file which populates data into the tree control using the 'keyed' format. In this format, three properties are used to define each item: the parentid (itemid of the parent), the itemid (ID of the item to be inserted), and the itemtext (the text to be displayed next to the item). These properties are specified as follows:

```
<bulkinsert format="keyed">
parentid,itemid,itemtext
</bulkinsert>
```

In this example, two nodes, 'Root3' and 'Root4' are added to the tree control. To specify a particular node as a root node of the tree the parent ID is left blank. Therefore, ",3,Root3" defines a root node with itemid "3" and itemtext 'Root3'. Its child named 'Child3a' with itemid '9' can be defined as "3,9,Child3a". The abridged piece of code in the example also adds two child nodes each to the existing root nodes and renders the following tree control.

The chunk element is used to store I3ML code locally within the main I3ML file. The I3ML code supplied as chunk is executed at runtime. The chunk tag can contain any I3ML code including insert, update, or delete. This enables actions like insertion or deletion to be executed locally, without connecting to the server. However, the chunk element cannot be used to insert or update another chunk. This element appears within the insert, update, or delete tags at the same level as the action, object, and server elements.

Chunk has two mandatory attributes, name and contenttype. The content within the chunk can be either I3ML or a reference to a file object. The contenttype attribute is used to define the type of content and it accepts 'file' and 'I3ML' as values. If the chunk contains I3ML, then the contenttype value is 'I3ML'. The value is 'file' if the chunk contains reference to a file object.

A chunk element can have parameters, which are substituted at runtime. These parameters are written enclosed within curly brackets { }. These values can be obtained from the properties of any other object defined in the I3ML.

The applychunk method of the Local.Process library is used to execute the chunk element. The chunk is named using the name attribute and this name is used in the applychunk method to refer to the chunk. FIG. 4(h) shows the attributes and value types of various actions.

Figures 4J, 4K, 4L, 4M:
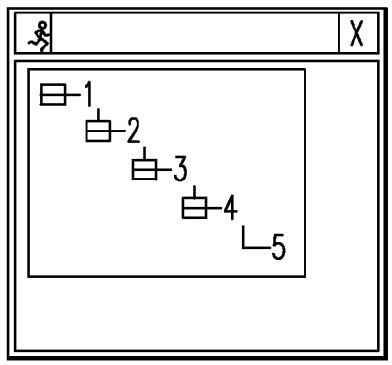

FIG. 4(i) shows an example of a I3ML file wherein 'loginI3ML' is the name of the file object that refers to the file containing I3ML. This file has been defined in the I3ML. The chunk has been named 'filechunk' and the 'showwindow' action uses the applychunk method to execute this chunk FIG. 4(j) shows an example of a I3ML file wherein the chunk named 'showehunk1' is executed using the applychunk method. When the action associated with the applychunk method is executed, the player executes the 'showchunk1' chunk, which changes the color property of 'window1' to the substitute value of {color1}'.

The column element is used to define the columns within a grid control. This tag is used at three different levels. First, the column tag is used to specify the column-level properties of the different columns in the grid. Next, the column tag is used within the data tag to define the data that needs to be inserted, deleted, or updated in a column at the item level. Finally, the column tag is used within the sort to define the order in which data should be sorted inside the columns. FIG. 4(k) shows the attributes and value types of various actions.

FIG. 4(l) shows an example of a I3ML file wherein the abridged piece of code will insert a column named 'first' in the 'ggrid' control. Next, data is entered in the grid using the column tag within the data tag. Finally, the column tag within the sort tag is used to specify the sort order of the different columns.

The content element is a child of the chunk element and contains either the I3ML code or reference to a file object. The name of the file object is specified within the content tag if the contenttype is 'file'. FIG. 4(m) shows an example of a corresponding I3MI. file.

The data element is used to populate multi-item controls, such as dropdowns, trees, grids, and listboxes. Children of the data element can be a series of insertitem, updateitem, deleteitem, and bulkinsert elements representing each item or row in the object. FIG. 4(n) shows an example of a data element corresponding I3ML file.

The delete element contains elements to be removed from the local application state. Elements that can be deleted are objects, actions, groups, and files. FIG. 4(o) shows an example of a I3ML file corresponding to a delete element. This example deletes the object, "EditBox1."

The deletecolumn element specifies the column to be removed from a grid control. The column that is being deleted should currently exist in the grid and therefore this element is sent as an update of the grid. FIG. 4(p) shows the attributes and value types of various actions.

FIG. 4(q) shows an example of a I3ML file that deletes the column, "col5", from the "samplegrid" control.

The deleteitem element is the child of a data element for complex controls. The deleteitem element contains the itemID or itempath of the item that needs to be deleted in a tree, dropdown, listbox, or grid. FIG. 4(r) shows the attributes and value types of the deleteitem element. The supported attributes of deleteitem are only valid for tree controls.

FIG. 4(s) shows an example of a I3ML file wherein the abridged piece of code will delete the item with itemid '1' from the 'grdgrid' object.

The file element references a file located on a server to be read by the I3ML player. Files can be reused in numerous applications. Images are referenced in an I3ML application using the file element. FIG. 4(*t*) shows the attributes and value types of various actions.

FIG. 4(*u*) shows an example of a I3ML file wherein a file reference inputs a *.bmp file that resides on the server 's1' into the I3ML application. The hostfilename attribute specifies the name and location of the file on the server. If the preload attribute is set to true, then the file is downloaded from the server as soon as the player reads the I3ML file. However, if this attribute is set to false, then the file is downloaded only when it is to be rendered.

Group elements describe collections of actions using simple workflow language. The actions in an action group can be specified as either sequential or parallel. FIG. 4(*v*) shows the attributes and value types of various groups.

FIG. 4(*w*) shows an example of a I3ML file corresponding to a parallel group. In this example, The group named "agroup1" consists of two actions, "addlocally" and "addrepeat" that are completed in a parallel process—both actions are run at the same time. If one fails the other keeps running. However, if the group contains more actions than what can be executed at a time, then the rest of the actions are fired one by one, as the actions being executed are completed. For each action that completes execution, an action from the remaining set of actions is fired. If an action fails, then the remaining actions are not fired, however the actions already being executed are not cancelled and their execution is completed. If one of the actions fails in a group, the onfail action that is called is the one of the group. If the individual actions have onfail actions specified, they are ignored. Similarly, the value of the interval property for the group overrides the interval value for the individual actions.

FIG. 4(*x*) shows an example of a I3ML file corresponding to a sequential group. In this example, The group named "agroup2" has two actions, "addlocally" and "addrepeat" that are completed in a sequential process. "addlocally" is executed first and upon completion "addrepeat" is executed. If the first action fails, the group ceases and the "addrepeat" action is not executed. When any fails in a group, the onfail action associated with the individual action is run. The onfail actions associated with the individual sequential groups are ignored.

FIG. 4(*y*) shows an example of a I3ML file corresponding to a nested group. The group named "agrouptotal" has two groups, "agroup1" and "agroup2" that are completed in a sequential process. "agroup1" is run first in a parallel process and upon completion "agroup2" is run sequentially. If the execution of either group fails, then the onfail action defined for 'agrouptotal' is fired, just like it is fired for 'agroup1' in example 1, and 'agroup2' in example 2.

The header element is a reference object that contains information about the file name, author, version, etc. Every I3ML file should contain a header element as good practice, but it is not required. FIG. 4(*z*) shows the attributes and value types of the header element.

FIG. 4(*aa*) shows an example of a I3ML file corresponding to a header element. The header element specifies that this file is version "1.2" and the author of the file is "Smith" and he can be reached at "smith@email.com".

The if element is a conditional action element that is a child of a group element. The if element accepts two values and an operator to determine whether or not the action is executed. If the conditional statement is true, the 'then' value of the 'if' element is executed. Otherwise, there is an 'else' action that can be specified. FIG. 4(*bb*) shows the attributes and value types of the "if" element.

FIG. 4(*cc*) shows an example of a I3ML file corresponding to an if element. In the example, the text value of 'edit1' is compared to the text value of 'edit2'. If the value of 'edit1' is less than the value of 'edit2', then 'action1' is executed, else 'action2' is executed.

FIG. 4(*dd*) shows an example of a I3ML file corresponding to an if element. In the example, the value of 'constant1' is compared to the value of 'constant2'. Since the first value is not less than the second value, 'action2' is executed. FIG. 4(*ee*) shows a list of operators for the if element.

The insert element contains elements to be added to the local state of the application. Possible inserted elements are server, chunk, objects, actions, groups or files in any order. Elements already present in the local application state cannot be re-added.

FIG. 4(*ff*) shows an example of a I3ML file that inserts two objects, two actions, and one group into the local state of I3ML. The order of the objects, actions, and groups does not matter as long as the parent is defined before the children.

The insertitem element is the child of a data element for complex controls. The insertitem element contains properties of the items in a tree, dropdown, listbox, or grid. FIG. 4(*gg*) shows the attributes and value types of the insertitem element. The parent of an item can be referenced either by specifying the parentid or the parent path. The parentid attribute specifies the ID of the item that is parent to the item being inserted and the parentpath attribute specifies the path of the parent object. Values for parentid and parentpath can be specified only in the case of a tree control. For an item in a tree control, either the parentid or the parentpath is specified. if both parentid and parentpath are specified, the value of parentid overrides the value of parentpath.

FIG. 4(*hh*) shows an example of a T3ML file wherein a tree control is defined. The root of this tree control has an itemid '1'. The name that will be displayed for the root is 'Root1'. Next, a branch named 'Child1' with itemid '2' is defined. The parent of this branch is specified using the parentid attribute. The itemid of the parent has been specified as the parentid.

FIG. 4(*ii*) shows an example of a I3ML file wherein the abridged piece of code can be used to create the tree object shown in FIG. 4(*jj*).

In this example, a tree has been created with a root named '1'. This root has a branch named '2', which has a branch named '3', and so on. The parent items of these branches have been defined using itemtext values. The complete path of the parent has been specified as the parentpath. For example, parentpath="1\2\3" in the code, defines the parent of a new item (item '4'). The parentpath of this item is specified as '1\2\3'. This indicates that item '4' is the item to be inserted as a child of item '3', which is a child of item '2', which in turn is a child of item '1'.

While trying to insert a new item in the list, if any of the parent nodes are not found, then they are created first and then the item is inserted. For example, the tree of FIG. 4(*jj*) could have been rendered using the code in FIG. 4(*kk*) also, where the parent nodes have not been defined.

The member element represents an action or group within another group. Groups are made up of one or more member elements.

FIG. 4(*ll*) shows the attributes and value types of various actions.

FIG. 4(*mm*) shows an example of a I3ML file which shows a group with two members, 'addlocally' and 'subtractlocally'.

The method element associates the object, event, and action with each other. The method element is a child of an object. The name of the method refers to the event captured on the object and the value attribute specifies the action that is executed when the event occurs. This action has to be defined in the I3ML. FIG. 4(*nn*) shows the attributes and value types of the method element.

FIG. 4(*oo*) shows an example of a I3ML file corresponding to an method element. The example associates the action "addlocally" with the "leftclick" event performed on the "button3" object. Every object, which has a dynamic action associated with an event, must have a method element to associate the elements in the I3ML player.

As previously mentioned, every visual piece of an I3ML application is an object. Objects can be editboxes, panels, windows, labels, and so on. Apart from the main window, each object has a parent object and most objects support child objects. Parent objects must be defined in the I3ML before their respective child objects. Property is an element of an object. Objects arc differentiated by their properties. Every object has a series of properties that define that object, but every possible property does not require a value. The properties are mostly updateable and are often changed by actions at runtime. There are a few properties for certain objects that are not updateable. FIG. 4(*pp*) shows the attributes and value types of the object element.

FIG. 4(*qq*) shows an example of a I3ML file wherein 'I3MLform1' is a window object. This object is the topmost parent of all objects.

FIG. 4(*rr*) shows an example of a I3ML file wherein 'groupbox I' is a groupbox that resides inside the '13MLform1' window.

FIG. 4(*ss*) shows an example of a I3ML file wherein the editbox is a child of the 'groupbox1', which is ultimately a child of the 13MLform1' window. The name, class, and parent of any of these objects cannot be changed at runtime.

Property elements define the attributes of objects. Each property is used to specify the individual values of the object characteristics. Properties of objects can be listed in any sequence. FIG. 4(*tt*) shows the attributes and value types of the property element.

FIG. 4(*uu*) shows an example of a I3ML file corresponding to a property element. This example displays a series of properties of an editbox. There are many more properties associated with editboxes. If a property value is not specified, the object takes the default value for that property.

The receive element is a child of an action element and specifics where the server response goes. This element accepts a server variable and converts it into an attribute value of an object. FIG. 4(*vv*) shows the attributes and value types of the receive clement.

FIG. 4(*ww*) shows an example of a I3ML file corresponding to a receive element. In the example, the result of the action (the multiplication value) is taken from the result variable and copied into an editbox named editbox2. The from attribute value specifies the server variable, and the value of the to attribute indicates the I3ML object to which the server response is to be copied. The server response is copied to the specified property of the object. The property attribute is used to indicate the property to which the server response should be copied. However, if no property has been mentioned, then the response is copied to the default property of the I3ML object.

The send element is a child of an action element. The attributes of a send element convert the property values of an object into function variables to perform the action. The constant is an additional variable that is not determined by user input. FIG. 4(*xx*) shows the attributes and value types of the send element.

FIG. 4(*yy*) shows an example of a I3ML file corresponding to a send element. In this example, the first parameter specified in the action element passes the value to be multiplied, which is determined by the object name and property name ("editbox1" and "text"). This value is copied into the service variable "param1". The second parameter is a constant value that is not accepted from a value in the user interface, but specified at design time. It indicates the number with which the first value needs to be multiplied. The last parameter specifies the name of the service specified in the target property of the action. The result is then displayed as a value for the specified property of "editbox2". However, if the property is not specified, then the value is passed to the default property of the object.

As previously mentioned, The server element describes a server that the application connects with to insert a file or perform an action or group of actions. The server can reside on the same machine on which the application is running or on any other machine connected by some kind of communication protocol. FIG. 4(*zz*) shows the attributes and value types of the server element.

FIG. 4(*aaa*) shows an example of a I3ML file corresponding to a server element. The server, "server1", can be referenced by name in any number of actions and files. In this example, the server resides on the same machine as the application. More realistically the server will reside on a separate machine as in the next example.

FIGS. 4(*bbb*), 4(*ccc*) and 4(*ddd*), on the other hand, illustrate examples of the server element as employed for a remote server using a host name, an IP address and a URL address, respectively.

The sort element describes the order in which data is sorted within a column in a grid control. The sort clement can be used to specify the sorting order for multiple columns. The column tag is used within the sort tag to specify the name of each column and direction of sorting of data. FIG. 4(*eee*) shows an example of a I3ML file wherein the data in 'column1' will be sorted in ascending order, and the data in 'column2' will be sorted in descending order.

The update element contains elements, which will change the value of local application state of elements. Its direct children are any number of objects, actions, groups, files, or servers in any order. FIG. 4(*fff*) shows an example of a I3ML file wherein an update is occurring in editbox3 and editbox4. The value of the "text" attribute is now equal to "updated" in the first object and the color has been updated to "00FF00" (green) in the second object.

The updateitem element is used instead of insertitem in update mode to change the values of the properties of items in complex controls. The parentid attribute specifies the ID of the parent item and the parentpath specifies the path of the parent item. These can be specified only in the case of a tree control. However, like in the insertitem element, the parentid attribute supersedes the parentpath attribute.

While updating tree items, specifying the parentid or parentpath is necessary. If neither of these is supplied, then the I3ML player treats the item being updated as a root node. This occurs because the player cannot locate the parent node and it creates a new node with the item being updated as the root node.

FIG. 4(*ggg*) shows the attributes and value types of the updateitem element.

FIG. 4(*hhh*) shows an example of a I3ML file corresponding to an updateitem element.

As mentioned above, one type of element is referred to as an "object". Objects are the visual components that comprise a user interface. The objects which are employed by the present invention are, according to one embodiment of the invention, illustrated in Tables 1.2:

TABLE 1.2

Objects List button
check
datetimepicker
dropdown
editbox
grid
groupbox
label
listbox
mainmenu
memo
menuitem
numericedit
panel
picturepanel
player globalobj
radio
speedbar
speedbargroup
speedbaritem
tabset
tabsheet
tree
toolbar
toolbutton
window FIGS. 5(a) through 5(z) show, for each of the objects listed in Table 1.2 a list of the properties that may be attributed to the object, a list of the events that may be associated with each of the objects, and an example of how the object may be described in the I3ML language. A brief description of each object is as follows:

A button object, which is illustrated in FIG. 5(a), is a simple button object frequently used to capture events and perform associated actions. When the user clicks the button, the image appears depressed. Images can be specified for buttons, along with different images for button-down and button-mouseover. There are two different styles for buttons, Regular and Rounded. RoundedButtons have a series of different attributes.

A check object, which is illustrated in FIG. 5(b), is a standard user interface Boolean representation, a checkbox. When the control is checked, the value is true and unchecked is false. The graphic changes as the user hovers the mouse over it.

Figure 5C:
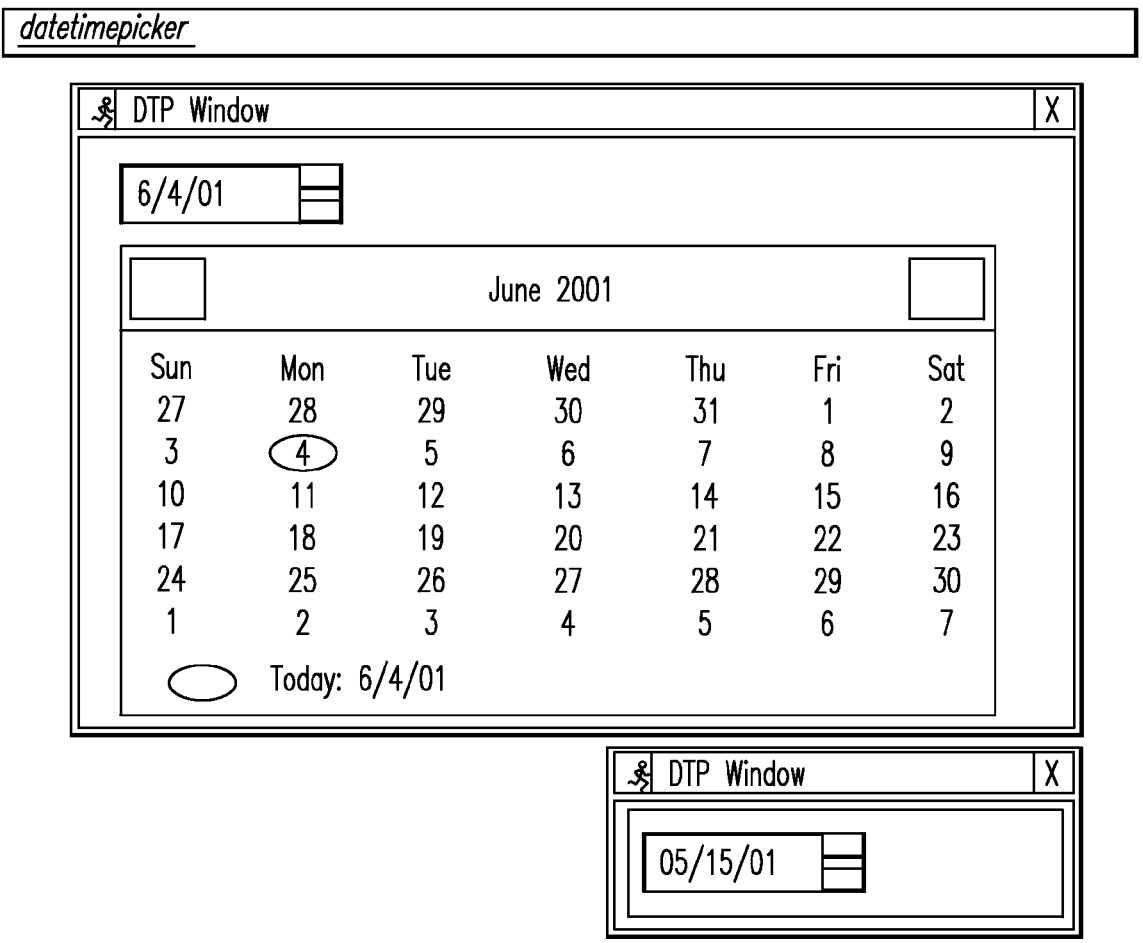
FIGS. 5(a) though 5(z) show a description, a list of the properties and an example of various objects, in accordance with one embodiment of the present invention.

A datetimepicker object, which is illustrated in FIG. 5(c), is a dialog box for selecting a date and time value. Using the style property, this control can be configured to display either a popup box or spin arrows for selecting the date or time. This property can be specified only at the time of creation of the control.

A dropdown object, which is illustrated in FIG. 5(d), is a version of the standard drop-down combo box. The values to be displayed in a dropdown control are specified using a data element containing a series of insertitem child elements.

Data is entered into a dropdown control using the data tag. The insertitem tag is used to add data to the dropdown control, the updateitem tag is used to update a value already present in the control, and the deleteitem tag is used to delete an existing value from the control.

Like grids and listboxes, some of the attributes are only available at the item level; they are denoted with an * in FIG. 5(d). Additionally, there are a number of properties that are readable at runtime; they are denoted with a '.

An editbox object, which is illustrated in FIG. 5(e), is a data entry box that accepts a single line of text as its value. The value can be a default value specified when the control was created, a value entered by the user at runtime, or set from an action procedure from a server call.

A grid object, which is illustrated in FIG. 5(l), is a standard control to represent a simple database table. In this control, multiple selection of data is possible. The rowselect property is used to specify whether or not an entire row can be selected, and the multiselect property is used to specify whether or not multiple cells and rows can be selected. Cell type is limited to entire columns. Celltype can be a dropdown or, if not specified, the cell is a simple MS Excel-type cell. Each column and row has an ID or name associated with it at conception defined by the developer. Each row is referred to as an 'item'. Some of the attributes are available only at the item level or column level; they are denoted with an * or ~, respectively. There are a number of properties that cannot be set but are used to retrieve specific values at runtime. These are denoted with a '.

In a grid control, first column properties are defined using the column tag. Within the data tag, the insertitem, deleteitem, and updateitem tags are used for insertion, deletion, and updation of items. Within these tags, the column tags are used to enter data into specific columns.

The sort tag is used in the grid control to specify the sorting order of data within multiple columns.

The groupbox object, which is illustrated in FIG. 5(g), is a standard grouping panel with a caption and a line around the panel. Any number of child objects can be placed inside a groupbox. This control is commonly used to separate and/or group different controls together, such as a set of toggle radiobuttons.

The label object, which is illustrated in FIG. 5(h), is a control that is used to display any text on the screen.

The listbox object, which is illustrated in FIG. 5(i), is a version of the standard list box. The lines in the listbox control are items. The items can be entered at creation or dynamically from a server. The items in the list are selectable by the user. Like grids, some of the attributes are only available at the item level; they are denoted with an *. There are a number of properties that are readable at runtime; they are denoted with a '.

Data is entered into a list control using the data tag. The insertitem tag is used to add data to the listbox control, the updateitem tag is used to update a value already present in the control, and the deleteitem tag is used to delete an existing value from the control.

A mainmenu object, which is Illustrated in FIG. 5(j), is a parent object that can contain any number of child menuitems to build a menu allowing the user to traverse through and select different items to perform different tasks associated with the items. The mainmenu object must be the child of a window object and cannot be created on any other controls. The menu can be undocked and moveable around the screen as in the second image on the right. The pictures below have a series of menuitems on the menu in order for the control to be rendered on the window. Mainmenu objects without menuitems are not visible to the user.

Memo is a multi-line edit box, which is illustrated in FIG. 5(k). This edit box allows multiple lines of text to be entered. The memo object supports horizontal and vertical scrollbars and the wordwrap feature.

Menuitem is the child of a mainmenu object, which is illustrated in FIG. 5(l). Menuitems must have a mainmenu or another menuitem as their parent in order to be rendered on the screen. Normally actions are associated with the items allowing the user to select the items at runtime. A menuitem can have any number of child menuitems. An arrow to the right of the parent menuitem denotes the existence of child menuitems. To view these child menuitems, hover the mouse over the parent menuitem. This displays another popup window containing the child items. The menuitem object supports both hot keys and accelerator keys. A menu separator line can also be inserted by leaving the caption property blank.

The numericeditbox object, which is illustrated in FIG. 5($m$), is a data entry box that allows a single line of text as its value. The value must be in numeric and can have any certain mask type characteristics set by its properties.

The panel object, which is illustrated in FIG. 5($n$), is a version of a group box without a border title area. Any number of children objects can be placed on a panel. The panel is viewed as a raised surface on the window.

The picturepanel object, which is illustrated in FIG. 5($o$), is a control on which an image is rendered. The image types supported are .bmp, .dib, and jpeg. The image files need to be defined in the I3ML. The server that these files are located on, also has to be defined.

A playerglobalobj is a memory object, which is illustrated in FIG. 5($p$). This object is not a visual object and cannot be seen on the screen. This object does not need to be created explicitly in an I3ML file and neither can it be deleted. It is created automatically as soon as a player instance is created and is deleted as soon as soon as the application is closed. This object is used for retrieving and setting properties.

A radio object, which is illustrated in FIG. 5($q$), is a simple toggle radio button. Grouped radio buttons can only have one true value. Therefore when one is selected, all of the others are deselected. The graphic changes slightly as the user hovers over it.

A speedbar object is described in FIG. 5($r$). A speedbar is similar to a navigation bar. Items can be placed on collapsible windows that link to different screens in the application. A speedbar is similar to a menu bar, because it is two-dimensional. There can be a number of menus in the bar each with multiple items.

The speedbar control does not support top and height properties. A speedbar window is always created of the same height as its parent.

A speedbargroup, which is illustrated in FIG. 5($s$), is a child object of the speedbar object. It is a collection of speedbaritems. Multiple items can be placed inside each speedbargroup object.

A speedbaritem, which is illustrated in FIG. 5($t$), is a child object of a speedbargroup. Each speedbaritem can have actions associated with it. Picture images can also be placed on speedbaritem objects.

A tabset object, which is illustrated in FIG. 5($u$), allows for multiple panels, called tabsheets, to be situated on top of each other and the user to switch between them by clicking on a tab protruding from the sheets. The control can have any number of child tabsheets. If the number of tabsheets is greater than can fit across the top, arrow keys appear in the top right corner to allow the user to traverse through the tabs.

In the property list, properties not available at runtime are denoted with ~. Additionally, there are a number of properties that are readable at runtime. These are denoted with a ' in the table given below.

A tabsheet object, which is illustrated in FIG. 5($v$), is a child object of the tabset control. Each sheet is represented as a layered panel in a tabset control. The user can switch between tabsheets by clicking on a tab protruding from the sheets.

A tree object is illustrated in FIG. 5($w$). The tree control is a standard tree object. The nodes in the tree are listed as data elements in the object. The nodes can be defined at creation or dynamically from a server. Like grids and listboxes, some attributes are only available at the item level and some properties are readonly. They are denoted with * and ', respectively. Additionally, there are some properties that are available both at the tree and item level. These are denoted with ".

Data is entered into a free control using the data tag. The insertitem tag is used to add data to the tree control, the updateitem tag is used to update a value already present in the control, and the deleteitem tag is used to delete an existing value from the control.

The toolbar object, which is illustrated in FIG. 5($x$), is a child window that can be placed on the window object. The toolbar has child objects called toolbuttons, which can display an image, a string, or both. The user can click on a toolbutton to perform different actions. This toolbar is similar to toolbars in any application, such as a word-processing application or browsers. Toolbars without toolbuttons are rendered as empty, like the image below. None of the attributes need to have values in order for a toolbar to function.

The toolbutton object, which is illustrated in FIG. 5($y$), is a child object of the toolbar control. Toolbuttons are button-like objects placed on a toolbar that perform different actions when events associated with them are occur.

The window object, which is illustrated in FIG. 5($z$), is the primary window in which all objects or elements of a screen are built. It is typically like a frame object. Each application needs at least one window. The window control is the top most parent of all other objects.

Referring now to FIG. 2, by way of example, an object, such as the window box, the edit boxes, the buttons, etc. shown in FIG. 2, may be represented in I3ML code in the following way (abridged for the purpose of illustration):

```
<objectname="GetIDButton" class="button">
</object>
```

Each object is of a particular class, in this case the "button" class. Other classes include "windows", "radiobuttons", "groupboxes", "editboxes", "labels", etc.

Figure 3:
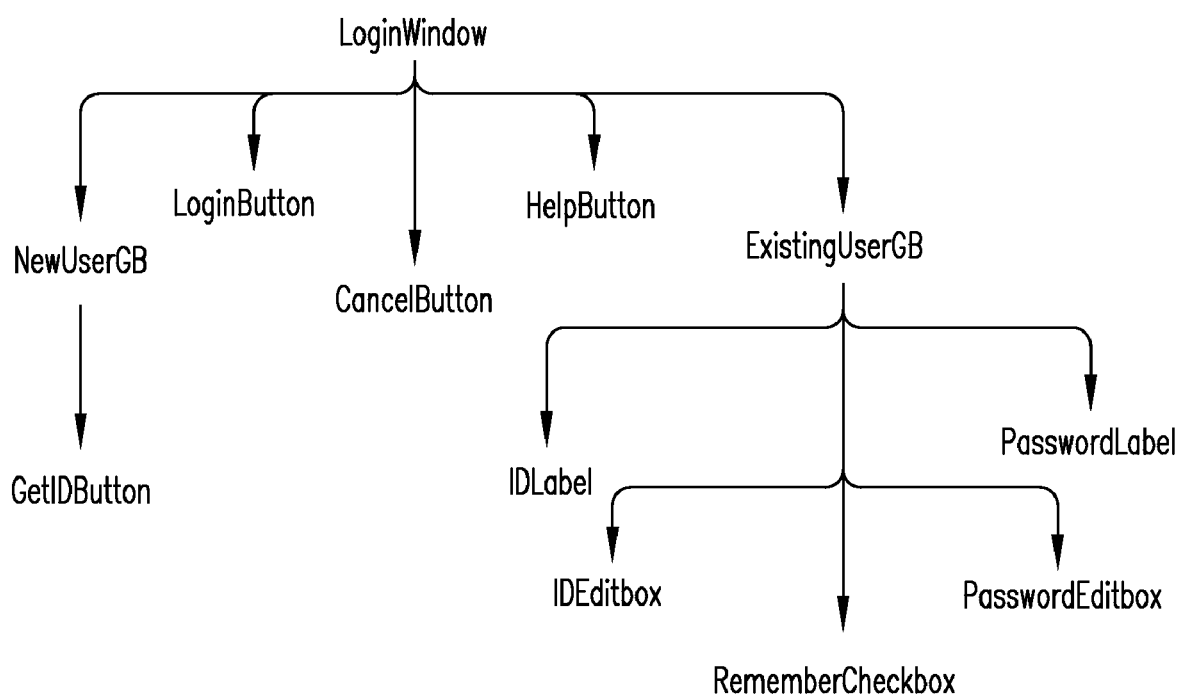
FIG. 3 is a diagram that illustrates a tree hierarchy for the data objects that comprise the LoginBox of FIG. 2, in accordance with one embodiment of the present invention.

Altogether twelve objects should be defined to create the log-in window shown in FIG. 2: one window, one check box, two group boxes, two labels, two edit boxes, and four buttons. Because some of these objects are positioned within other objects, a hierarchy of objects is established. When a first object is positioned within a second object, the first object is referred to as a "child" of the second object, while the second object is referred to as a "parent" of the first object. Employing this parent/child hierarchy, objects can be arranged in a tree-like structure. FIG. 3 shows a tree-like structure which illustrates the parent/child hierarchy of the login window shown in FIG. 2.

Within a file of I3ML data, the parent relationship of a first object in relation to a second object is indicated by the parent attribute of the object element. For instance, in FIG. 2, the "Login" windowbox object is a parent of the "NewUser" groupbox object, which in turn is a parent of the "GetID" button object. These three objects are expressed in the I3ML language (abridged for the purpose of illustration) as shown below. It is noted that, in a preferred embodiment, the parent object is referred to in the I3ML language by name, and in fact, all elements are referred to in the code by their respective names.

```
<object name="LoginWindow" class="window">
<object name="NewUserGroupbox" parent="Login Window"
      class="groupbox">
</object>
<object name="GetIDButton" parent="NewUserGroupbox"
      class="button">
</object>
```

As mentioned above, the I3ML language also employs an element referred to as "property" in order to represent the attributes of an object. The attributes which are employed by the present invention, according to one embodiment of the invention, are illustrated in Table 1.3:

TABLE 1.3

3d
3state
Accelerator
Afteritem
Alignment
allitemsi3ml
allitemidsi3ml
altkey
ambientlight
animate expand
auto expand
autoscroll
boldexpandedgroup
bard erstyle
caption
cell type
checked
child
class
clearselected
elicktosort
collapseditemidi3ml
colheader
colnum
color
colresize
colswap
colwidth
controlkey
decimalgroups
decimalplaces
decimalseparator
defaultbutton
defaultimage
direction
disabledimage
dockedposition
dragdrop
dropdownheight
editable
enabled
expand
expandall
expanded itemidi3ml
extendedsel
externalradius
flat
fontbold
fontcolor
fontitalie
fontname
fontsize
fontstrikeout
fontunderline
format
gridlinecolor TABLE 1.3-continued gridlines
groupseparator
hashlines
headercolor
headerdragdrop
headerfonteolor
height
helpbutton
helptext
highlighthotitem
hint
horizontalalignment
horizontalangle
hotimage
hottexteolor
icon
imageheight
imageoffset
imagewidth
index
inputmask
insertmode
internalradius
itemid
itemtext
itempath
itemtips
leadingzero
left
linecolor
maxdigits
maxhscroll
maximizebutton
maxlength
maximumdate
maxvscroll
minimizebutton
minmumdate
minimumheight
minimumwidth
multiline
multiselect
modal
movable
name
negativecolor
negativeformat
newselectedi3ml
oldselectedi3ml
parent
parentid
parentpath
password
picture
picturemouseover
pictureup
positiveformat
prompt
readonly
round
rowheader
rowheight
rownum
rowresize
rowselect
rowseparator
scroll
scrollbars
scrollinggroup
selected
selectedindex
selecteditem
selecteditemid
selecteditemi3ml
selecteditemidi3ml
selectedrowi3ml
selectedtabsheet
selectedtabsheetid
separator
shiftkey TABLE 1.3-continued showheaderdragimage
showitemdragimage
sorted
spotintensity
spotsize
stretch
style
systemmenu
taborder
tabstop
text
textalignment
textease
textonright
textoperation
textposition
top
trailingtexteolor
underlinehotitem
verticalalignment
verticalangle
visible
wantreturns
width
wordwrap For each of the attributes listed in Table 1.3, a description of the attributes and the valid values that may be employed in defining the attribute is as follows:

The 3d property specifies whether or not the control should appear sunken. The value type for this property is Boolean.

| Control | Valid Values | Default Value | Updateable |
|---|---|---|---|
| check | true, false | false | yes |

The 3state property specifies the state of a check control. If the value for this property is set to 'true', then clicking on the check control changes the state of the control to an intermediate (grayed) state. The next click on the control checks or unchecks it. The value type for this property is Boolean.

| Control | Valid Values | Default Value | Updateable |
|---|---|---|---|
| check | true, false | false | yes |

The accelerator property specifies a key that can be used to execute the command in the menu option. The accelerator is used in combination with the Alt key, Shift key, or Ctrl key. Additionally, the accelerator can be used with any two or all three of these keys. The value type for this property is String.

| Control | Valid Values | Default Value | Updateable |
|---|---|---|---|
| menuitem | string value | none | yes |

Dependency

The accelerator property is applicable only if any one or all the three properties, altkey, shiftkey, and controlkey, have been set to true.

The afteritem property inserts an item at a specific position between two tree items. The value type for this property is String.

| Control | Valid Values | Default Value | Updateable |
|---|---|---|---|
| tree | string value | none | yes |

The alignment property specifies the alignment of objects for certain controls. For example, the alignment of the picture in a picturepanel control is specified using the alignment property. The position of the tab buttons with reference to the tab control window can be defined using this property for the tabset control. The alignment of items in a tree can also be specified with the help of this property. The value type for this property is String.

| Control | Valid Values | Default Value | Updateable |
|---|---|---|---|
| picturepanel | left, center, right, topleft, topcenter, topright, centerleft, center, centerright, bottomleft, bottomcenter, bottomright | left | yes |
| tabset | left, right, top, bottom | top | yes |
| tree | left, center, right | left | yes |

The allitcrosi3ml property is a readable property of complex controls such as dropdown, listbox, tree, mainmenu, toolbar, and grid. It returns the ID and text of all the items as I3ML. The value type for this property is String.

The allitemidsi3ml property is a readable property of complex controls such as dropdown, listbox, tree, mainmenu, toolbar, and grid. It returns the itemids of all the items as I3ML. The value type for this property is String.

The altkey property specifies whether or not the Alt key should be used in combination with the accelerator to execute a menu command. The value type for this property is Boolean.

| Control | Valid Values | Default Value | Updateable |
|---|---|---|---|
| menuitem | true, false | false | yes |

The ambientlight property specifies the coefficient of ambient lighting. The value type for this property is integer.

| Control | Valid Values | Default Value | Updateable |
|---|---|---|---|
| button | integer value greater than zero | 7 | yes |

Dependency

This property is applicable only if the round property is set to 'true'.

The animateexpand property of the speedbar control gives a visual indication while the speedbargroup is expanding. The value type for this property is Boolean.

| Control | Valid Values | Default Value | Updateable |
|---|---|---|---|
| speedbar | true, false | true | yes |

The autoexpand property specifies whether or not an unselected group should get expanded when the mouse hovers over it. The value type for this property is Boolean.

| Control | Valid Values | Default Value | Updateable |
|---|---|---|---|
| speedbar | true, false | false | yes |

The autoscroll property specifies whether or not scrolling should take place when the mouse is moved over the scrollbuttons in a speedbar control. If this property is set to 'false', then scrolling takes place only on clicking the scrollbuttons. The value type for this property is Boolean.

| Control | Valid Values | Default Value | Updateable |
|---|---|---|---|
| speedbar | true, false | false | yes |

Dependency

The autoscroll property is applicable only if the scrollingroup property is set to true.

The boldexpandedgroup property specifies whether or not the expanded group in the speedbar should be displayed in bold font when it is expanded. The value type for this property is Boolean.

| Control | Valid Values | Default Value | Updateable |
|---|---|---|---|
| speedbar | true, false | false | yes |

The borderstyle property specifies a style for the border of a control examples could be a dotted line, a beveled look, or a simple resizable window. The value type for this property is String.

| Control | Valid Values | Default Value | Updateable |
|---|---|---|---|
| grid | 3d, flat, none | 3d | no |
| panel | 3d, recessed, flat | 3d | no |
| tree | 3d, flat, none | 3d | no |
| window | fixed, sizeable | sizeable | yes |

The caption property is the label or textual value associated with the control in the user interface. For example, the text value next to a radio or check object. The value type for this property is String.

Dependency

In the case of a grid control, the caption property is used to display the text of the column header or row header and is specified at the column level or row level, respectively. This property is applicable for a grid control only if the colheader property or the rowheader property has been set to true.

The celltype property specifies the type of cells that a column in a grid control should be composed of. The value type for this property is String.

| Control | Valid Values | Default Value | Updateable |
|---|---|---|---|
| grid | dropdown, normal | normal | no |

The checked property specifies the default state of a control. This property determines whether or not the control is displayed selected in its initial state. The value type for this property is Boolean/String.

| Control | Valid Values | Default Value | Updateable |
|---|---|---|---|
| cheek | true, false, grayed | false | yes |
| menuitem | true, false | false | yes |
| radio | true, false | false | yes |

The child property specifies whether or not a child window can move out of the parent window's client area. If this property is set to 'true', then the user cannot move the child window outside the parent window's client area.

The coordinates of the child window are relative to the parent window coordinates. For example, if the top and left values of the parent window are 10 and 10, respectively, then the coordinates for the child window will be '10+y' and '10+x', where 'y' and 'x' are the top and left values for the child window. The value type for this property is Boolean.

| Control | Valid Values | Default Value | Updateable |
|---|---|---|---|
| window | true, false | false | yes |

The class property specifies the I3ML object being referenced. The values for this property are predefined strings. The type of the control is specified as a value for the class property. This property does not have any default values and cannot be updated at runtime. The value type for this property is String.
Valid Values The valid values for the class property are object names, such as 'button', 'tree', 'grid', and so on.

The clearselected property specifies whether or not to clear all the selections made in a control. The value type for this property is Boolean.

| Control | Valid Values | Default Value | Updateable |
|---|---|---|---|
| grid | true, false | false | yes |
| listbox | true, false | false | yes |
| tree | true, false | false | yes |

Clicktosort is a column level property that specifies whether or not to allow sorting of the data in a column on clicking the column header. The value type for this property is Boolean.

| Control | Valid Values | Default Value | Updateable |
|---|---|---|---|
| grid | true, false | false | yes |

The collapseditemidi3ml property is a readable property of a tree control. It returns the ID of the collapsed node. The value type for this property is String.

| Control | Valid Values | Default Value | Updateable |
|---|---|---|---|
| tree | *NA | *NA | no |

*NA = Not applicable

The colheader property specifies whether or not to display the column name at the header for each column in a grid. The value type for this property is Boolean.

| Control | Valid Values | Default Value | Updateable |
|---------|--------------|---------------|------------|
| grid    | true, false  | true          | yes        |

The colnum property is used to specify the number of columns that should be displayed in a grid control initially. The number of these columns can be increased later. The value type for this property is Integer.

| Control | Valid Values  | Default Value | Updateable |
|---------|---------------|---------------|------------|
| grid    | integer value | none          | yes        |

The color property specifies a color for the background of a control. The value type for this property is String.
Dependency
In the case of a button control, this property is applicable only if the round property is set to 'true'. For a toolbar control, this property is applicable only if the flat property is set to 'false'.

The colresize property specifies whether or not the columns should resize to fit the data entered into them by the user or the server. The value type for this property is Boolean.

| Control | Valid Values | Default Value | Updateable |
|---------|--------------|---------------|------------|
| grid    | true, false  | false         | yes        |

Dependency
This property is applicable only if the colheader property has been set to 'true'.

The colswap property specifies whether or not to allow the drag and drop feature for columns. The value two for this property is Boolean.

| Control | Valid Values | Default Value | Updateable |
|---------|--------------|---------------|------------|
| grid    | true, false  | false         | yes        |

Dependency
This property is applicable only if the colheader property has been set to 'true'.

The colwidth property specifies the width in pixels of the column in a grid. This property is specified at column level. The value type for this property is Integer

| Control | Valid Values  | Default Value | Updateable |
|---------|---------------|---------------|------------|
| grid    | integer value | none          | yes        |

The controlkey property specifies whether or not Ctrl key should be used in combination with the accelerator to execute a menu command. The value type for this property is Boolean.

| Control  | Valid Values | Default Value | Updateable |
|----------|--------------|---------------|------------|
| menuitem | true, false  | false         | yes        |

The decimalgroups property specifies the number of digits in a decimal group of a numericedit control. The value for this property determines after how many characters should a group separator be placed. The value type for this property is Integer.

| Control    | Valid Values  | Default Value | Updateable |
|------------|---------------|---------------|------------|
| numericedit| integer value | 3             | yes        |

The decimalplaces property specifies the number of decimal places that should be displayed in a numericedit control. The value type for this property is Integer.

| Control    | Valid Values  | Default Value | Updateable |
|------------|---------------|---------------|------------|
| numericedit| integer value | 2             | yes        |

The decimalseparator property specifies the character to be displayed between the whole numbers and decimal numbers in a numericedit control. The value type for this property is String.

| Control           | Valid Values | Default Value | Updateable |
|-------------------|--------------|---------------|------------|
| numericeditcontrol| string value | .(dot)        | yes        |

The defaultbutton property specifies whether or not the button control is to be displayed as the default button in the window or dialog box. The value type for this property is Boolean.

| Control | Valid Values | Default Value | Updateable |
|---------|--------------|---------------|------------|
| button  | true, false  | false         | yes        |

The defaultimage property specifies the name of the image to be displayed when the toolbutton is enabled and not highlighted. The value type for this property is String.

| Control    | Valid Values        | Default Value | Updateable |
|------------|---------------------|---------------|------------|
| toolbutton | Name of file object | none          | yes        |

The direction property specifies the sort order for data within a column in a grid control. The value type for this property is String.

| Control | Valid Values          | Default Value | Updateable |
|---------|-----------------------|---------------|------------|
| grid    | ascending, descending | ascending     | no         |

The disabledimage property specifies the name of the image to be displayed when a toolbutton control is disabled. The value type for this property is String.

| Control | Valid Values | Default Value | Updateable |
|---|---|---|---|
| toolbutton | Name of a file object | none | yes |

The dockedposition property specifies the position of a control on the screen when the control is rendered. If the value is set to 'none' or 'never', then the control is displayed as a floating control. The value type for this property is String.

| Control | Valid Values | Default Value | Updateable |
|---|---|---|---|
| toolbar | right, left, bottom, top, none, never | top | yes |
| mainmenu | right, left, bottom, top, none, never | top | yes |

The dragdrop property specifies whether or not items should support the drag and drop functionality. The value type for this property is Boolean.

| Control | Valid Values | Default Value | Updateable |
|---|---|---|---|
| speedbar | true, false | false | yes |
| tree | true, false | false | yes |

The dropdownheight property specifies the height in pixels that the dropdown list of the dropdown control should extend to. The value type for this property is Integer.

| Control | Valid Values | Default Value | Updateable |
|---|---|---|---|
| dropdown | integer values | Four times the height of the static area | yes |

The editable property specifies whether or not the text can be changed in a grid or tree control. This property is applicable at the column level in the case of a grid control. The value type for this property is Boolean.

| Control | Valid Values | Default Value | Updateable |
|---|---|---|---|
| grid | true, false | false | yes |
| tree | true, false | false | yes |

The enabled property specifies whether or not the user should be able to interact with the object. The value type for this property is Boolean.

The expand property specifies whether or not expansion should occur at control level as well as item level in a tree control. If this property is set to 'true', then the control level node is not expanded when it is rendered. The value type for this property is Boolean.

| Control | Valid Values | Default Value | Updateable |
|---|---|---|---|
| tree | true, false | false | no |

The expandall property specifies whether or not all the nodes in a tree control should be expanded completely when it is rendered on the screen. The value type for this property is Boolean.

| Control | Valid Values | Default Value | Updateable |
|---|---|---|---|
| tree | true, false | false | no |

The expandeditemidi3ml property is a readable property of a tree control. It returns the ID of the expanded node. The value type for this property is String.

| Control | Valid Values | Default Value | Updateable |
|---|---|---|---|
| tree | *NA | *NA | no |

*NA = Not applicable

The extendedsel property specifies whether or not a selected tree item should be displayed as selected even when the tree is not in focus. The value type for this property is Boolean.

| Control | Valid Values | Default Value | Updateable |
|---|---|---|---|
| tree | true, false | true | yes |

The externalradius property specifies the external radius of a round button control. The value provided for this property determines the curve shape of the button control. The value type for this property is Integer.

| Control | Valid Values | Default Value | Updateable |
|---|---|---|---|
| button | integer value greater than zero | 35 | yes |

Dependency

This property is applicable only if the round property has been set to 'true'.

The flat property specifies whether or not the toolbuttons in a toolbar control should appear raised. The value type for this property is Boolean.

| Control | Valid Values | Default Value | Updateable |
|---|---|---|---|
| toolbar | true, false | true | yes |

The fontbold property specifies whether or not the text or caption of the control should be displayed in bold font. The value type for this property is Boolean.

The fontcolor property specifies the color of the text or the caption of a control. The value type for this property is String.

The fontbold property specifies whether or not the text or caption of the control should be displayed in bold font. The value type for this property is Boolean.

The fontcolor property specifies the color of the text or the caption of a control. The value type for this property is String.

The fontitalic property specifies whether or not the text or caption should be displayed in italics. The value type for this property is Boolean.

The fontname property specifies the font style of the text or caption property. The value type for this property is String.

The fontsize property specifies the text size in standard windows sizing. The value type for this property is Integer.

The fontstrikeout property specifies whether or not the text or caption of the control should have a line going through it. The value type for this property is Boolean.

The fontunderline property specifies whether or not the text or caption of the control should be underlined. The value type for this property is Boolean.

The format property specifies the format that the date and time should appear in within the editbox part of the datetimepicker control. The value type for this property is String.

| Control | Valid Values | Default Value | Updateable |
| --- | --- | --- | --- |
| datetimepicker | A combination of d, M, y, h, m, s, t* | none | yes |

*M (upper case) specifies the month, and m (lower case) specifies the minute value. Valid formats and format combinations have been detailed in Appendix 1.

The gridlinecolor property specifies the color of the hashlines in a grid control. The value type for this property is String.

| Control | Valid Values | Default Value | Updateable |
| --- | --- | --- | --- |
| grid | RGB value | C0C0C0 | yes |

The gridlines property specifies whether or not a border should be rendered around the cells in a grid control. The value type for this property is String.

| Control | Valid Values | Default Value | Updateable |
| --- | --- | --- | --- |
| grid | none, horizontal, vertical, both | both | yes |

The groupseparator property specifies the character to display between the whole number groups in a numericedit control. The value type for this property is String.

| Control | Valid Values | Default Value | Updateable |
| --- | --- | --- | --- |
| numericedit | string value | , (comma) | yes |

The hashlines property specifies whether or not to display the hash marks on a tree control. These hash marks are used for expanding and collapsing a branch. The value type for this property is Boolean.

| Control | Valid Values | Default Value | Updateable |
| --- | --- | --- | --- |
| tree | true, false | true | yes |

The headercolor property specifies the color of the header part of controls, such as the speedbargroup and datetimepicker. The value type for this property is String.

| Control | Valid Values | Default Value | Updateable |
| --- | --- | --- | --- |
| datetimepicker | RGB value | 0000ff | yes |
| speedbargroup | RGB value | C0C0C0 | yes |

The headerdragdrop property specifies whether or not groups within a speedbar control should support the drag and drop functionality. The value type for this property is Boolean.

| Control | Valid Values | Default Value | Updateable |
| --- | --- | --- | --- |
| speedbar | true, false | false | yes |

The headerfontcolor property specifies the color of the text displayed in the header part of controls, such as the speedbargroup and datetimepicker. The value type for this property is String.

| Control | Valid Values | Default Value | Updateable |
| --- | --- | --- | --- |
| datetimepicker | RGB value | ffffff | yes |
| speedbargroup | RGB value | 000000 | yes |

The height attribute specifies the value in pixels of the bottom most position on the screen minus the top most position of the control. The value type for this property is Integer.

The helpbutton property specifies whether or not a help button should be displayed in a window control. The value type for this property is Boolean.

| Control | Valid Values | Default Value | Updateable |
| --- | --- | --- | --- |
| window | true, false | false | yes |

Dependency

This property is applicable only if the minimizebutton and maximizebutton properties are set to 'false'.

The helptext property specifies the help text to be displayed when the question mark on the titlebar is moved to the control. The value type for this property is String.

Dependency

This property is applicable only if the helpbutton property has been set to 'true'.

The highlighthotitem property specifies whether or not the tab under the stylus should be highlighted in a tabset control. The value type for this property is Boolean.

| Control | Valid Values | Default Value | Updateable |
|---|---|---|---|
| tabset | true, false | false | no |

The hint property specifies the text to be displayed when the mouse is positioned next to the control. The value type for this property is String.

The horizontalalignment property specifies the alignment of the button image within a button control. The value type for this property is String.

| Control | Valid Values | Default Value | Updateable |
|---|---|---|---|
| button | left, center, right | center | yes |

The horizontalangle property specifies the horizontal direction of light in degrees for a round button control. The value type for this property is Integer.

| Control | Valid Values | Default Value | Updateable |
|---|---|---|---|
| button | integer value between −360 and 360 | −45 | yes |

Dependency

This property is applicable only if the round property has been set to 'true'.

The hotimage property specifies the name of the image to be displayed when a toolbutton control is highlighted. The value type for this property is String.

| Control | Valid Values | Default Value | Updateable |
|---|---|---|---|
| toolbutton | Name of a file object | none | yes |

The hottextcolor property specifies the color of the text when a toolbutton is highlighted. The value type for this property is String.

| Control | Valid Values | Default Value | Updateable |
|---|---|---|---|
| toolbar | RGB value | 000000 | yes |

The icon property specifies the name of the icon to be displayed on the top left corner of a window control. The value type for this property is String.

| Control | Valid Values | Default Value | Updateable |
|---|---|---|---|
| window | Name of a file object | none | no |

The imageheight property specifies the height of an image in a toolbar control. The value type for this property is Integer.

| Control | Valid Values | Default Value | Updateable |
|---|---|---|---|
| toolbar | integer value | 20 | no |

The imageoffset property specifies whether or not a border should be displayed between the image and the edge of the button control. The value type for this property is Boolean.

| Control | Valid Values | Default Value | Updateable |
|---|---|---|---|
| button | true, false | false | yes |

The imagewidth property specifies the width of an image in a toolbar control. The value type for this property is Integer.

| Control | Valid Values | Default Value | Updateable |
|---|---|---|---|
| toolbar | integer value | 20 | no |

The index property specifies the order of the tabsheet objects to be rendered on the tabset object. The value type for this property is Integer.

| Control | Valid Values | Default Value | Updateable |
|---|---|---|---|
| tabsheet | integer value | 0 | no |

The inputmask property specifies the mask format for the editbox and numericedit controls. The value type for this property is String.

| Control | Valid Values | Default Value | Updateable |
|---|---|---|---|
| editbox | string value | none | yes |
| numericedit | string value | none | yes |

In the case of the numericedit control, only numeric values are accepted. The inputmask property is used to specify any alphanumeric character that needs to be displayed with the numbers. However, inputmask for the editbox control indicates the values that will be accepted by the control. Inputmask has the following possible values in the case of an editbox control.

| Value | Meaning |
|---|---|
| # | Only numeric characters can be entered. |
| . | Specifies the decimal placeholder. It indicates the decimal position. This character is displayed literally on the screen. |
| , | Indicates the position of the group separator. This character is displayed literally on the screen. |
| : | Indicates the position of the time separator. This character is displayed literally on the screen. |
| / | Indicates the position of the date separator. This character is displayed literally on the screen. |
| A | Indicates that alphanumeric characters can be entered as values. |

-continued

| Value | Meaning |
|---|---|
| & | Indicates that ANSI characters can be entered as values. The values must lie between 32-126 or 128-255. |
| ? | Indicates that only alphabetical characters can be entered as values. |
| > | Accepts alphabetical values but displays all the characters in upper case. |
| < | Accepts alphabetical values but displays all the characters in lower case. |
| \ | Indicates that the next character should be displayed literally on the screen. This is used characters such as '?', '#', '&', and so on need to be displayed on the screen. |

The insertmode property specifies whether or not insertion of characters in between the existing characters should be allowed. The value type for this property is Boolean.

| Control | Valid Values | Default Value | Updateable |
|---|---|---|---|
| editbox | true, false | true | yes |

The internalradius property specifies the internal radius of a round button control. The value type for this property is Integer.

| Control | Valid Values | Default Value | Updateable |
|---|---|---|---|
| button | integer value greater than zero | 8 | yes |

Dependency

This property is applicable only if the round property has been set to 'true'.

The itemid property specifies the ID value for the items of a complex control, such as a dropdown or listbox. The value type for this property is Integer.

The itemtext property specifies the caption for the items of a complex control, such as a grid or listbox. The value type for this property is String.

The itempath property specifies the path of the items of a complex control such as a tree control. The value type for this property is String.

The itemtips property specifies whether or not to display the complete item for partially hidden items. The value type for this property is Boolean.

| Control | Valid Values | Default Value | Updateable |
|---|---|---|---|
| tree | true, false | false | yes |

The leadingzero property specifies whether or not a zero is placed before a decimal in a numericedit control. The value type for this property is Boolean.

| Control | Valid Values | Default Value | Updateable |
|---|---|---|---|
| numericedit | true, false | false | yes |

The left property specifies the x-coordinate with respect to the left most point of the parent object. The value type for this property is Integer.

The linecolor property specifies the color of the hashlines in a tree control. The value type for this property is String.

| Control | Valid Values | Default Value | Updateable |
|---|---|---|---|
| tree | RGB value | 000000 | yes |

The maxdigits property identifies the maximum number of digits that can be used for a numericedit control. The value type for this property is Integer.

| Control | Valid Values | Default Value | Updateable |
|---|---|---|---|
| numericedit | integer value | −1 (unlimited) | yes |

The maxhscroll property specifies whether or not a horizontal scrollbar should be displayed in a window control. If the maxhscroll value is greater than 0, and the scrollbars property is set to 'horizontal' or 'both', a horizontal scroll bar is displayed when the width of the window becomes less than the maxhscroll value. The maxhscroll property is applicable only if the borderstyle property is 'sizeable'. The value of the maxhscroll property cannot be less than minimumwidth.

The maxhscroll and scrollbars properties are related and together they determine whether a horizontal scrollbar is displayed or not. The value type for this property is Integer.

| Control | Valid Values | Default Value | Updateable |
|---|---|---|---|
| window | integer value | none | yes |

Dependency

This property is applicable only if the scrollbars property has been set to 'horizontal' or 'both'.

The maximizebutton property specifies whether or not the window can be sized larger by rendering a maximize button in the top right corner. The value type for this property is Boolean.

| Control | Valid Values | Default Value | Updateable |
|---|---|---|---|
| window | true, false | false | yes |

The maxlength property specifies the maximum number of characters that can be entered in an editbox or memo control. The value type for this property is Integer.

| Control | Valid Values | Default Value | Updateable |
|---|---|---|---|
| editbox | integer value | 0 (unlimited) | yes |
| memo | integer value | 0 (unlimited) | yes |

The maximumdate property specifies the maximum date for a datetimepicker control. The value type for this property is String.

| Control | Valid Values | Default Value | Updateable |
| --- | --- | --- | --- |
| datetimepicker | string value | 12/31/9999 | yes |

The maxvscroll property specifies whether or not a vertical scrollbar should be displayed in a window control. If the maxvscroll value is greater than 0, and the scrollbars property is set to 'vertical' or 'both', a vertical scroll bar is displayed. The maxvscroll property is applicable only if the borderstyle property is 'sizeable'. The maxvscroll value cannot be less than the minimumheight value.

The maxvscroll and scrollbars properties are related and together they determine whether a vertical scrollbar is displayed or not. The value type for this property is Integer.

| Control | Valid Values | Default Value | Updateable |
| --- | --- | --- | --- |
| window | integer value | none | yes |

Dependency

This property is applicable only if the scrollbars property has been set to 'vertical' or 'both'.

The minimizebutton property specifies whether or not the window can be sized smaller by rendering a minimize button in the top right corner of the window. The value type for this property is Boolean.

| Control | Valid Values | Default Value | Updateable |
| --- | --- | --- | --- |
| window | true, false | false | yes |

The minimumdate attribute specifies the minimum date for a datetimepicker control. The value type for this property is String.

| Control | Valid Values | Default Value | Updateable |
| --- | --- | --- | --- |
| datetimepicker | string value | 1/1/1601 | yes |

The minimumheight attribute specifies the minimum height for a window control. The value type for this property is Integer.

| Control | Valid Values | Default Value | Updateable |
| --- | --- | --- | --- |
| window | integer value | 0 | yes |

The minimumwidth attribute specifies the minimum width for a window control. The value type for this property is Integer.

| Control | Valid Values | Default Value | Updateable |
| --- | --- | --- | --- |
| window | integer value | 0 | yes |

The multiline property specifies whether tabsheets should move to the next line if the width of the tabset control is less. The value type for this property is Boolean.

| Control | Valid Values | Default Value | Updateable |
| --- | --- | --- | --- |
| tabset | true, false | false | yes |

The multiselect property specifies whether or not the user can select more than one item in the control. This feature is used for multiple item controls, such as listboxes, grids, and trees. The value type for this property is Boolean.

| Control | Valid Values | Default Value | Updateable |
| --- | --- | --- | --- |
| grid | false | false | no |
| listbox | true, false | false | no |
| tree | true, false | false | no |

The modal attribute specifies whether or not operations can be performed outside a window control when it is active. A parent window cannot be a modal window. The value type for this property is Boolean.

| Control | Valid Values | Default Value | Updateable |
| --- | --- | --- | --- |
| window | true, false | false | yes |

The movable attribute specifies whether or not a user can dock and undock the control to a different position on the screen at runtime. This property cannot be updated at runtime, it can be specified only when the control is created. The value type for this property is Boolean.

| Control | Valid Values | Default Value | Updateable |
| --- | --- | --- | --- |
| toolbar | true, false | true | no |
| mainmenu | true, false | true | no |

The name property specifies the name that will be used to refer to the control in the I3ML. The value type for this property is String.

The negativecolor property specifies the color of the negative values displayed in a numericedit control. The value type for this property is String.

| Control | Valid Values | Default Value | Updateable |
| --- | --- | --- | --- |
| numericedit | RGB value | black | yes |

The negativeformat property specifies the mask format for negative values in a numericedit control. The value type for this property is String.

| Control | Valid Values | Default Value | Updateable |
| --- | --- | --- | --- |
| numericedit | string value | −1.1 | yes |

Note: '1.1' must always be used to represent the numeric value.

The newselectedi3ml property is a readable property of complex controls such as dropdown, I3atbox, tree, and grid. It returns the ID and text of the currently selected item as I3ML. In the case of a subsetcontrol, it returns the name of the currently selected tabslieet. The value type for this property is String. The oldselectedi3ml property is a readable property of complex controls such as dropdown, listhox, tree, and grid. It returns the ID and text of previous selected item as I3ML. In the case of a tabset control, it returns the name of the previously selected tabsheet. The value type for this property is String.

The parent property specifies the name of the parent object of the control. The value of this property should not be null for any control other than the top-level window objects. The value type for this property is String.

The parentid property specifies the ID of the parent under which the current item is placed. The value type for this property is String.

| Control | Valid Values | Default Value | Updateable |
| --- | --- | --- | --- |
| tree | string value | none | yes |

The parentpath property specifies the complete path of the parent item while inserting an item under another. The value type for this property is String.

| Control | Valid Values | Default Value | Updateable |
| --- | --- | --- | --- |
| tree | string value | none | yes |

The password property specifies whether or not the editbox field is a password field. If the password property is set to true, any text in the control shows up to the user as a series of asterisks—one for each character in the true value. The password property is applicable only when the inputmask is not specified. The value type for this property is Boolean.

| Control | Valid Values | Default Value | Updateable |
| --- | --- | --- | --- |
| editbox | true, false | false | no |

The picture property specifies the name of an image file to be displayed with a speedbaritem control. The value type for this property is String.

| Control | Valid Values | Default Value | Updateable |
| --- | --- | --- | --- |
| speedbaritem | Name of file object | none | yes |

The picturemouseover property specifics the name of an image file to be displayed on the control when the mouse is hovering over it. In the case of a picturepanel control, the name of an icon file can also be specified. The image types supported by the button control are .bmp, .gif, .jpeg, and .jpg. The picturepanel control supports .bmp, .dib, .gif, and .jpg files. The value type for this property is String.

| Control | Valid Values | Default Value | Updateable |
| --- | --- | --- | --- |
| button | string value | none | yes |
| picturepanel | string value | none | yes |

The pictureup property specifies the name of an image or icon file to be displayed on the control when it is not pressed down or the mouse it hovering over it. This image is the source for the button image when there is no interaction with the control by the user. The image types supported by the button control are .bmp, .gif, .jpeg, and .jpg. The picturepanel control supports .bmp, .dib, .gif, and .jpg files. The value type for this property is String.

| Control | Valid Values | Default Value | Updateable |
| --- | --- | --- | --- |
| button | string value | none | yes |
| picturepanel | string value | none | yes |

The positiveformat property specifies the mask format for positive values in a numericedit control. The value type for this property is String.

| Control | Valid Values | Default Value | Updateable |
| --- | --- | --- | --- |
| numericedit | string value | 1.1 | yes |

Note:
'1.1' must always be used to represent the numeric value.

The prompt property specifies the character that will be used to display the mask. It should be only one character. The value type for this property is String.

| Control | Valid Values | Default Value | Updateable |
| --- | --- | --- | --- |
| Editbox | string value | none | yes |

Dependency

This property is applicable only if the value for inputmask has been specified.

The readonly property specifies whether or not the user can update the text in controls such as a dropdown, editbox, numericedit, or memo control. The value type for this property is Boolean, The round property specifies whether or not the button control should be displayed as a rounded button. The value type for this property is Boolean.

| Control | Valid Values | Default Value | Updateable |
| --- | --- | --- | --- |
| button | true, false | false | yes |

The rowheader property specifies whether or not the row ID of each column should be displayed on the header in a grid control. The value type for this property is Boolean.

| Control | Valid Values | Default Value | Updateable |
|---|---|---|---|
| grid | true, false | false | Yes |

The rowheight property specifies the pixel value of the height of the rows in a grid control. The value type for this property is Integer.

| Control | Valid Values | Default Value | Updateable |
|---|---|---|---|
| grid | Integer value | none | yes |

The rownum property specifies the total number of rows that should be supported by the grid control initially. The number of rows can be increased later. The value type for this property is Integer.

| Control | Valid Values | Default Value | Updateable |
|---|---|---|---|
| grid | Integer value | none | yes |

The rowresize property specifies whether or not the rows can be resized on the UI in a grid control. The value type for this property is Boolean.

| Control | Valid Values | Default Value | Updateable |
|---|---|---|---|
| grid | true, false | false | yes |

Dependency

This property is applicable only if the rowheader value is set to 'true'.

The rowselect property specifies whether or not the whole row in a control should be selected on clicking on any cell. The value type for this property is Boolean.

| Control | Valid Values | Default Value | Updateable |
|---|---|---|---|
| grid | true, false | false | yes |
| tree | true, false | false | yes |

The rowseparator property specifies whether or not a line should appear between the different rows in a dropdown control. The value type for this property is Boolean.

| Control | Valid Values | Default Value | Updateable |
|---|---|---|---|
| dropdown | true, false | false | yes |

The scroll property specifies whether or not a scrolling should happen in an editbox or numericedit control. This property cannot be updated at runtime. The value type for this property is Boolean.

| Control | Valid Values | Default Value | Updateable |
|---|---|---|---|
| editbox | true, false | true | no |
| numericedit | true, false | true | no |

The scrollbars property specifies whether or not horizontal and vertical scrollbars should be displayed in a control. The value type for this property is String.

| Control | Valid Values | Default Value | Updateable |
|---|---|---|---|
| grid | both, none, vertical, horizontal | both | Yes |
| memo | both, none, vertical, horizontal | none | Yes |
| window | both, none, vertical, horizontal | none | Yes |

The scrollingroup property specifies whether or not scrolling of items inside a group should be allowed in a speedbar control. The value type for this property is Boolean.

| Control | Valid Values | Default Value | Updateable |
|---|---|---|---|
| speedbar | true, false | true | yes |

The selected property is specified at item level. If the value for this property is set to 'true', that item will be displayed selected by default when the control is rendered. This property cannot be retrieved at runtime. In the case of a tabsheet control, this property specifies whether the tabsheet is selected or not. The value type for this property is Boolean.

The selectedindex property is specified at the item level. This property is used in case of a dropdown celltype. It specifies which item in the dropdown list should be displayed as selected. The value type for this property is String.

| Control | Valid Values | Default Value | Updateable |
|---|---|---|---|
| grid | String value | none | yes |

The selecteditem property is a readable property of complex controls such as dropdown, listbox, tree, and grid. It returns the ID of the selected item. The value type for this property is String.

The selecteditemid property is a readable property of complex controls such as dropdown, listbox, tree, and grid. It returns the value of the selected item. The value type for this property is String.

The selecteditemi3ml property is a readable property of complex controls such as dropdown, listbox, tree, mainmenu, toolbar, and grid. It returns the ID and text of all the selected items as I3ML. The value type for this property is String. The selecteditemidi3ml property is a readable property of complex controls such as dropdown, listbox, tree, mainmenu, toolbar, and grid. It returns the itemids of all the selected itemids as I3ML. The value type for this property is String.

The selectedrowi3ml property is a readable property of the grid control. It returns the value of the selected row as specified in the I3ML. The value type for this property is String.

| Control | Valid Values | Default Value | Updateable |
|---|---|---|---|
| grid | *NA | *NA | no |

*NA = Not applicable

The selectedtabsheet property is a readable property of the tabsheet control. It returns the name of the currently selected tabsheet as specified in the I3ML. The value type for this property is String.

| Control | Valid Values | Default Value | Updateable |
|---|---|---|---|
| tabset | *NA | *NA | no |

*NA—Not applicable

The selectedtabsheetid property is a readable property of the tabsheet control. It returns the index of the currently selected tabsheet as specified in the I3ML. The value type for this property is String.

| Control | Valid Values | Default Value | Updateable |
|---|---|---|---|
| tabset | *NA | *NA | no |

*NA = Not applicable

The separator property specifies whether or not an item should be treated as a separator. The value type for this property is Boolean.

| Control | Valid Values | Default Value | Updateable |
|---|---|---|---|
| toolbutton | true, false | none | no |

The shiftkey property specifies whether or not the shift key should be used with the accelerator to execute a menu command. The value type for this property is Boolean.

| Control | Valid Values | Default Value | Updateable |
|---|---|---|---|
| menuitem | true, false | false | yes |

The showheaderdragimage property specifies whether or not the image of a header should be displayed while dragging. The value type for this property is Boolean.

| Control | Valid Values | Default Value | Updateable |
|---|---|---|---|
| speedbar | true, false | true | yes |

Dependency

This property is applicable only if the headerdragdrop value is set to 'true'.

The showitemdragimage property specifies whether or not the image of an item should be displayed while dragging. The value type for this property is Boolean.

| Control | Valid Values | Default Value | Updateable |
|---|---|---|---|
| speedbar | true, false | false | yes |

Dependency

This property is applicable only if the dragdrop property has been set to 'true'.

The sorted property specifies whether or not the items in a complex control should be sorted. The value type for this property is Boolean.

| Control | Valid Values | Default Value | Updateable |
|---|---|---|---|
| Dropdown | true, false | false | no |
| listbox | true, false | false | no |

The spotintensity property specifies the coefficient of the influence on spot intensity of the light source. The value type for this property is Integer.

| Control | Valid Values | Default Value | Updateable |
|---|---|---|---|
| button | integer value greater than zero | 3 | yes |

Dependency

This property is applicable only if the round property has been set to 'true'.

The spotsize property specifies the coefficient of the influence on spot size of the light source. The value type for this property is Integer.

| Control | Valid Values | Default Value | Updateable |
|---|---|---|---|
| button | integer value greater than zero | 4 | yes |

Dependency

This property is applicable only if the round property has been set to 'true'.

The stretch property specifies whether or not the picture in a picturepanel control should be stretched to fit in the control. The value type for this property is Boolean.

| Control | Valid Values | Default Value | Updateable |
|---|---|---|---|
| picturepanel | true, false | false | yes |

The style property specifies whether the datetimepicker control should display a calendar or a spin control. This property can be set only at the time of creation of the control. The value type for this property is String.

| Control | Valid Values | Default Value | Updateable |
|---|---|---|---|
| datetimepicker | Calendar, spinner | calendar | no |

The systemenu property specifies whether or not the system menu should be displayed in a window control. The system menu comprises of the minimize, maximize, help, and cancel buttons. The value type for this property is Boolean.

| Control | Valid Values | Default Value | Updateable |
|---|---|---|---|
| window | true, false | true | yes |

The taborder property specifies the order the focus should shift to while the user is tabbing through an application. The first object in the sequence has a value of "1" and flows through a cyclic consecutive order. The value type for this property is Integer.
Dependency
This property is applicable only if the tabstop property has been set to 'true'.

The tabstop property specifies whether or not the control should be a part of the tabbing sequence. The tabbing sequence is the flow through the controls that occurs when the user presses the tab key over and over again. The value type for this property is Boolean.

The text property contains the default text to be displayed for a control. The value type for this property is String.

| Control | Valid Values | Default Value | Updateable |
|---|---|---|---|
| datetimepicker | string value | none | yes |
| editbox | string value | none | yes |
| memo | String value | none | yes |
| numericedit | String value | none | yes |

The textalignment property specifies the text justification type. This property cannot be updated in the case of a check, numericedit, radio, or editbox control. The value type for this property is String.

The textcase property specifies the case that characters can be entered into an editbox or memo control. This property is applicable only if the inputmask property is not specified in the ease of an editbox control. The value type for this property is String.

The textonright property specifies whether or not text should be displayed on the right or the bottom of the toolhutton. If this property is set to true, the text will be displayed on the right of the toolbutton. The value type for this property is Boolean.

| Control | Valid Values | Default Value | Updateable |
|---|---|---|---|
| toolbar | true, false | false | yes |

The textoperation property specifies how to handle text value in case of an updation. In the case of an editbox control, this property is applicable only if the inputmask has not been specified. The value type for this property is String.

| Control | Valid Values | Default Value | Updateable |
|---|---|---|---|
| editbox | append, prepend, replace | replace | yes |
| memo | append, prepend, replace | replace | yes |

The textposition property specifies whether or not the text should appear on the left or the right of the control. The value type for this property is Boolean.

| Control | Valid Values | Default Value | Updateable |
|---|---|---|---|
| check | left, right | right | yes |
| radio | left, right | right | yes |

The top property specifies the y-coordinate with respect to the top most point of the parent object. The value type for this property is Integer.

The trailingtexteolor property specifies the color of the dates of preceding and following months. The value type for this property is String.

| Control | Valid Values | Default Value | Updateable |
|---|---|---|---|
| Datetimepicker | RGB value | COCOCO | yes |

The underlinehotitem property specifies whether or not the item under stylus should be displayed underlined. The value type for this property is Boolean.

| Control | Valid Values | Default Value | Updateable |
|---|---|---|---|
| speedbar | true, false | false | yes |

The verticalalignment property specifies the alignment of the button image within a button control. The value type for this property is String.

| Control | Valid Values | Default Value | Updateable |
|---|---|---|---|
| button | top, center, bottom | center | yes |

The verticalalignment property specifies the vertical direction of light in degrees for a round button control. The value type for this property is Integer.

| Control | Valid Values | Default Value | Updateable |
|---|---|---|---|
| button | integer value between −360 and 360 | 60 | yes |

Dependency

This property is applicable only if the round property has been set to 'true'. The visible property specifies whether or not the control should be visible to the user on the screen. This feature is useful for hiding values that are used in calculations or for objects that are only shown based on different events. The value type for this property is Boolean.

The wantreturns property specifies whether or not the cursor should move to the next line on pressing the Enter key. The value type for this property is Boolean.

| Control | Valid Values | Default Value | Updateable |
|---------|--------------|---------------|------------|
| memo    | true, false  | false         | yes        |

The width attribute specifies the difference in pixels between the right most part and the left most part of the control. The value type for this property is Integer.

The wordwrap property specifies whether or not the words exceeding the text space available in a memo control should move to the next line. The value type for this property is Boolean.

| Control | Valid Values | Default Value | Updateable |
|---------|--------------|---------------|------------|
| memo    | true, false  | true          | no         |

Preferably, the attributes of an object are represented in the I3ML language by embedding code corresponding to the property element within the code corresponding to an object element. Preferably, the system employs a single property element to define an attribute, such that the single property name can be used for any object desired to be displayed to the user. For example, one attribute that may be employed by the system is the position of an object relative to its parent object. In the example shown below, the positioning information for the "GetID" button of FIG. 2 is given as four individual properties, illustrated below:

```
<object name="GetIDButton" parent="NewUserGroupbox"
    class="button">
    <property name="top" value="25"/>
    <property name="left" value="59"/>
    <property name="height" value="25"/>
    <property name="width" value="75"/>
</object>
```

According to this example, the "GetIDButton" resides within its parent object "NewUserGroupbox" such that its top left corner is positioned 59 pixels from the left side of its parent object and 25 pixels from the top of its parent object. In addition, "GetIDButton" is also 25 pixels high and 75 pixels wide. Advantageously, nearly all visual elements support a top, left, height, and width attribute.

In general, different classes of objects support different properties. For example, button objects support a property referred to as "Caption", which comprises the text that is shown on the button. The caption of the object, GetIDButton, is "Get an ID". Other classes also support captions, such as "NewUserGroupbox" in FIG. 2 which employs the caption "New User?". By contrast, there are some object types that do not support the caption attribute, such as editboxes. In the case of an editbox, if text is desired to be shown next to the editbox, then a label object is positioned next to the editbox.

While an entire application can be defined in a single I3ML file, the I3ML language may also be employed to provide just-in-time applications. In this ease, parts of an application that arc selected by a user are downloaded from server 12 to player module 18 for displaying to the user. For example, referring to FIG. 2, if the user clicks on button object 72 called "HelpButton", a second window may pop up on interface 20 providing the user with instructional information about logging in. According to one embodiment, this new window has a corresponding set of I3ML data which defines it and which is included as part of the original file of I3ML data, such that the corresponding set of I3ML data is employed to display the new window only upon the user clicking the button. Alternatively, the corresponding set of I3ML data which displays the second window having instructional information is not a part of the original file of I3ML data but instead resides in server 12. In this case, the set of I3ML data corresponding to the second window is required to be retrieved via a remote procedure call to server 12 when user clicks the help button.

Batch file of I3ML data, or stream of I3ML data, is referred to as a "chunk". When a chunk of new I3ML data is received from server 12 by player module 18, the chunk is added to the set of existing I3ML data which is already being employed by player module 18. A chunk may comprise, according to one embodiment of the invention, a collection of "inserts", "updates" and "deletes" to the I3ML file.

For example, as previously mentioned, a set of I3ML data may define a button referred to as "GetIDButton". In order to insert this set of I3ML data into a file of I3ML data which is currently being employed by player module 18 (and to thereby display the button on user interface 20), the following insert command may be received by the player module:

```
<insert>
    <object name="GetIDButton" parent="NewUserGroupbox"
        class="button">
        <property name="Top" value="25"/>
        <property name="Left" value="59"/>
        <property name="Height" value="25"/>
        <property name="Width" value="75"/>
    </object>
</insert>
```

Similarly, objects can also be deleted from the set of I3ML data which is currently being employed by player module 18. In this manner, an object which has been displayed on the user interface 20 will be removed from user interface 20. For example, after a user has logged in, the LoginWindow object shown in FIG. 2 is no longer desired to be displayed to the user. Instead, the window, and all of the displayed objects for which the LoginWindow object is a parent, are deleted from the I3ML data set. The following delete command may be received by the player module:

```
<delete>
    <object name="LoginWindow">
    class="button">
    </object>
</delete>
```

Updates to the file of I3ML data that is being employed by player module 18 may also be performed. For instance, any attribute of an object can be changed by employing an update command. By way of example, the Left attribute of the "GetIDButton" object, if changed from 59 to 19, will cause the button to move 40 pixels to the left. The following illustrates how such an update command may be employed to facilitate this change to the user interface 20:

```
<update>
    <object name="GetIDButton">
        <property name="Left" value="19"/>
    </object>
</update>
```

As previously mentioned above, I3ML data is also employed to associate actions, events, etc. to objects that are displayed in a user interface 20. An action is a function that is performed by system 10 when a particular event occurs. An event is a user interaction with the application. Thus, the system of the present invention can employ I3ML data in order to facilitate the performance of an action when an event occurs. For example, "LeftClick" may refer to an event whereby the user clicks the left mouse button. In order for this event to be associated with a particular object, the pointer which corresponds to the mouse should be pointing to the object when the event (e.g. —the clicking by the user of the left mouse button) occurs. Some other exemplary events are shown in Table 1.4:

TABLE 1.4

| Events |
|---|
| Doubleclick |
| DownArrow |
| EnterKey |
| F1-F12 |
| GetFocus |
| Left Arrow |
| Leftclick |
| LoseFocus |
| Middleclick |
| MouseEnter |
| MouseExit |
| RightArrow |
| Rightclick |
| SelChange |
| UpArrow |
| WindowClose |
| WindowLoad |
| CollapseTree |
| ExpandTree |

For each of the events listed in Table 1.4, a description of the events is discussed briefly below. Some of these events are discussed in greater detail herein. Generally, DblClickLeft is the event of the user clicking the left mouse button twice in succession over the object. DownArrow is the event of the user depressing the down arrow key when the focus is on a control. EnterKey is the event of the user depressing the enter key when the focus is on a control.

F1 is the event of the user depressing the F1 key when the focus is on a control. F2 through F12 are the events of the user depressing the F2 through F12 key, respectively, when the focus is on a control. GetFocus is the event of the user selecting the object by either tabbing to or left-clicking the control.

LeftArrow is the event of the user depressing the left arrow key when the focus is on a control. LeftClick is the event of the user clicking the left mouse button on the object. LoseFocus is the event of the cursor leaving the object, either by tabbing off of it to the next control or clicking somewhere else in the application. MiddleClick is the event of the user clicking the middle mouse button on the object. MouseEnter is the event of the user moving the cursor over the object. MouseExit is the event of the user moving the mouse off of the object. RightArrow is the event of the user depressing the right arrow key when the focus is on a control. RightClick is the event of the user clicking the right mouse button on the object. SelChange is the event of the user changing a selection. The leftclick action is also fired with this action. UpArrow is the event of the user depressing the up arrow key when the focus is on a control. WindowClose is the event of the user closing a window. WindowLoad is the event of the user opening a window. CollapseTree is the event of the user collapsing a node in a tree control by clicking the left button of the mouse or pressing the left arrow key. ExpandTree is the event of the user expanding a node in a tree control by clicking the left button of the mouse or pressing the right arrow key.

As previously mentioned above, the purpose of associating events to an object is to facilitate the performance of an action when the event takes place. The actions that are associated with an event and an object are represented in I3ML data by the employment of a "method" element embedded within the object. For example, referring to the embodiment shown in FIG. 2, if the user clicks the left mouse button when the mouse is pointing to the "CancelButton" object, the login window will close. This association of the action of closing the login window when the event of the user left clicking on the "Cancel" button is created by employing the following set of I3ML data:

```
<object name="CancelButton" parent="LoginWindow" class="button">
    <property name="Caption" value="Cancel"/>
    <property name="Height" value="25"/>
    <property name="Left" value="82"/>
    <property name="Top" value="152"/>
    <property name="Width" value="50"/>
    <property name="LeftClick" value="CloseWindow"/>
</object>
```

It is noted that, in accordance with one embodiment of the invention, the "CloseWindow" action is not a command to close the window. Instead, "CloseWindow" may refer to the name of a local action. Generally, there are two kinds of actions which may be performed by system 10, namely local actions and remote actions. A local action refers to an action that is performed locally in player module 18. For example, when the user left clicks on the "CancelButton" object as discussed above, the login window closes, e.g: player module 18 makes a local procedure call to a local action called "CloseWindow".

According to one embodiment of the invention, local actions are defined in player module 18, which is configured to perform the local action without the need for the player module to retrieve the code from another source. Multiple categories of local actions may be employed, such as "Local.Math", "Local.DateTime", "Local.Process", and "Local.String".

FIG. 6(*a*)-(*bb*) provides examples of I3ML code for each of the below-listed processes that may be performed by a call to a Local.Math file. Similarly, FIG. 7(*a*)-(*ee*) provides examples of I3ML code for each of the below-listed processes that may be performed by a call to a Local.Datetime file. FIG. 8(*a*)-(*g*) provides examples of I3ML code for each of the below-listed processes that may be performed by a call to a Local.Process file. FIG. 9(*a*)-(*o*) provides examples of I3ML code for each of the below-listed processes that may be performed by a call to a Local. String file.

TABLE 1.5

| Local.Math |
|---|
| add |
| subtract |
| multiply |
| divide |
| mod |
| max |
| min |
| abs |
| log10 |
| log |
| cos |
| sin |
| tan |

TABLE 1.5-continued

| Local.Math |
| --- |
| acos |
| asin |
| atan |
| cosh |
| sinh |
| tanh |
| round |
| roundup |
| rounddown |
| sqrt |
| ceiling |
| floor |
| exp |
| average |

TABLE 1.6

| Logical Functions |
| --- |
| succeedifgt |
| succeedifge |
| succeediflt |
| succeedifle |
| succeedifne |
| succeedifeq |

The Add method takes one or more inputs, adds the values, and returns the sum. This method ignores any blank values. This method has parameters named param1 and param2, which are both float values, and it returns a result that is a float value.

FIG. 6(a) shows an example of an I3ML file for this method.

The Subtract method takes two inputs, subtracts the second from the first, and returns the difference. This method has parameters named param1 and param2, which are both float values, and it returns a result that is a float value. FIG. 6(b) shows an example of an I3ML file for this method.

The Multiply method takes two or more inputs, multiplies the values and returns the product. This method ignores any blank values. This method has parameters named param1 and param2, which are both float values, and it returns a result that is a float value. FIG. 6(c) shows an example of an I3ML file for this method.

The Divide method takes two inputs, divides the first value from the second, and returns the quotient. This method has parameters named param1 and param2, which are both float values, and it returns a result that is a float value. FIG. 6(d) shows an example of an I3ML file for this method.

The Mod method takes two inputs, divides the first value from the second, and returns the remainder. This method has parameters named param1 and param2, which are both float values, and it returns a result that is a numeric value. FIG. 6(e) shows an example of an I3ML file for this method.

The Max method takes any number of inputs and returns the maximum number from the list. This method has parameters named param1 and param2, which are both float values, and it returns a result that is a float value. FIG. 6(f) shows an example of an I3ML file for this method.

The Min method takes any number of inputs and returns the minimum number from the list. This method has parameters named param1 and param2, which are both float values, and it returns a result that is a float value. FIG. 6(g) shows an example of an I3ML file for this method.

The Abs method takes one input and returns the absolute (positive) value of the number. This method has a parameter named param1, which is a float value, and it returns a result that is a float value. FIG. 6(h) shows an example of an I3ML file for this method.

The Log10 method takes one input and returns the log (base10) value of the number. This method has a parameter named param1, which is a float value, and it returns a result that is a float value. FIG. 6(i) shows an example of an I3ML file for this method.

The Log method takes one input and returns the log (base e) value of the number. This method has a parameter named param1, which is a float value, and it returns a result that is a float value. FIG. 6(j) shows an example of an I3ML file for this method.

The Cos method takes one input and returns the cosine value of the number. This method has a parameter named param1, which is a float value, in radians, and it returns a result that is a float value. FIG. 6(k) shows an example of an I3ML file for this method.

The Sin method takes one input and returns the sine value of the number. This method has a parameter named param1, which is a float value, in radians, and returns a result that is a float value. FIG. 6(l) shows an example of an I3ML file for this method.

The Tan method takes one input and returns the tangent value of the number. This method has a parameter named param1, which is a float value, in radians, and it returns a result that is a float value. FIG. 6(m) shows an example of an I3ML file for this method.

The Acos method takes one input and returns the arc cosine value of the number. This method has a parameter named param1, which is a float value, in radians, and it returns a result that is a float value. FIG. 6(n) shows an example of an I3ML file for this method.

The Asin method takes one input and returns the arc sine value of the number. This method has a parameter named param1, which is a float value, in radians, and it returns a result that is a float value. FIG. 6(o) shows an example of an I3ML file for this method.

The Atan method takes one input and returns the arc tangent value of the number. This method has a parameter named param1, which is a float value, in radians, and it returns a result that is a float value. FIG. 6(p) shows an example of an I3ML file for this method.

The Cosh method takes one input and returns the hyperbolic cosine value of the number. This method has a parameter named param1, which is a float value, in radians, and returns a result that is a float value. FIG. 6(q) shows an example of an I3ML file for this method.

The Sixth method takes one input and returns the hyperbolic sine value of the number. This method has a parameter named param1, which is a float value, in radians, and returns a result that is a float value. FIG. 6(r) shows an example of an I3ML file for this method.

The Tanh method takes one input and returns the hyperbolic tangent value of the number. This method has a parameter named param1, which is a float value, in radians, and it returns a result that is a float value. FIG. 6(s) shows an example of an I3ML file for this method.

The Round method takes two inputs and rounds off the first value to the number of decimal places specified as the second value. This method has parameters named param1 and param2, which are a float value and a numeric value, respectively, and returns a result that is a float value. FIG. 6(t) shows an example of an I3ML file for this method.

The Roundup method takes two inputs and rounds off float value to the number of decimal places specified as second parameter. The value of a rounded digit will always be increased irrespective of the next digit. This method has parameters named param1 and param1, which are a float value and a numeric value, respectively, and returns a result that is a float value. FIG. 6(*u*) shows an example of an I3ML file for this method.

The Rounddown method takes two inputs and rounds off float value to the number of decimal places specified as second parameter. The value of a rounded digit will never increase irrespective of the next digit. This method has parameters named param1 and param1, which are a float value and a numeric value, respectively, and returns a result that is a float value. FIG. 6(*v*) shows an example of an I3ML file for this method.

The Sqrt method takes one input and returns the square root value. This method has a parameter named param1, which is a float value that is positive, and returns a result that is a float value. FIG. 6(*w*) shows an example of an I3ML file for this method.

The Ceiling method takes one input and returns the nearest integer greater than the value specified. This method has a parameter named param1, which is a float value, and returns a result that is a numeric value. FIG. 6(*x*) shows an example of an I3ML file for this method.

The Floor method takes one input and returns the nearest integer less than the value specified. This method has a parameter named param1, which is a float value, and returns a result that is a numeric value. FIG. 6(*y*) shows an example of an I3ML file for this method.

The Exp method takes one input and raises it to the power of float value specified. This method has a parameter named param1, which is a float value, and returns a result that is a float value. FIG. 6(*z*) shows an example of an I3ML file for this method.

The Average method takes any number of inputs and returns the average. This method ignores any blank values. This method has parameters named param1 and param2, which are both float values, and it returns a result that is a float value. FIG. 6(*aa*) shows an example of an I3ML file for this method.

All of the logic functions detailed below have two parameters—named param1 and param2—which are both float values and return results that are Boolean. FIG. 6(*bb*) shows an example of an I3ML file for performing a logic function The succeedifgt method takes two inputs and returns true if first number is greater than second, else returns false.

The succeedifge method takes two inputs and returns true if fast number is greater than or equal to second, else returns false.

The succeediflt method takes two inputs and returns true if first number is less than second, else returns false.

The succeedifle method takes two inputs and returns true if first number is less than or equal to second, else returns false.

The succeedifne method takes two inputs and returns true if first number is not equal to the second, else returns false.

The succeedifeq method takes two inputs and returns true if first number is equal to the second, else returns false.

TABLE 1.7

| Local.Datetime |
| --- |
| current |
| dateadd |
| datesub |
| year |
| month |
| day |
| monthname |

TABLE 1.7-continued

| Local.Datetime |
| --- |
| longmonthname |
| second |
| minute |
| hour |
| 24hour |
| ampm |
| dayofweek |
| dayofweekname |
| dayofweeklongname |

The current method returns current date or time information in the specified format. FIG. 7(*a*) shows an example of an I3ML file for this method.

The dateadd method adds a specified number of days to the date supplied in specified format. FIG. 7(*b*) shows an example of an I3ML file for this method.

The datesub method subtracts a specified number of days from the date supplied in specified format. FIG. 7(*c*) shows an example of an I3ML file for this method.

The year method returns the year from the date supplied in specified format. FIG. 7(*d*) shows an example of an I3ML file for this method.

The month method returns the numeric value of the month from the date supplied in specified format. FIG. 7(*e*) shows an example of an I3ML file for this method.

The day method returns the numeric value of the day of the month from the date supplied in specified format. FIG. 7(*f*) shows an example of an I3ML file for this method.

The monthname method returns the first three characters of the month from the date supplied in specified format. FIG. 7(*g*) shows an example of an I3ML file for this method.

The longmonthname method returns the complete name of the month from the date supplied in specified format. FIG. 7(*h*) shows an example of an I3ML file for this method.

The second method returns the seconds value from the date supplied in specified format. FIG. 7(*i*) shows an example of an I3ML file for this method.

The minute method returns the minutes value from the date supplied in specified format. FIG. 7(*j*) shows an example of an I3ML file for this method.

The hour method returns the hour value from the date supplied in specified format. FIG. 7(*k*) shows an example of an I3ML file for this method.

The 24 hour method returns the hour value in 24-hour format from the date supplied in specified format. FIG. 7(*l*) shows an example of an I3ML file for this method.

The ampm method returns the AM/PM value from the date supplied in specified format. FIG. 7(*m*) shows an example of an I3ML file for this method.

The dayofweek method returns the numeric day of the week value from the date supplied in specified format. FIG. 7(*n*) shows an example of an I3ML file for this method.

The dayofweekname method returns first three characters of the day of the week from the date supplied in specified format. FIG. 7(*o*) shows an example of an I3ML file for this method.

The dayofweeklongname method returns the complete name of the day of the week from the date supplied in specified format. FIG. 7(*p*) shows an example of an I3ML file for this method.

TABLE 1.8

| Local.Process |
| --- |
| close |
| cancel |
| messagebox |
| terminate |
| copy |
| setfocus |
| applychunk |

The close method closes the specified window and stops running any methods associated with the window and its child controls. Multiple windows can be closed in one method determined by the number of parameters. The values of the 'window' parameters of the 'close' method determine the windows that should be closed when the action is executed. It has parameters which are named window. FIG. 8(a) shows an example of an I3ML file for this method.

The cancel method cancels the action specified in the parameter list. It has parameters named param1, param2, etc., which are action names. FIG. 8(b) shows an example of an I3ML file for this method.

The messagebox method accepts string values as 'message' and 'caption' parameters. The 'message' string is displayed in a messagebox, and the 'caption' value is displayed as a caption. None of these parameters have any default values and if they are not specified, then their value is taken as null. FIG. 8(c) shows an example of an I3ML file for this method.

The terminate method terminates the whole application. FIG. 8(d) shows an example of an I3ML file for this method.

The copy method copies a property or a constant value from one control to another. This method can have a variable number of parameters named param1, param2, etc., which are string constants. FIG. 8(e) shows an example of an I3ML file for this method.

The setfocus method sets the focus on a specified control. FIG. 8(f) shows an example of an I3ML file for this method.

The applychunk method executes a specified chunk. The name of the chunk to be executed is supplied using the 'name' parameter. FIG. 8(g) shows an example of an I3ML file for this method.

TABLE 1.9

| Local.String |
| --- |
| toupper |
| tolower |
| trimleadingspaces |
| trimtrailingspaces |
| trimspaces |
| right |
| left |
| mid |
| replace |
| concat |
| find |
| cfind |
| length |
| compare |
| ccompare |

The toupper method converts the supplied string to upper case. FIG. 9(a) shows an example of an I3ML file for this method.

The tolower method converts the supplied string to lower case. FIG. 9(b) shows an example of an I3ML file for this method.

The trimleadingspaces method removes the spaces from the extreme left of the supplied string. FIG. 9(c) shows an example of an I3ML file for this method.

The trimtrailingspaces method removes the spaces from the extreme right of the supplied string. FIG. 9(d) shows an example of an I3ML file for this method.

The trimspaces method removes both leading and trailing spaces from the supplied spring. FIG. 9(e) shows an example of an I3ML file for this method.

The right method extracts a specified number of characters from the extreme right of the supplied string. It has two parameters named param1 and param2, which are a string and an integer, respectively. FIG. 9(f) shows an example of an I3ML file for this method.

The left method extracts a specified number of characters from the extreme left of the supplied string. It has two parameters named param1 and param2, which are a string and an integer, respectively. FIG. 9(g) shows an example of an I3ML file for this method.

The mid method extracts a specified number of characters from a specific position in the supplied string. It has three parameters named param1, param2 and param3, which are a string, an integer, and an integer, respectively. FIG. 9(h) shows an example of an I3ML file for this method.

The replace method is used for replacing specific characters in a string with other supplied characters. This method accepts four parameters. The string in which characters have to be replaced is specified as 'parameter 1'. The second parameter accepts an integer value that indicates the start position in the string where characters need to be replaced. The end position is indicated by the integer value of the third parameter. Finally, the string of characters that need to be inserted in place of the original characters is specified as 'parameter' 4. FIG. 9(i) shows an example of an I3ML file for this method.

The concat method joins two supplied strings. FIG. 9(j) shows an example of an I3ML file for this method.

The find method accepts two parameters. It searches for the string supplied as 'parameter 2' within another string that has been specified as the first parameter. It returns the position of the second string within the first string. This method ignores case while comparing the two strings. FIG. 9(k) shows an example of an I3ML file for this method.

The efind method accepts two parameters. It searches for the string supplied as 'parameter 2' within another string that has been specified as the first parameter. It returns the position of the second string within the first string. This method ignores case while comparing the two strings. FIG. 9(l) shows an example of an I3ML file for this method.

The length method returns the number of characters in the supplied string. FIG. 9(m) shows an example of an I3ML file for this method.

The compare method compares two supplied strings and returns true if they are equal else returns false. This method ignores ease while comparing the strings. This method is generally used in sequential groups. If the function returns true and the action succeeds, then the next action in the group is executed, else the onfail action of the group is executed. FIG. 9(n) shows an example of an I3ML file for this method.

The ccompare method compare two supplied strings and returns true if they are equal else returns false. This method performs a case-sensitive comparison. Like the 'compare' method, this method is generally used in sequential groups. If the function returns true and the action succeeds, then the next action in the group is executed, else the onfail action of the group is executed. FIG. 9(o) shows an example of an I3ML file for this method.

Each of these local actions is defined in a I3ML data file which is received by player module 18 upon the occurrence of an event that is associated with the local action. For instance, in the example cited above, the "CloseWindow" action, which performs a local action that closes the "LoginWindow" object, may be defined as (abridged for the purpose of illustration):

```
<action name="CloseWindow" server="Local.Process" target="close"
        method="I3ML">
    <send.from="LoginWindow"/>
</action>
```

A remote action, on the other hand, refers to an action that is performed by a separate device, such as server 12. This server may reside in the same device as player module 18, but may also reside separately from player module 18 as shown in FIG. 1. Like the local actions, remote actions can also be illustrated with reference to FIG. 2. For instance, when the user left clicks on the "LoginButton" object, the ID and password information that the user has typed into editboxes 60 and 64 are sent to server 12 for authentication. In this embodiment, the transmission to server 12 of the text from editboxes 60 and 64 for authentication constitutes a remote action. In this example, the "Login" action, which performs a remote action that transmits the contents of the editboxes for authentication, may be defined as (abridged for the purpose of illustration):

```
<action name="Login" server="LoginServer" target="/I3ML/default.asp"
        method="post">
    <send from="IDEditbox" property="Text" to="user"/>
    <send from="PasswordEditbox" property="Text" to="password"/>
    <send constant="Login" to="name"/>
</action>
```

As shown above, in order to define a remote action, a server is defined. The server which is defined in order that player module 18 knows where to retrieve the remote action. Generally, the set of I3ML data which calls a server comprises a hostname, a port on that host (typically 80), and a protocol (typically HTTP). In the example cited above, a server called "LoginServer" that is remotely called by the "Login" action to handle the authentication may be defined as:
<server name="LoginServer" protocol="HTTP" host="www.cokinetic.com" port="80"/>

In addition to naming the server, a remote action call may also name a target (i.e. service method) on that server. It may also name parameters and return values, mapping the names as defined in the I3ML language to the names as defined in the service. In the example above, the contents of the editbox IDEditbox are sent to the service parameter named "user".

Thus, because each object has associated therewith different events which trigger actions, the occurrence of the same event in connection with different objects will have different results. Conversely, the same action may result from the occurrence of different events. For example, left clicking the HelpButton and pressing F1 are different events that may be associated with the same action, namely calling up a Help screen.

According to one embodiment of the invention, instead of being linked to a single action, an event may be linked to a group of actions. A group comprises more than one action which is performed upon the occurrence of an event. One type of group is referred to as a "sequential action group." In a sequential action group, upon the occurrence of a triggering event, each action in the group is run sequentially, e.g. —one at a time. Another type of group is referred to as a "parallel action group". In a parallel action group, player module 18 runs some or all of the associated actions in parallel threads, e.g: simultaneously.

Figure 10:
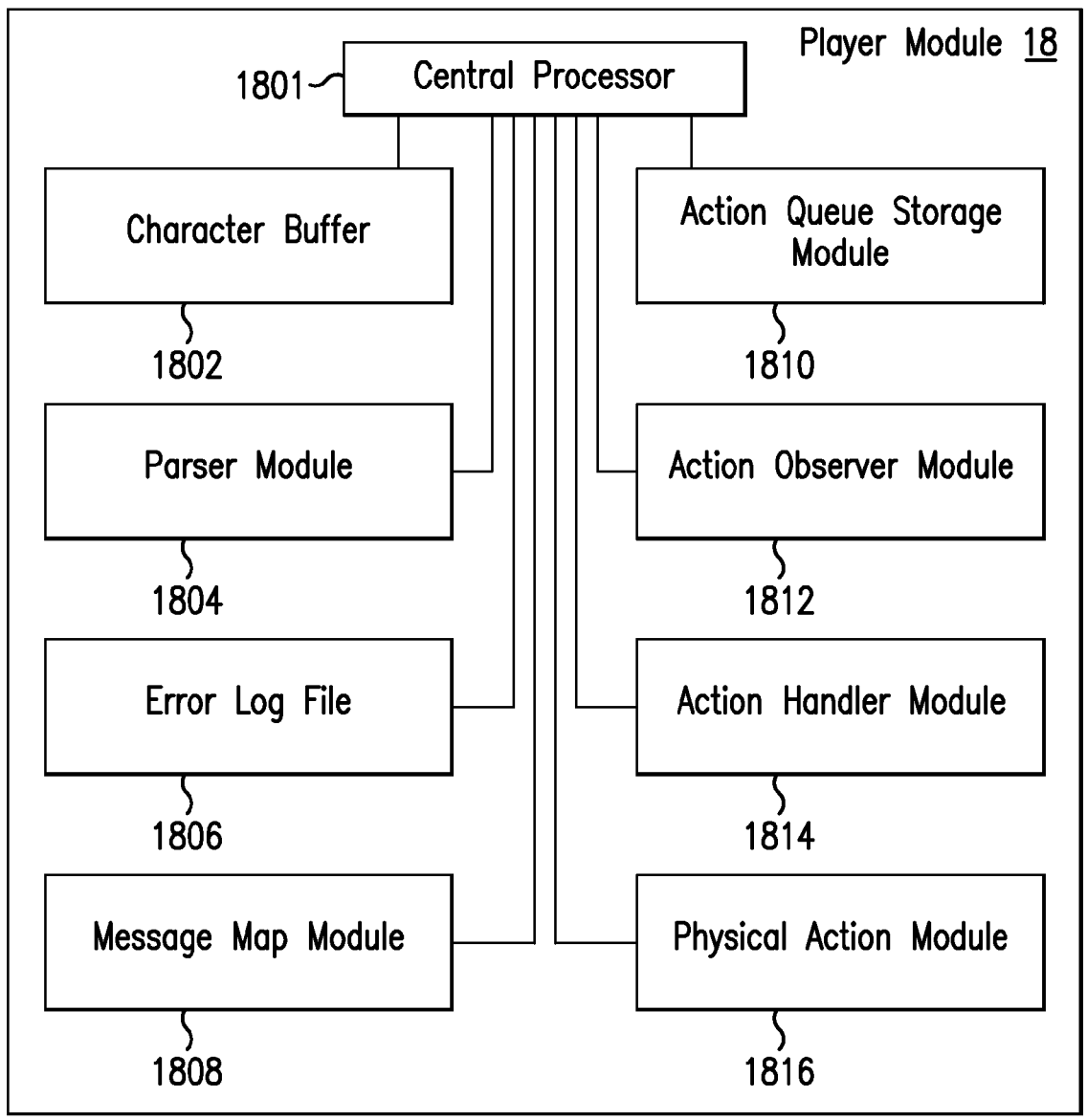
FIG. 10 is a block diagram that illustrates some of the components of the player module, in accordance with one embodiment of the present invention.

FIG. 10 is a block diagram that illustrates some of the components of player module 18, in accordance with one embodiment of the present invention. The manner in which these components are employed by player module 18 is described in greater detail below in connection with the flowchart of FIG. 11. Generally, player module 18 comprises a central processor module 1801 which is coupled to each of the other modules and which controls the operations thereof. Player module 18 also comprises character buffer 1802, which stores a file of I3ML data to be run by player module 18. Parser module 1804 is coupled to character buffer 1802 for processing the file of I3ML data. Error log file 1806 stores errors detected by parser module 1804. Message map module 1808 stores association between events and actions.

Action queue storage module 1810 stores a queue of actions to be performed by player module 18. Coupled to action queue storage module 1810 is action observer module 1812 which observes when a new action has been added to the queue. Action handler module 1814 handles the performance of an action in conjunction with physical action module 1816.

Figure 11A:
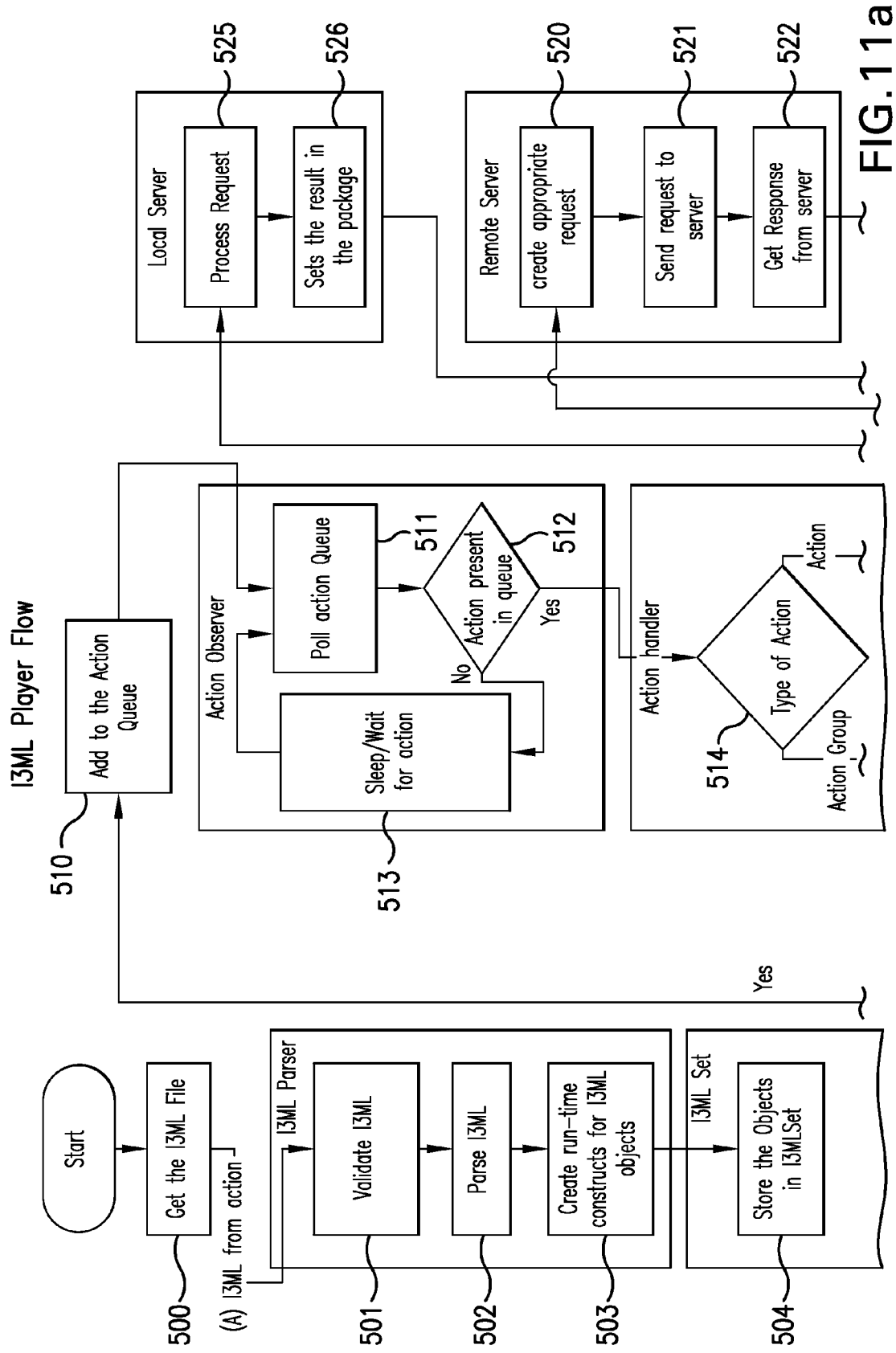
FIG. 11 is a flowchart that illustrates the steps that are performed by the player module, in accordance with one embodiment of the present invention.
Figure 11B:
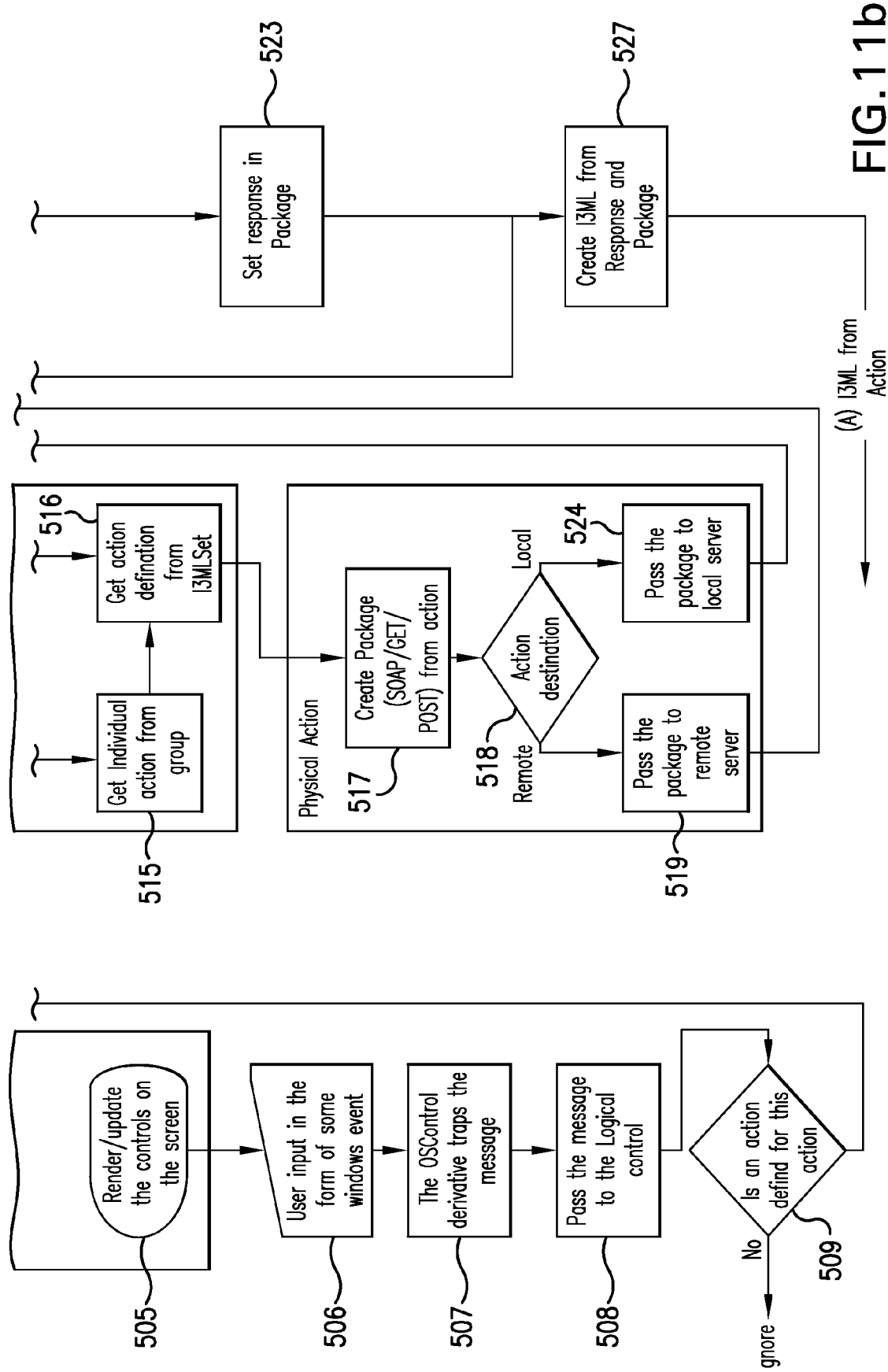

FIG. 11 is a flowchart that illustrates the steps that are performed by player module 18 and some of the other components of system 10, in accordance with one embodiment of the present invention, in order to process and display a user interface. At step 500, player module 18 receives an input file comprising I3ML data. According to one embodiment, this file of I3ML data may be supplied as a parameter to the player.exe.

In case a particular file of I3ML data is nut specified, player module 18 prompts the user to enter a file name by displaying to the user a "file-open dialog box". Once player module 18 has the name of a file of I3ML data to run, player module 18 opens the file using the Windows system API and stores the contents of the file in character buffer 1802.

At step 501, character buffer 1802, which was populated in step 500, is provided to parser module 1804. Among other things, parser module 1804 is configured to validate the data in the I3ML file. Specifically, parser module 1804 is configured to determine whether the syntax employed in the file of I3ML data is in accordance with correct XML syntax. According to a preferred embodiment of the invention, parser module 1804 employs the open source Apache's Xerces parser module to validate the file of I3ML data. If parser module 1804 determines that the syntax of the I3ML data tile is not in accordance with correct XML syntax, player module 18 generates a message-box that shows the user the location of the error, and logs the error into error log file 1806.

Once player module 18 determines that the syntax of the I3ML data file is in accordance with correct XML syntax, player module 18 proceeds to step 502. At step 502, parser module 1804 of player module 18 parses the I3ML data file in order to generate a DOM tree structure.

At step 503, player module 18 traverses the tree structure generated in step 502 in order to generate run time logical objects for various I3ML data elements present in the DOM tree. These objects constitute the logical interpretation of the I3ML data elements and form a logical layer in player module 18. The logical objects maintain map data structures for maintaining the various attributes specified in the DOM tree.

At step 504, player module 18 generates a I3ML data set. The I3ML data set comprises the references to the logical objects that were created in step 503. According to one embodiment, player module 18 may store various collections of references to the logical objects, thereby generating a plurality of I3ML data sets.

Once the DOM tree is completely traversed, player module 18 proceeds to step 505. At step 505, a user interface, comprising the interface items associated with the logical objects stored in the I3ML data set, is displayed for display to the user. Specifically, parser module 1804 requests the I3ML data set to generate the user interface by synchronizing the logical objects stored in the I3ML data set with the interface items that are displayed to and that interact with the user. Data regarding each interface item, such as class, coordinates, color, appearance etc, is employed to display the interface item.

Once the user interface is presented to the user, player module 18 employs a Windows message loop and waits for an event to occur. At step 506, an event occurs. As previously discussed, the event which occurs at step 506 may be any Windows event, such as "LeftMouseClick", "GotFocus", "LooseFocus", etc.

At step 507, the Windows events are associated to the interface items displayed to the user by employing message map module 1808. Message map module 1808 comprises message maps. Each message map comprises messages that associate events to actions that are to be performed when the event occurs. At step 508, player module 18 transmits a message to its corresponding object in the logical layer. Specifically, player module 18 stores the references to the actions specified in the I3ML data to be executed at the occurrence of the events.

At step 509, player module 18 determines whether there exists an action to be performed when the event specified in step 506 occurs. Specifically, player module 18 examines the message map of the appropriate object for a definition of an action. If player module 18 determines that an action is defined, player module 18 proceeds to step 510. At step 510, player module 18 adds the action name, and the name of the object to which it is associated, to an action queue stored in action queue storage module 1810.

At step 511, action observer module 1812 polls action queue storage module 1810 to determine whether a new action has been added to the action queue. According to one embodiment of the invention, action observer module 1812 is configured to automatically poll action queue storage module 1810 at periodic time intervals for this purpose. If an action is found in the action queue, action observer module 1812 proceeds to step 514, explained below. According to one embodiment, a time interval may be set to insure that an action received by action queue storage module 1810 is performed within the time interval. In this case, if the action has not been performed within the set time interval, action observer module 1812 automatically proceeds to step 514 also.

If no action is present in action queue storage module 1810, then, at step 513, action observer module 1812 goes into a wait state to avoid unnecessary CPU utilization. However, if it is determined at step 512 that an action is pending in action queue storage module 1810, then at step 514, the action is forwarded to action handler module 1814 for execution.

At step 514, action handler module 1814 determines whether the received action is a single action or an action group. If the received action is a single action, then at step 516, action handler module 1814 requests the definition of the action from the I3ML data set. If the received action is an action group, then at step 515, action handler module 1814 requests the definition of each action in the action group from the I3ML data set. As previously discussed, an action group is a combination of single actions which may be executed sequentially (one after the other) or in parallel (all at once). Furthermore, an action group may comprise "if" constructs for conditional execution of a single action in the action group (e.g. —only if a condition is satisfied does the single action get executed).

Upon completion of step 516, an action is transmitted to physical action module 1816. At step 517, physical action module 1816 determines the call type associated with the action. According to various embodiments, the call type associated with the action may be SOAP, GET or POST. Depending on the call type determined, physical action module 1816 then creates a data package corresponding to the action.

At step 518, physical action module 1816 also determines whether the action is a local action or a remote action. If physical action module 1816 determines that the action is a local action, then player module 18 proceeds to step 524. At step 524, physical action module 1816 transmits the package that was created at step 517 to a local server, such as local server 16 illustrated in FIG. 1. At step 525, the local server processes the package, and at step 526, transmits a result package back to physical action module 1816. The result package is converted to I3ML data, which is employed by player module 18 to be displayed to the user. For example and as previously discussed, the local server may be employed, according to one embodiment, to add numbers from two editboxes of the interface—in this case, the local server may add the two numbers at step 525 and transmit back to physical action module 1816 the sum of the two numbers to be displayed in a third box of the interface. Other examples of local actions are a local message box or a local copy method which copies the contents of one interface item to another interface item.

If physical action module 1816 determines that the action is a remote action, then player module 18 proceeds to step 520. At step 520, physical action module 1816 transmits the package that was created at step 517 to a remote server, such as server 12 illustrated in FIG. 1. At step 520, the remote server generates an appropriate request (e.g. —SOAP, GET or POST) depending on the particular data source 26 which is specified in the package. Advantageously, the request is generated by the connectors 24, which, as previously discussed, are specifically configured to transform a request for data in XML format to a request which is comprehensible to data source 26. At step 521, the request is transmitted by remote server 12 to data source 26. At step 522, remote server 12 receives back from data source 26 a response to the request. At step 523, connectors 24 convert the result package back into XML and transmits the XML data to XSL transform module 22. At step 527, the data is converted into I3ML data and is transmitted to action handler module 1814. At this point, player module 18 returns to step 501 in order to validate the I3ML data and to display the corresponding I3ML data to the user via the interface.

In case the execution of an action fails for any reason, action handler module 1814 determines whether the action has an "OnFail" action defined. If an "OnFail" action is defined, action handler module 1814 executes this action, or else displays a message box advising the user that the action has failed. In the event that an action group is handled by player module 18, the "OnFail" action is executed whenever any of the actions that comprise the action group fails to execute. Advantageously, action handler module 1814 may also determine whether the action being processed is a recursive action, in which case the action is added again to the action queue in action queue storage module 1810.

Figure 13:
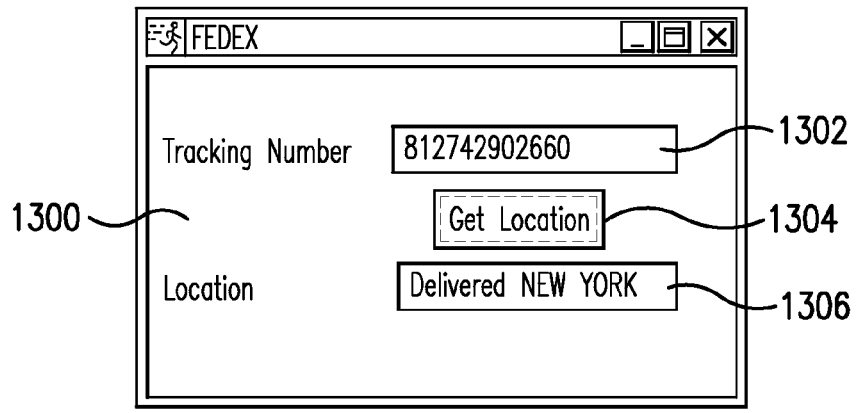
FIG. 13 is a user-created graphical interface which is employed by a user to track package locations, in accordance with one embodiment of the present invention.

The operation of the system, in accordance with one embodiment of the present invention, is now illustrated in connection with the interface shown in FIG. 13. Specifically, FIG. 13 illustrates an interface that may be created by a user in connection with a package tracking system, which employs data from a company such as FEDEX™ or another shipping company. Interface 1300 is a window that may be created using the I3ML designer module having a first field 1302 used to input a FEDEX tracking number, and a second field 1306 providing the location of a package. A button 1304 causes the I3ML player module to obtain the location of the package when the tracking number is provided, and to display it in field 1306.

The interface 1300 is implemented by the I3ML programmer linking an action corresponding to the FEDEX SOAP service, such that when a user fills in field 1302 and clicks button 1304, the FEDEX database is accessed. Once the user clicks on button 1304, the player module makes a properly formatted SOAP call to FEDEX's package tacking system. The I3ML player module transmits the tracking number entered by the user to FEDEX and transmits the location of the package as reported by FEDEX into location field 1306. Although this example merely illustrates the retrieval of data for a single package location, the present invention contemplates that any number of packages could be tracked in this fashion, enabling simplified inventory tracking.

A set of I3ML which may be employed to generate interface 1300, and which provides the operation as described above, may be illustrated as such:

```
<iii version="0.9.1"><insert><header name=""/><server name=
"FEDEX"
protocol="HTTP" host="services.xmethods.net" port="80"
timeout=""><action
name="getlocation" server"FEDEX" target="/perl/soaplite.cgi"
blockgui="true"
method"'SOAP" uri="urn:xmethodsFedEx" soapservice="getStatus"
soapaction="urn:xmethodsFedEx#getStatus"><send from=
"ebTrackingNumber"
property="Text" attributes="xsi:type="xsd:string""
to="trackingNumber"/><receive to="ebLocation" property="Text"
from""return"/></action><object name="Windowl" parent=""
class="Window"><property name="BorderStyle" value=
"Sizeable"/><property
name""Caption" value"'FEDEX"/><property name="Height" value=
"175"/><property
name"'Left" value="258"/><property name"'Top" value-
"89"><property
name="Width" value="268"/><property name="MaximizeButton"
value="true"/><property name="MinimizeButton" value-"true"/><property
name="SystemMenu" value="true"/></object><object name=
"ebTrackingNumber"
parent="Windowl" class"'EditBox"><property name="Caption"
value="EditBoxl"/><property name="Left" value=
"110"/><property name="Top"
value="24"/><property name="Height" value="21"/><property name=
"Width"
value=" 121 "/><property name="Enabled" value=
"true"/><property name="TabStop"
value-"true"/><property name="Visible" value=
"true"/><property name-"Color"
value="FFFFFF"/><property name="InsertMode" value=
"true"/><property
name="MaxLength" value="0"/><property name="Password" value=
"false"/><property
name="ReadOnly" value="false"/><property name="Scroll" value=
"true"/><property
name="TextAlignment" value="Left"/><property name="TextCase"
value="Mixed"/><property name="TextOperation" value=
"Replace"/></object><object
name="ebLocation" parent="Windowl" class=
"EditBox"><property name="Caption"
value="EditBox2"/><property name="Left" value=
"109"/><property name="Top"
value="84"/><property name"'Height" value--
"21"><property name"'Width"
value="121"/><property name="Enabled" value=
"true"/><property name="TabStop"
value="true"/><property name="Visible" value=
"true"/><property name="Color"
value="FFFFFF"/><property name="InsertMode" value="true"/><property
name="MaxLength" value="0"/><property name="Password" value=
"false"/><property
name="ReadOnly" value="false"/><property name="Scroll" value=
"true"/><property
name="TextAlignment" value="Left"/><property name="TextCase"
value="Mixed"/><property name="TextOperation" value=
"Replace"/></object><object
name="Buttonl" parent="Windowl" class=
"Button"><property name="Caption"
value="Get Location"/><property name="Left" value=
"125"/><property name="Top"
value="54"/><property name="Height" value=
"25"/><property name="Width"
value="75"/><property name="Enabled" value=
"true"/><property name="TabStop"
value="true"/><property name="Visible" value="true"/><property
name="DefaultButton" value="false"/><property name=
"HorizontalAlignment"
value="false"/><property name="ImageOffset" value=
"false"/><property name="Round"
value="false"/><property name="VerticalAlignment" value=
"false"/><method
name="LeftClick" action="getlocation"/></object><object name="Labell"
parent="Windowl" class-"Label"><property name=
"Caption" value="Tracking
Number"/><property name="Left" value="5"/><property name="Top"
value="28"/><property name="Height" value="13"/><property name=
"Width"
value="96"/><property name="Enabled" value="true"/><property name=
"TabStop"
value="true"/><property name="Visible" value="true"/><property
name="TextAlignment" value="Left"/></object><object name="Label2"
parent="Windowl" class="Label"><property name="Caption"
value="Location"/><property name="Left" value="6"/><property name=
"Top"
value="92"/><property name="Height" value="11"/><property name=
"Width"
value="50"/><property name="Enabled" value="true"/><property name=
"TabStop"
value="true"/><property name="Visible" value="true"/><property
name="TextAlignment" value="Left"/></object></insert>
```

Figure 14:
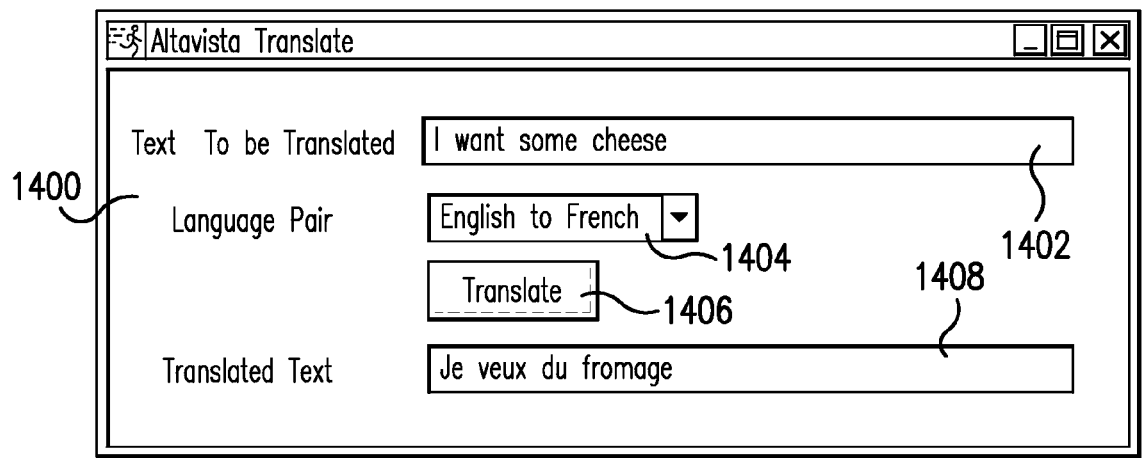
FIG. 14 is a user-created graphical interface which is employed by a user to translate words or phrases from one language into another language, in accordance with one embodiment of the present invention.

FIG. 14 illustrates another interface that may be created by a user in connection with a language translation system, which employs data from a company such as ALTAVISTA™ or another language translation service provider. Interface 1400 is a window that may be created using the I3ML designer module having a first field 1402 used to input a word or phrase in a first language, and a second field 1408 providing the translation of that word or phrase into a second language. Drop-down box 1404 provides several selections for the user in determining which language the word or phrase is to be translated into. A button 1406 causes the I3ML player module to obtain the translation of the word or phrase which has been entered by the user, and to display it in field 1408.

As described above in connection with FIG. 13, the interface 1400 is implemented by the I3ML programmer linking an action corresponding to a ALTAVISTA's BABELFISH™ SOAP service, such that when a user fills in field 1402 and clicks button 1406, the BABELFISH server is accessed. Once the user clicks on button 1406, the player module makes a properly formatted SOAP call to ALTAVISTA's language translation system. The I3ML player module transmits the word or phrase entered by the user to ALTAVISTA and transmits the translation of the word or phrase as reported by ALTAVISTA into field 1408. Although this example merely illustrates the retrieval of a translation for a single word or phrase, the present invention contemplates that any type of text messages could be translated in this fashion, enabling "chat room" type programs to be used by people employing different languages.

A set of I3ML which may be employed to generate interface 1400, and which provides the operation as described above, may be illustrated as such:

```
<iii version="0.9.1"><insert><header name=""></header><server name=
"BabelFish"
protocol="HTTP" host="services.xmethods.net" port=
"80"></server><action
name="BabelFish" server="BabelFish" target=
"/perl/soaplite.cgi" blockgui="false"
method="SOAP" uri="urn:xmethodsBabelFish" soapservice=
"BabelFish" soapaction=
"urn:xmethodsBabelFish#BabelFish"><send from=""ebTranslationmode"
property="SelectedItemID" attributes="xsi:type="xsd:string""
to="translationmode"/><send from="ebSourceData" property="Text"
attributes="xsi:type="xsd:string"" to="sourcedata"/><receive
to="ebReturn"
property="Text" from="return"/><action><object name="Windowl"
    parent=""
class="Window"><property name="BorderStyle"
    value="Sizeable"/><property
name="Caption" value="Altavista Translate"/><property
    name="Height"
value="202"/><property name="Left" value="258"/><property
name="Top"
value="116"/><property name="Width"
value="458"/><propertyname="Maxim izeButton"
value="True"/><property name="MinimizeButton" value=
"True"/><property
name="SystemMenu" value="True"/></object><object
    name="ebSourceData"
parent="Windowl" class="EditBox"><property name="Caption"
value="EditBoxl"/><property name="Left" value=
"137"/><property name="Top"
value="24"/><property name="Height" value="21"/><property
name="Width"
value="285"/></object><object name="ebTranslationmode"
    parent="Windowl"
class="Dropdown"><property name="Caption" value=
"EditBox2"/"property
name="Left"
value="139"/><property name="Top" value="58"/"property name=
"Height"
value="21"/><property name="Width" value=
"121"/><data><insertitem><property
name="ItemID" value="en_fr"/"property name="ItemText" value=
"English
to
French"/></insertitem><insertitem><property name=""ItemID"
value=""fr_en"/><property
name="ItemText" value=
"French to English"/></insertitem></data></object><object
name="ebReturn" parent="Windowl" class="EditBox"><property name=
"Caption"
value=""EditBox3"/><property name=
"Left" value=""140"/><property name=><"Top"
value="126"/><property name="Height" value="21"/><property
name="Width"
value="284"/></object><object name="Labell" parent="Windowl"
class="Label"><property name="Caption" value=
"Text To be Translated"/><property
name="Left" value="20"/><property name="Top" value="28"><property
name="Height"
value="16"/><property name="Width" value=
"113"/></object><object name="Label2"
parent="Windowl" class="Label"><property name="Caption"
    value="Language
Pair"/><property name="Left" value="29"/><property name=""Top"
value="62"/><property
name="Height" value="13"/><property name="Width" value=
"103"/></object><object
name="Labe13" parent="Windowl" class="Label"><property
    name="Caption"
value="Translated Text"/><property name="Left" value=
"23"/><property name="Top"
value="130"/><property name="Height" value="13"/><property name=
"Width"
value="101"/></object><object name="Buttonl" parent="Windowl"
class="Button"><property name="Caption" value=
"Translate"/><property name="Left"
value="140"/><property name="Top" value="90"/><property
name="Height"
value="25"/><property name="Width" value="75"/><method name=
"LeftClick"
action="BabalFish"/></obj ect></insert></iii>
```

Figure 15:
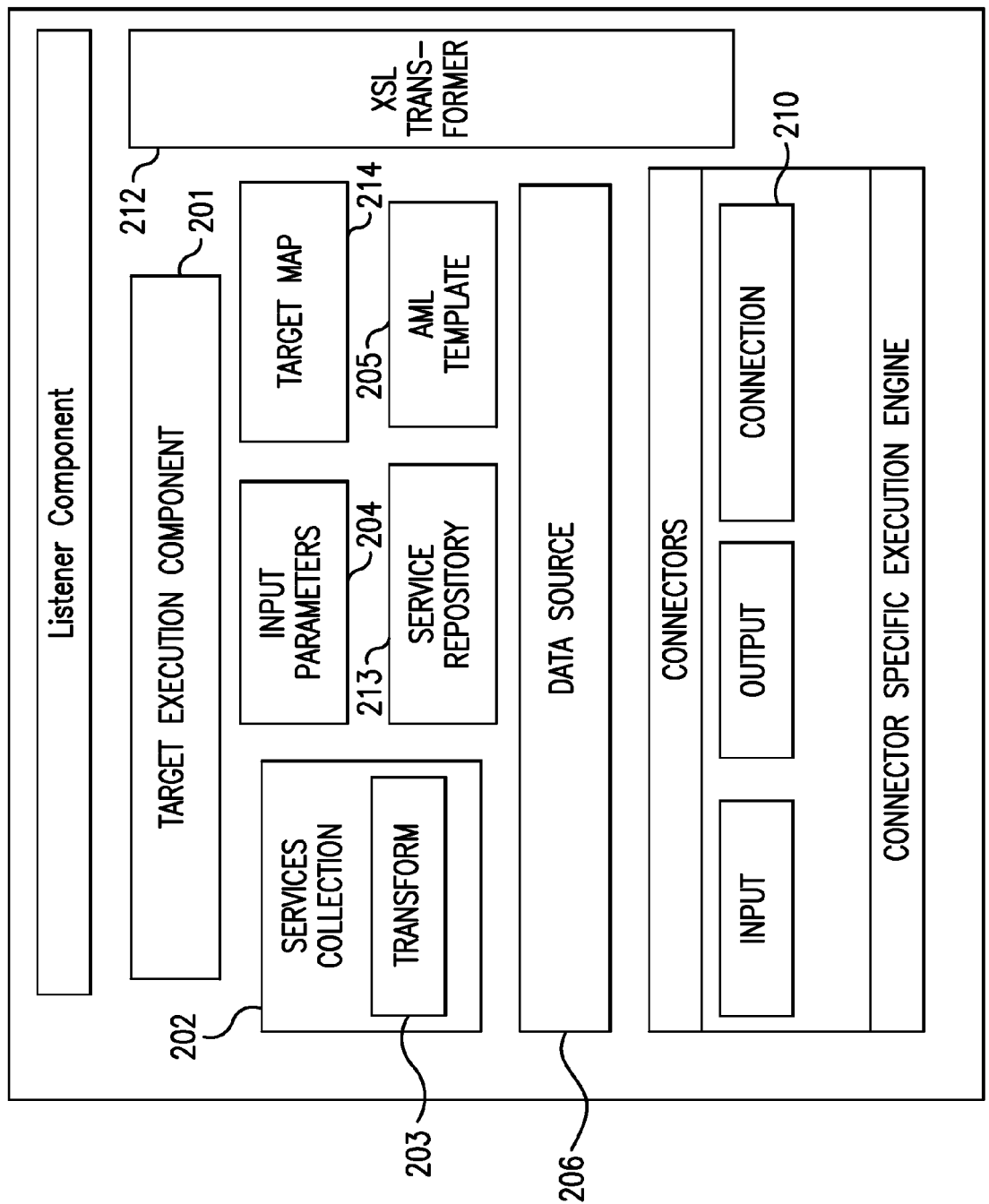
FIG. 15 is a block diagram that illustrates the components of I3ML server 12 in more detail, according to one embodiment of the invention.

FIG. 15 is a block diagram that illustrates the components of I3ML server 12 in more detail, according to one embodiment of the invention. In this embodiment, I3ML server 12 comprises a listener component 200, which listens on the HTTP port for a target request. A target request is a request for an item of data (hereinafter referred to as "target"). The request is either a POST or a GET request issued by the I3ML player. The listener component 200 expects a packaged set of parameter(s) from the player module. It also passes the "name" of the target as one of the parameters in the POST or the GET request. Advantageously, this parameter called "name" is a mandatory parameter. No other parameters sent by the server can have the same "name". The client can also pass other parameters as expected by the "target".

Listener component 200 parses the input parameters and converts them into a internal data structure which supports look up on a name-value pair. The data structure used in the embodiment shown is the dictionary. This data structure supports a (Key,Value) association. The listener component 200 converts the input from the player module into this structure such that the parameter name is the "key" and the parameter value corresponds to the "value".

The target execution component 201 then uses this dictionary object to determine the name of the target in question. During the registration process the target is registered in the target map module 214 and has a definition that has been stored in the corresponding target definition file. The target execution component 201 loads the target map and does a look up for the target in question and determines the location of the target description file. The target description file is then loaded into the memory. The target description file is an XML representation of the target. It describes the input parameters the target expects, the services which the target needs to execute to create the data source, and the templates which the target needs to apply to generate the I3ML output. The target execution component 201 then parses the target description file into its internal data components as follows:

input parameters collection 204 output parameters collection services collection 202

I3ML template object 205

Input parameter collection 204 contains parameter objects each of which corresponds to an input parameter in the target description file. A parameter is represented as a data structure which has a name, type and value. The name and type are filled in at this point of time from the target description file.

Services collection 202 is a collection of service objects each corresponding to a server tag in the target description file and transform maps 203. Each service has the following objects:
- input parameters 208
- output parameters 209
- connection information 210

Connection information 210 varies for each particular connector and is the information that the connector requires to connect to the service. The data for the input parameters for the service can be mapped from one of the following:
- a) one of the input parameters to the target 204;
- b) one of the output parameters from one of the services that have been ran before this service 209; and
- c) a constant.

Each of the above parameters can be transformed to generate input for the services. This transform is specified in XSi. (refers to "Extensible Stylesheet Language"), which allows the user to transform the mapped parameter to the desired parameter using all the features available in XSL. The collection of these mapping and transforms for each parameter for the service constitute the transform maps 203.

Server 12 allows integration of a variety of services like SOAP Services, Stored Procedures, HTTP Post and GET requests. In a preferred embodiment, this is achieved through the use of connectors 207. A connector 207 is an object which implements interfaces defined by the connectors specification. The connector specification currently demands that to be a connector implement the IService interface. The code shown below indicates the IDL (refers to "Interface Definition Language") for the IService interface:

```
[
    odl,
    uuid(DF429084-9D0E-400F-9E6A-67344E074DF2),
    version(1.0),
    hidden,
    dual,
    nonoxtensible,
    oleautomation
]
interface _IService:IDispatch {
    [id(0x60030000)]
    HRESULT getInputParameters([out, retval] _CParameters** );
    [id(0x60030001)]
    HRESULT getOutputParameters([out, rattail _CParameters** );
    [id(0x60030002)]
    IIRESULT InvokeService(
        [in] _CParameters* objInputParameters,
        [in, Out] _CParameters** objOutputParameters,
        [in, out] BSTR* strError,
        [out, retval] VARIANT_BOOL* );
    [id(0x60030003)]
    HRESULT getName([out, retval] BSTR* );
    [id(0x60030004)]
    HRESULT getResultSet([out, retval] BSTR* );
    [id(0x60030005)]
    HRESULT getLastError([out, ratval]] BSTR* );
    [id(0x60030006)]
    HRESULT Initialize(
        [in, out] IXMLDOMElement** objServiceXML,
        [out, retval] VARIANT* );
}
```

The functions of the IService interface allow the connector to encapsulate most of the service specific details in the connector object 207. The services collection 202 is a collection of services represented by connectors and transform maps for each of the services. Data source 206 represents the data views presented by the services present in the service collection. Advantageously, this comprises an XML string which contains information about each service, the names of the parameters returned and the data contained in each of the parameters, as shown below:

```
<DataSource>
    <InputParameters>
        <Parameter name="testparameter">TestValue</Parameter>
    </InputParameters>
    <Service name="TestService" Executed="1">
        <Parameter name="TestResult"> HelloWorld</Parameter>
    </Service>
</DataSource>
```

I3ML template object 205 is an XSL stylesheet which is applied against the data source. It represents the output that is the result of the target.

XSL transformer 212 is a component that applies an XSL stylesheet to an XML and generates an output. Generally this component is intended to be a wrapper around an XSL processor. The processor currently being employed is similar to Microsoft's MSXML parser.

For each Service in the target description file the target execution component 201 does the following:
- a) Look up the service type from the service repository 213 and create the appropriate connector;
- b) look up the service definition from the service repository 213;
- c) initialize the connector with information from the service repository 213; and
- d) add the connector to the services collection 202.

After the internal data structures have been created, the target execution component executes the services present in the services collection. To execute each service, server 12 determines, for each parameter, the value of the input parameters. In one embodiment, this is determined by looking up the transform map 203 which indicates how the input parameter for the service should be obtained. The target execution component 201 applies the transforms by running the input through the XSI, transformer 212 and inserting the determined values into the input parameter collection held by the service 208.

The target execution component then requests the execution engine 211 to execute the service. This may require the use of service-specific drives/components. After the service has been executed, the target execution component 201 obtains, from the connection execution engine 211, the output parameters 209 for the service and adds them to the data source 206.

After all the services have been run the target execution component 201 then loads the I3ML template 205. It runs the I3ML template 205 against the data source 206 by passing it through the XSL transformer 212. The result of the transformation process is an I3ML string. The target execution component 201 then returns this I3ML information to the listener component 200. The listener component 200 in turn sets the MIME (refers to "Multi Purpose Internet Mail Extensions") type of the returned data to text/I3ML and returns it to the player module.

FIG. 16 is a flowchart that illustrates the steps that are performed during a design phase in order to enable a target to be accessed via a target request from player module. At step 1601, the system performs a target registration process of exposing the target to the outside world. According to one embodiment, the server maintains a file which lists all the targets it exposes to the outside world. This file is called the target map. Registration of the target at step 1601 may also involve adding information about the target to this file, and registration of the target description file (TDL) in the server.

The target map consists of a series of <Target> tags each describing a target, such as:

```
<Target name="SampleTarget>
    <TargetInfo url="C:\Targets \ SampleTarget.xsl"/>
<Target>
```

TargetInfo contains information about the target. Url points to the location of the target tile on the server.

At step 1602, the system defines the following: a) the target input parameters; b) the services the target uses; and c) the template that the target will apply on the returned data if any. An example of a target definition file is shown below:

```
<Action name="GetCustomerInformation">
    <InputParameters>
        <Parameter name="CustomerID" type="Schema1"/>
    <InputParameters>
    <OutputParameters>
        <Parameter name="ReturnValue" type="Schema2"/>
    </OutputParameters>
    <Services>
        <Service name="GetUsers"/>
    <Services>
    <Template>
        <File>C:\user\serviceExecutor\ROBONAMEN\getusers.xsl</File>
    <Template>
<Action>
```

The following is a brief description of each tag in the target description file, according to one embodiment of the invention.

Action

The target definition file begins with the action tag. This tag has a single attribute which defines the name of the action.
InputParameter: This tag defines input parameters that it expects to be passed on when it is called. When the player calls the target the server extracts the server looks in the request for these parameters. This tag is a holder for the parameter tag, which hold the parameters in question.

Parameter

This tag defines the parameter in question. It contains two attributes.
  a) Name: defining the name of the attribute
  b) Type: defines the XSD (Extensible Data) type of the attribute.

At step 1604, the services tag lists the services that the target integrates. Services which are used here need to be defined in the services repository at step 1603 (which is again a file). Each service is defined in the service tag. At step 1605, the set-vices tag may embed XSL statements within it to lend a dynamic nature to the services which can be executed. These conditions are referred to as "Run Conditions".

```
<Services xmlns:xsl="">
    <xsl:if test="./DataSource/InputParameter/
Parameter[@,name="Parameterl ']/@value= 'RunServicel'">
        <Service name="TestService">
            <InputMap>
                <Map from="TargetParameterl" to="ServiceParameter">
                    <Transform xsl="ServerXSL">
                        <xsl:for-each select="./Object/item">
                            <xsl:value-of select="./@value"/>
                        <xsl:for-each>
                    </Transform>
                <Map>
            </InputMap>
        </Service>
    </xsl:if>
</Services>
```

Service

Each service tag has an attribute called name. This is a unique identifier for the service. The service can also contain a tag called metainfo. MetaInfo is an optional tag. If absent, the name attribute is used in its place. This refers to the name of the service in the service repository. The service repository contains detailed data about the service that the "server" utilizes to actually run the service.

At step 1606, the system employs an input map. Each "Service" consists of a inputmap. An input map consists of a series of map tags. Each map tag defines how the input parameters for the target map onto the input parameters for the service.

Map

Preferably, each map tag contains the following attributes:
  a) from: defines the input parameter from the target (optional)
  b) to: defines the input parameter of the service which is being addressed. (mandatory)
  c) constant: defines a constant in lieu of from
  d) expr: Xpath expression against from or constant.

In addition to these attribute if the transform to be applied is complex each map element may have a Transform tag.

Transform

A transform can be specified as to how the value specified by the "from" will be mapped to the "to" attribute. The transform will be specified in xsl. The XSL is written with the "from" attribute as the source.

At step 1607, the template tag defines the I3ML template, which is applied against the data source. The template tag has a file tag which points to a template file. The template file is a XSL file. The template tag can have multiple files with XSL statements embedded between them. These XSL statements are evaluated against the data source. After the XSL statements have been applied the template is determined to be the first available <File> element. For instance:

```
<Template>
    <xsl:if
test=".fDataSource/Service[@name=' Servicel']/ResultSet/Row/
Column[@Name='Coll' ]='6'">
        <File>C:\Test1XSL.xsl</File>
    <xsl:if>
    <xsl:if
test="./DataSource/Service[@name="Service1']/ResultSet/Row/
Column[@Name='Coll'
]='7'">
        <File>C:\Test2XSLxs1 </File>
</xsl:if>
</Template>
```

Additional steps are performed when the server runs. When the player module issues an HTTP request to the server, it is trapped by a web server, such as web server 26 shown in FIG. 2. The web server 26 invokes server 12. Server 12 parses the input parameters in the HTTP request and determines the target requested by the player. Server 12 parses the input parameters and stores them in an internal data structure. Server 12 also creates the data source and adds the input parameters to the data source.

The server determines the target description file describing the target and loads it into memory. This is an XML file which describes the target.

The server determines the services to be run from the <Services> tag in the target description. The tag may contain XSL statements which represent run conditions on the services. The services tag is evaluated against the data source. If the run conditions on a particular service are not met then it is excluded from the list of services to be executed. If the run conditions are met then the service is added to the list of services to be executed. After the final list of services to be executed is determined each of the services is then readied for execution. For each service in the service the server determines the type of service from the service repository and creates the required type of connector. It then passes to the connector the required initialization information.

For each service, the server determines the values for the input parameters. The server reads the input parameters for the service from the service repository. The input map in the target definition file defines how the input values for the input parameters have to be arrived. The server reads the instructions from the target definition file and performs the requisite transforms and determines the input values for the service.

After the input parameters have been determined the server invokes the connector for the service with appropriate input parameters. The connector packages the input parameters as required by the services and invokes the services. It takes the output parameters from the service and un-packages them for use by the server.

The server then creates a entry in the data source for the service and adds the output parameters to the data source. These steps are performed by the server for each service in the services collection.

After the data source has been populated with output parameters for all the services, the system determines the template to be loaded. The template tag can contain XSL statements. The server applies the data source against the XSL statements in the template tag. After the XSL statements have been applied, the first file tag in the result represents the I3ML template. The server loads this template into memory. The template is then applied against the data source and the resultant file of I3ML is generated. The file of I3ML is then sent back to the server as response to the HTTP request.

The present invention also provides the advantage that new functions and operations can be used in connection with old data sources. For instance, a database may have software associated therewith which enables a user to perform a number of operations with the data stored in the database. The present invention enables a user to create a new user interface to access the data in the database and to create new operations that may be performed with the data in the database by associating actions to be performed on the data when retrieved from the database.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

What is claimed is:

1. A real time user interface generator, comprising:
a player module executing on a processor for determining whether a received input is an event having a corresponding action defined for the event stored locally and generating a request for data based on the determination;
a local server communicatively connected to the player module for storing data related to a plurality of actions executable by the player module, wherein the local server provides the requested data for completion of the action upon receipt of the generated request;
wherein the player module is communicatively connected to a remote server and based on a determination that the corresponding action is remotely stored, forwards the request to the remote server for delivery of the requested data, wherein the request is converted from a first markup language into a format compatible with the remote server; and
a transform module executing on the processor for receiving the requested data from the remote server and converting the requested data into a second markup language compatible with the player module, and transmitting the converted requested data to the player module for execution.

2. The real time user interface generator of claim 1, comprising:
a parsing module executing on the processor for receiving the requested data from either the local server or the remote server and creating run-time constructs from the received data.

3. The real time user interface generator of claim 2, comprising:
a physical action module executing on the processor for determining whether the corresponding action is remotely stored and transmitting the request to the remote server.

4. The real time user interface generator of claim 1, comprising:
data storage accessible by the player module for storing the converted requested data, wherein the converted requested data remains available for future retrieval by the player module.

5. The real time user interface generator of claim 1, wherein the first markup language is XML and the second markup language is a custom markup language using XML syntax.

6. The real time user interface generator of claim 1, wherein the action is associated with a first interface item and the player module performs said action associated with said first interface item independent of one or more second interface items.

7. A method for just-in-time rendering of a user interface, comprising:
in response to an input to a user interface, at a player module executing on a processor, determining whether an action for responding to the input has been defined;
based on a determination that an action has been defined, generating a data package including a data call type associated with the action;
determining if the action is performable by a local server as a local action or by a remote server as a remote action;
based on the result of the determination, transmitting a request including the generated data package to either the local server or the remote server;
upon receipt of the request at the local server, processing the data package and transmitting the processing result to the player module; and
if the request is transmitted to the remote server, converting the request from a first markup language into a format compatible with the remote server, receiving requested data from the remote server and converting the requested data into a second markup language compatible with the player module, and receiving at the player module the converted requested data.

8. The method of claim 7, wherein the first markup language is XML and the second markup language is a custom markup language using XML syntax.

9. The method of claim 7, wherein the action is associated with a first interface item and the player module performs said action associated with said first interface item independent of one or more second interface items.

10. A just-in-time application generator, comprising:
a server configured to:
in response to an action, deliver input data;
a player module configured to:
receive the input data delivered from the server, the input file containing markup language data;
validate the data in the input file as having correct XML syntax;
parse the data in the input file into a data object model (DOM) tree structure;
traverse the DOM tree structure to generate run time logical objects for markup language data elements present in the DOM tree structure, wherein the logical objects maintain a mapping data structure to maintain the various attributes specified in the DOM tree structure;
generate and store a markup language data set comprising references to the logical objects;
synchronize the logical objects stored in the markup language data set with interface items that are displayed on a display device;
execute the action on the display device;
identify the occurrence of a user initiated event;
review the stored input data file for an action associated with the user initiated event;
determining whether the associated action is a local action or a remote action;
if the determination is a local action, the player transmits a request to a local server, wherein the local server processes the request and returns a result package to the player; and
if the determination is a remote action, the request is transmitted to the remote server, wherein the request is converted from a first markup language into a format compatible with the remote server, and requested data is received from the remote server and converted into a second markup language compatible with the player module.

11. The just-in-time application generator of claim 10, wherein the first markup language is XML and the second markup language is a custom markup language using XML syntax.

12. The just-in-time application generator of claim 10, wherein the action is associated with a first interface item and the player module performs said action associated with said first interface item independent of one or more second interface items.

13. A just-in-time user interface presentation tool, comprising:
a server configured to:
in response to a request, deliver an input data file containing data in predefined form of a markup language; and
a player module configured to:
receive the input file containing the predefined form of the markup language data;
validate the data in the input file as having correct syntax of an XML markup language;
parse the data in the input file into a data object model (DOM) structure;
traverse the DOM structure to generate runtime logical objects from the predefined markup language data elements present in the DOM structure, wherein the logical objects maintain a mapping data structure to maintain the various attributes specified in the DOM structure;
generate and store runtime data objects according to the predefined markup language data set comprising references to the logical objects;
synchronize the logical objects stored as the predefined markup language data set with interface items that are displayed on a display device, wherein the interface items respond to user interaction; and
transmit a request for data to a remote server, wherein the request is converted from a first markup language into a format compatible with the remote server, and requested data is received from the remote server and converted into the predefined markup language compatible with the player module.

14. The just-in-time user interface presentation tool of claim 13, wherein the player module is configured to store various connections of references to logical objects, and to generate a plurality of predefined markup languages.

15. The just-in-time user interface presentation tool of claim 13, wherein the first markup language is XML and the predefined markup language is a custom markup language using XML syntax.

16. The just-in-time user interface presentation tool of claim 13, wherein the request is associated with a first interface item and the player module performs an action based on said request associated with said first interface item independent of one or more second interface items.

* * * * *

UNITED STATES PATENT AND TRADEMARK OFFICE
CERTIFICATE OF CORRECTION

| | | |
|---|---|---|
| PATENT NO. | : 8,386,939 B2 | Page 1 of 1 |
| APPLICATION NO. | : 12/328564 | |
| DATED | : February 26, 2013 | |
| INVENTOR(S) | : Kris Stevens et al. | |

It is certified that error appears in the above-identified patent and that said Letters Patent is hereby corrected as shown below:

On the Title page of the patent, please replace Item (63) with the following:

-- (63) Continuation of application No. 10/482,543, filed as application No. PCT/US2002/020662 on Jul. 1, 2002, now Pat. No. 7,478,329. --

Signed and Sealed this
Twenty-ninth Day of December, 2015

Michelle K. Lee
*Director of the United States Patent and Trademark Office*